(12) United States Patent
Ko et al.

(10) Patent No.: US 8,934,446 B2
(45) Date of Patent: Jan. 13, 2015

(54) TRANSMISSION METHOD AND DEVICE FOR A DOWNLINK REFERENCE SIGNAL

(75) Inventors: Hyun Soo Ko, Anyang-si (KR); Jae Hoon Chung, Anyang-si (KR); Bin Chul Ihm, Anyang-si (KR); Moon Il Lee, Anyang-si (KR); Seung Hee Han, Anyang-si (KR)

(73) Assignee: LG Electronics Inc., Seoul (KR)

( * ) Notice: Subject to any disclaimer, the term of this patent is extended or adjusted under 35 U.S.C. 154(b) by 201 days.

(21) Appl. No.: 13/499,907

(22) PCT Filed: Oct. 4, 2010

(86) PCT No.: PCT/KR2010/006750
§ 371 (c)(1),
(2), (4) Date: Apr. 2, 2012

(87) PCT Pub. No.: WO2011/040797
PCT Pub. Date: Apr. 7, 2011

(65) Prior Publication Data
US 2012/0195285 A1  Aug. 2, 2012

Related U.S. Application Data

(60) Provisional application No. 61/248,320, filed on Oct. 2, 2009.

(51) Int. Cl.
*H04W 72/04* (2009.01)
*H04L 5/00* (2006.01)
*H04J 13/00* (2011.01)

(52) U.S. Cl.
CPC ............ *H04J 13/00* (2013.01); *H04L 5/0048* (2013.01)
USPC ........................... 370/330; 370/229; 370/329

(58) Field of Classification Search
None
See application file for complete search history.

(56) References Cited

U.S. PATENT DOCUMENTS

2004/0001429 A1* 1/2004 Ma et al. .................. 370/210
2007/0248113 A1* 10/2007 Ko et al. .................. 370/436
(Continued)

FOREIGN PATENT DOCUMENTS

CN  101156329  4/2008
JP  2012-515995  7/2012
(Continued)

OTHER PUBLICATIONS

Ericsson, UE specific reference signal pattern, R1-080506, Jan. 14-18, 2008.*
(Continued)

*Primary Examiner* — Hassan Kizou
*Assistant Examiner* — Tejis Daya
(74) *Attorney, Agent, or Firm* — Lee, Hong, Degerman, Kang & Waimey

(57) ABSTRACT

The present invention relates a method in which a base station transmits a downlink signal by using a plurality of layers comprises the steps of: multiplexing and transmitting dedicated reference signals for the plurality of layers on the basis of a reference signal pattern, wherein 24 resource element positions comprised in the reference signal pattern are set as 6 groups, the 6 groups are set as 2 high-level groups, the reference signal for the plurality of layer is split and placed in the 2 high-level groups, and the reference signal for 2 or more layers placed in the same group is subjected to code-division multiplexing.

16 Claims, 59 Drawing Sheets

(56) References Cited

U.S. PATENT DOCUMENTS

| | | | |
|---|---|---|---|
| 2008/0032630 A1* | 2/2008 | Kim et al. | 455/45 |
| 2008/0214198 A1* | 9/2008 | Chen et al. | 455/450 |
| 2009/0067391 A1* | 3/2009 | Shen et al. | 370/336 |
| 2010/0034299 A1* | 2/2010 | Love et al. | 375/260 |
| 2010/0061360 A1* | 3/2010 | Chen et al. | 370/342 |
| 2012/0327981 A1* | 12/2012 | Sayana et al. | 375/219 |

FOREIGN PATENT DOCUMENTS

| | | |
|---|---|---|
| JP | 2012-524092 | 10/2012 |
| KR | 10-2007-0101808 | 10/2007 |
| KR | 10-2008-0054164 | 6/2008 |

OTHER PUBLICATIONS

Motorola, LTE-A-DL-MIMO Enhancements, R1-084406, Nov. 10-14, 2008.*
CATT, Dual ports DRS design for BF, R1-090185, Jan. 12-16, 2009.*
LG Electronics, Downlink Reference Signal for Higher Order MIMO, R1-090218, Jan. 12-17, 2009.*
LG Electronics, Issues on Higher Order MIMO, R1-091217, Mar. 23-27, 2009.*
LG Electronics, Downlink MU-MIMO for LTE-Advanced, r1-091219, Mar. 23-27, 2009.*
Nokia et al., "Further considerations on UE-specific reference symbol multiplexing for LTE-Advanced downlink", R1-091757, 3GPP TSG RAN WG1 Meeting #57, May 2009.
Nortel, "Performance evaluation of multiple stream DRS design", R1-091385, 3GPP TSG RAN WG1 Meeting #56, Mar. 2009.
The State Intellectual Property Office of the People's Republic of China Application Serial No. 201080044817.9, Office Action dated Mar. 14, 2014, 7 pages.
NTT DOCOMO, "DL DM-RS Design for LTE-Advanced," 3GPP TSG RAN WG1 Meeting #57bis, R1-092798, Jun. 2009, 8 pages.
ZTE, "Performance evaluation of downlink DMRS design," 3GPP TSG RAN WG1 Meeting #58, R1-093194, Aug. 2009, 5 pages.
Huawei, "LTE-A downlink DM-RS pattern design," 3GPP TSG RAN WG1 Meeting #57, R1-091796, May 2009, 10 pages.
CMCC, "Discussions on DM-RS Design for LTE-A," 3GPP TSG RAN WG1 Meeting #57, R1-092189, May 2009, 4 pages.
Nokia, et al., "UE-specific reference symbol multiplexing for LTE-Advanced downlink," 3GPP TSG RAN WG1 Meeting #56bis, R1-091352, Mar. 2009, 7 pages.
LG Electronics, "DM-RS Design for Higher Order MIMO," 3GPP TSG RAN WG1 Meeting #58, R1-093236, Aug. 2009, 6 pages.

* cited by examiner

FIG. 5

|    | 0  | 1  | 2 | 3  | 4  | 5  | 6  | 0  | 1  | 2 | 3 | 4  | 5  | 6 |
|----|----|----|---|----|----|----|----|----|----|---|---|----|----|---|
| 0  |    |    |   |    |    |    |    |    |    |   |   |    |    |   |
| 1  |    |    |   |    |    |    | R5 |    |    |   |   |    | R5 |   |
| 2  | R1 | R3 |   |    | R0 |    |    | R1 | R2 |   |   | R0 |    |   |
| 3  |    |    |   | R5 |    |    |    |    |    | R5 |   |    |    |   |
| 4  |    |    |   |    |    |    |    |    |    |   |   |    |    |   |
| 5  | R0 | R2 |   |    | R1 |    | R5 | R0 | R3 |   |   | R1 | R5 |   |
| 6  |    |    |   |    |    |    |    |    |    |   |   |    |    |   |
| 7  |    |    |   | R5 |    |    |    |    |    | R5 |   |    |    |   |
| 8  | R1 | R3 |   |    | R0 |    |    | R1 | R2 |   |   | R0 |    |   |
| 9  |    |    |   |    |    |    | R5 |    |    |   |   |    | R5 |   |
| 10 |    |    |   |    |    |    |    |    |    |   |   |    |    |   |
| 11 | R0 | R2 |   | R5 | R1 |    |    | R0 | R3 | R5 |   | R1 |    |   |

FIG. 6
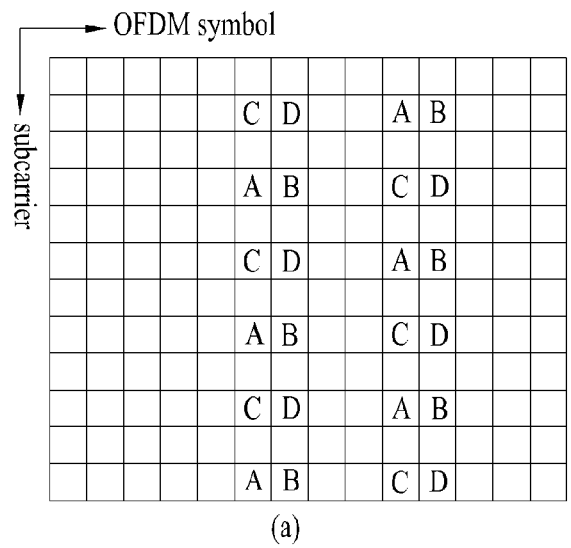
(a)
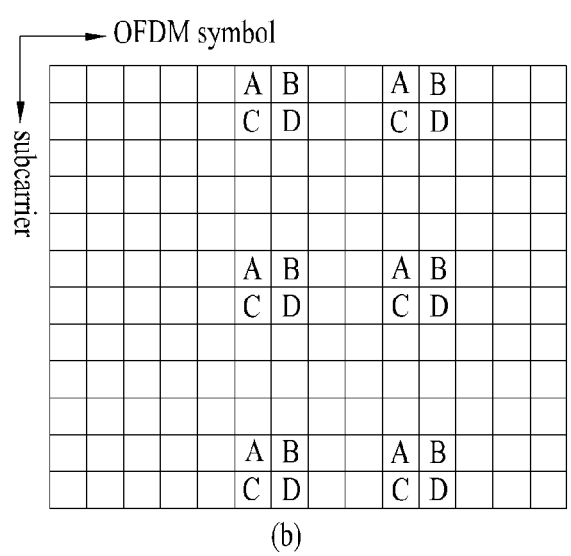
(b)
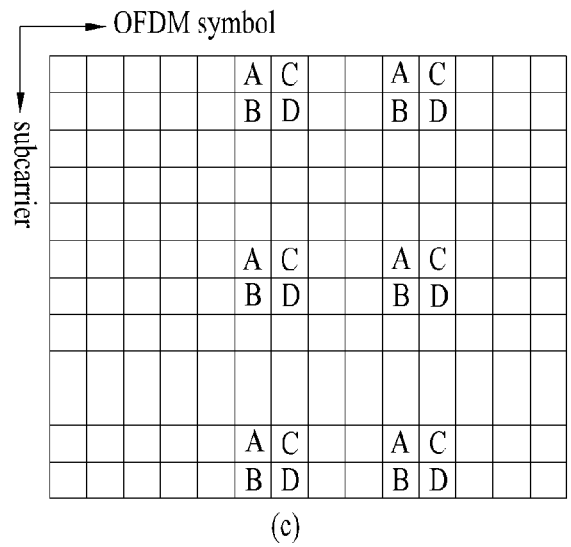
(c)

FIG. 7
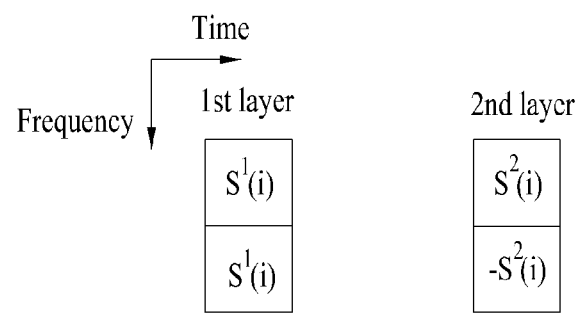
(a)
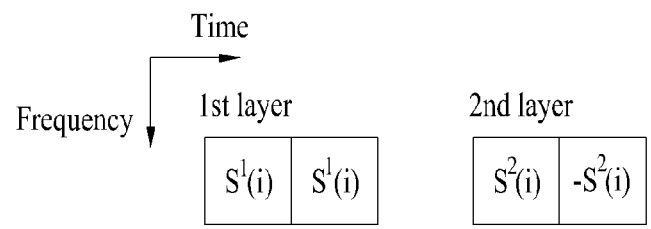
(b)

FIG. 8
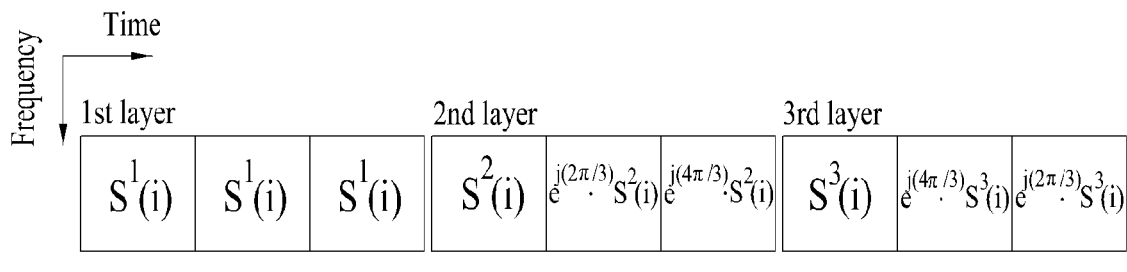
(a)
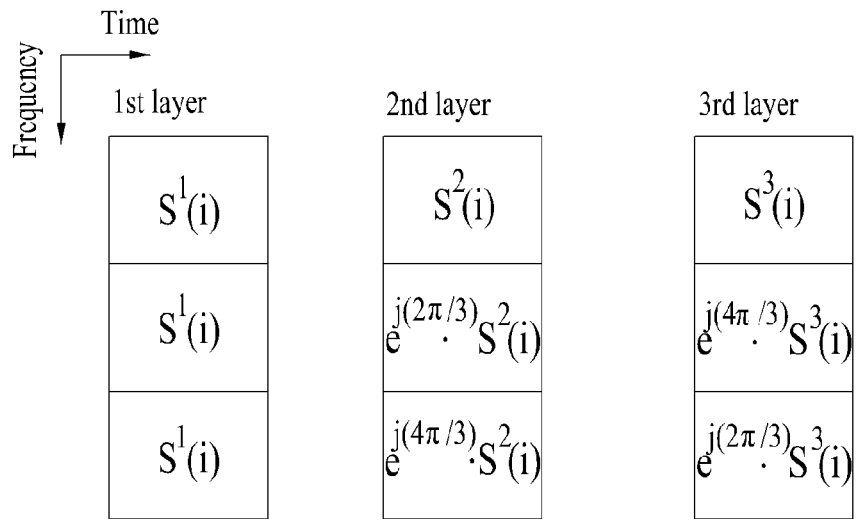
(b)

FIG. 12
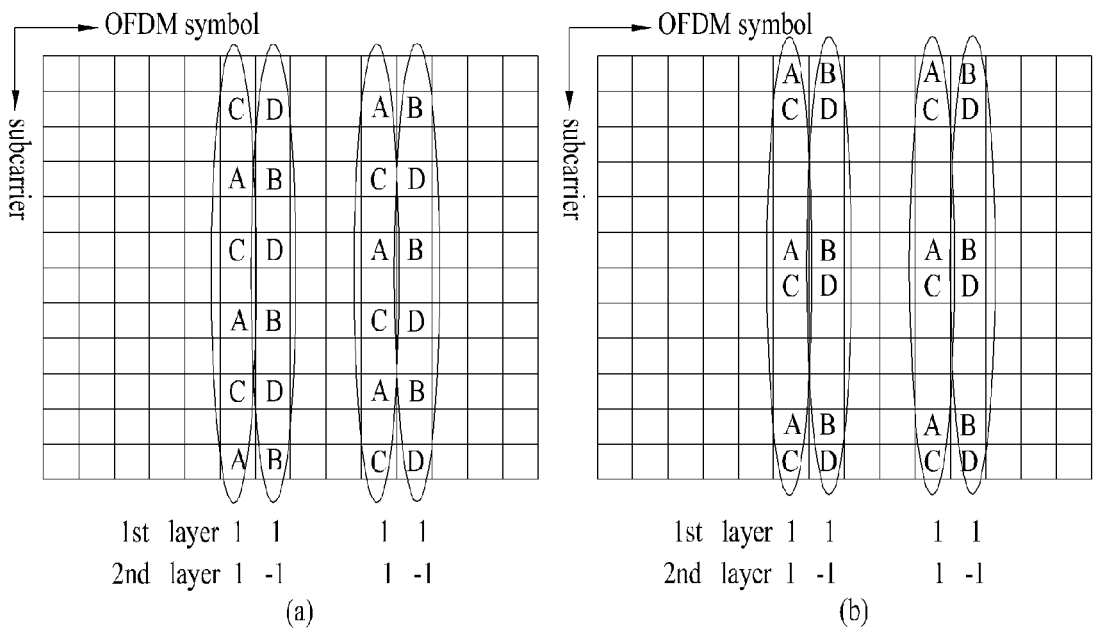
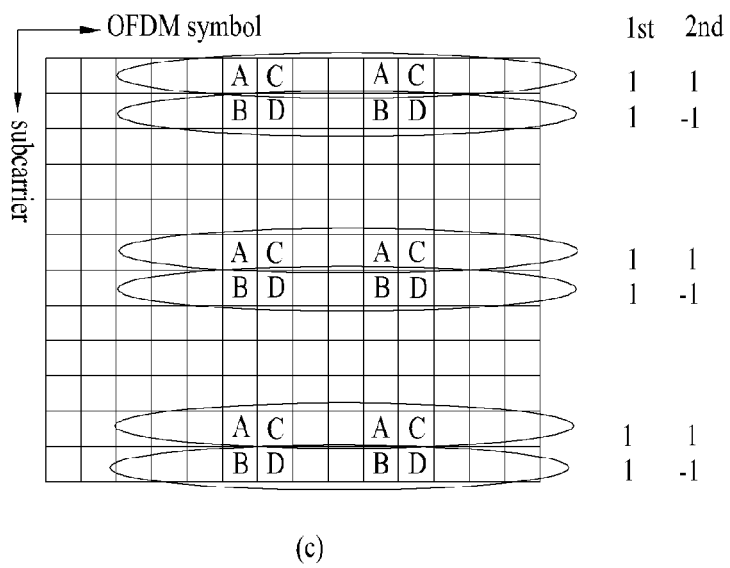

FIG. 14
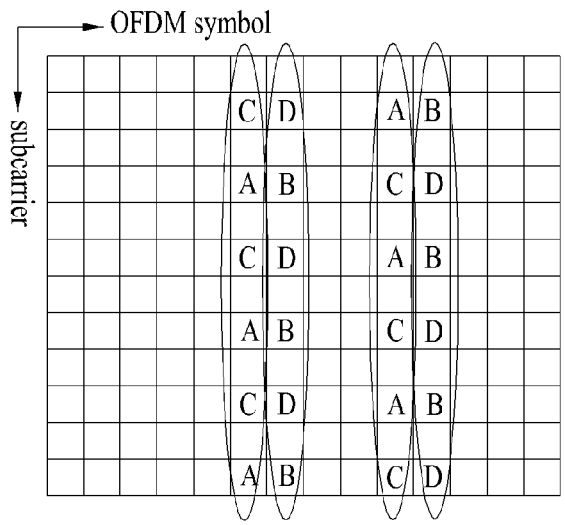
(a)
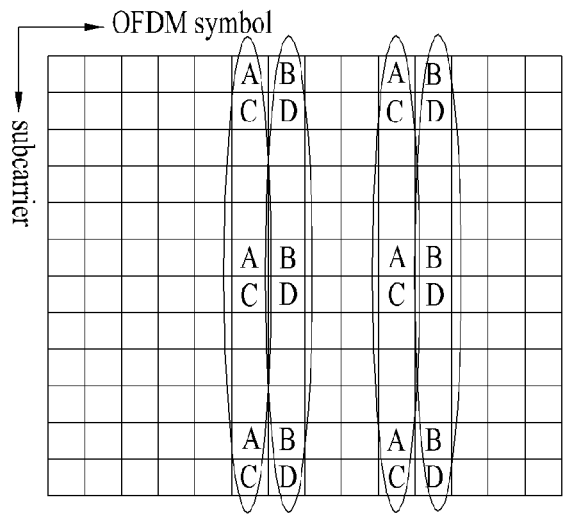
(b)
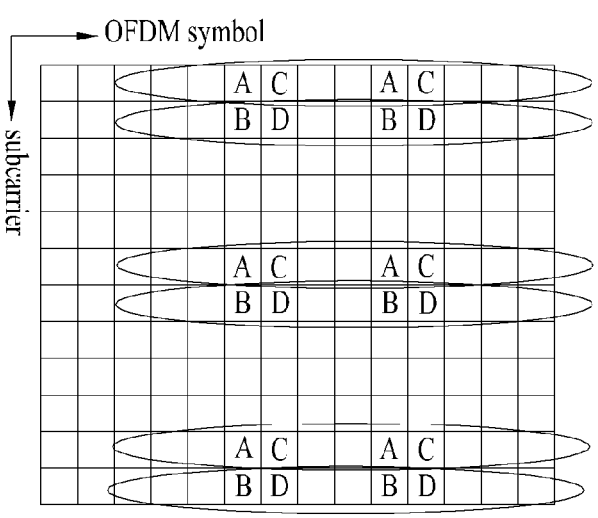
(c)

FIG. 15
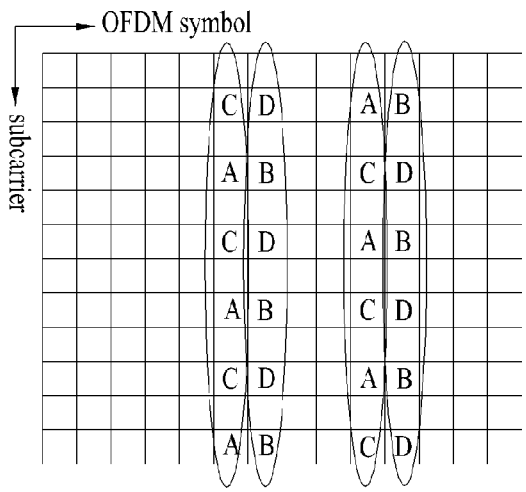
(a)
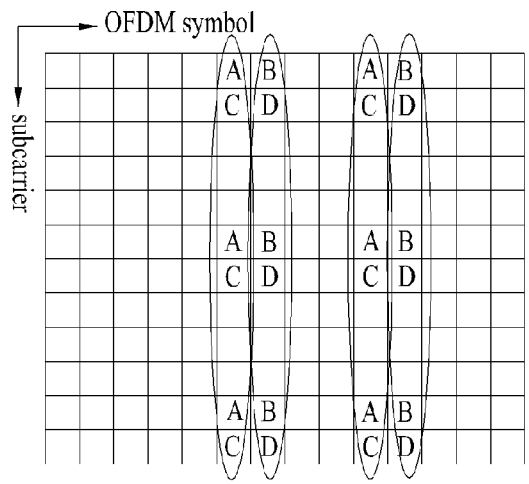
(b)
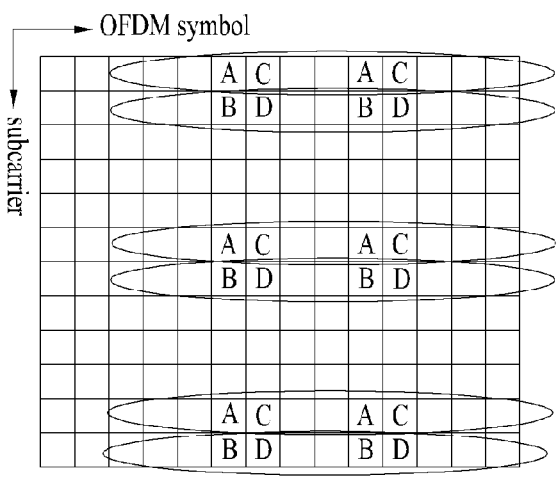
(c)

US 8,934,446 B2

TRANSMISSION METHOD AND DEVICE FOR A DOWNLINK REFERENCE SIGNAL

CROSS-REFERENCE TO RELATED APPLICATIONS

This application is the National Stage filing under 35 U.S.C. 371 of International Application No. PCT/KR2010/006750, filed on Oct. 4, 2010, which claims the benefit of U.S. Provisional Application Ser. No. 61/248,320, filed on Oct. 2, 2009, the contents of which are all incorporated by reference herein in their entirety.

TECHNICAL FIELD

The following description relates to a wireless communication system and, more particularly, to a method and device for transmitting a downlink reference signal in a wireless communication system.

BACKGROUND ART

A Multiple Input Multiple Output (MIMO) system refers to a system for improving data transmission/reception efficiency using multiple transmission antennas and multiple reception antennas. MIMO technology includes a spatial diversity scheme and a spatial multiplexing scheme. The spatial diversity scheme is suitable for data transmission of a user equipment (UE) which moves at a high speed, because transmission reliability is increased or a cell radius is increased through diversity gain. The spatial multiplexing scheme can increase data transfer rate without increasing system bandwidth by simultaneously transmitting different data.

In a MIMO system, each transmission antenna has an independent data channel. The transmission antenna may be a virtual antenna or a physical antenna. A receiver estimates a channel with respect to each transmission antenna and receives data transmitted from each transmission antenna. Channel estimation refers to a process of compensating for signal distortion due to fading so as to restore the received signal. Fading refers to a phenomenon in which the intensity of a signal is rapidly changed due to multi-path and time delay in a wireless communication system environment. For channel estimation, a reference signal known to both a transmitter and a receiver is necessary. The reference signal may be abbreviated to RS or referred to as a pilot signal according to the standard implemented.

A downlink reference signal is a pilot signal for coherent demodulation, such as a Physical Downlink Shared Channel (PDSCH), a Physical Control Format Indicator Channel (PCFICH), a Physical Hybrid Indicator Channel (PHICH), and a Physical Downlink Control Channel (PDCCH). The downlink reference signal includes a Common Reference Signal (CRS) shared among all UEs in a cell and a Dedicated Reference Signal (DRS) for a specific UE. The CRS may be referred to as a cell-specific reference signal. The DRS may be referred to as a UE-specific reference signal.

In arrangement of RSs on radio resources, several matters such as the amount of radio resources to be allocated to RSs, exclusive arrangement of DRSs and CRSs, a location of a control region in which a PDCCH is located, and density of DRSs are considered. If much resources are allocated to RSs, since the density of RSs is increased, high channel estimation performance can be obtained, but a data transfer rate may be relatively decreased. If few resources are allocated to RSs, a high data transfer rate can be obtained, but the density of RSs is decreased and thus channel estimation performance may deteriorate.

Accordingly, there is a need for a method of efficiently arranging DRSs on radio resources so as to increase channel estimation performance and prevent system overhead from being increased in MIMO transmission.

DISCLOSURE

Technical Problem

An object of the present invention is to provide a method of efficiently designing a dedicated reference signal in MIMO transmission and a method and device for transmitting dedicated reference signals appropriately arranged on radio resources so as to increase channel estimation performance and prevent system overhead from being increased.

Technical Solution

The object of the present invention can be achieved by providing a method of transmitting a downlink signal at a base station using a plurality of layers, the method including multiplexing and transmitting reference signals for the plurality of layers based on a reference signal pattern in a data region of a downlink subframe, and transmitting data for the plurality of layers in the data region of the downlink subframe, wherein the reference signals for the plurality of layers are dedicated reference signals used when a reception side demodulates the data for the plurality of layers, and wherein the multiplexing of the reference signals includes setting locations of 24 resource elements included in the reference signal pattern as six groups, setting the six groups as two high-level groups, dividing and arranging the reference signals for the plurality of layers on the two high-level groups, and code division multiplexing reference signals for two or more layers arranged on the same group.

If the number of layers is 2, reference signals for two layers may be arranged only on one high-level group.

If the number of layers is 3, 5 or 7, the number of layers, for which reference signals are arranged on one high-level group, may be greater than the number of layers, for which reference signals are arranged on another high-level group, by one.

If the number of layers is 4, 6 or 8, reference signals for the same number of layers may be arranged on the two high-level groups.

The code division multiplexing of the reference signals may use one or more of a scheme for multiplying an orthogonal code over different time resources on the same frequency resources and a scheme for multiplexing an orthogonal code over different frequency resources on the same time resources.

In another aspect of the present invention, there is provided a method of receiving a downlink signal at a user equipment using a plurality of layers, the method including receiving reference signals for the plurality of layers multiplexed based on a reference signal pattern in a data region of a downlink subframe, receiving data for the plurality of layers in the data region of the downlink subframe, and demodulating the data for the plurality of layers using the reference signals for the plurality of layers, wherein the reference signals for the plurality of layers are dedicated reference signals, and wherein the multiplexing of the reference signals includes setting locations of 24 resource elements included in the reference signal pattern as six groups, setting the six groups as two high-level groups, dividing and arranging the reference signals for the plurality of layers on the two high-level groups, and code division multiplexing reference signals for two or more layers arranged on the same group.

If the number of layers is 2, reference signals for two layers may be arranged only on one high-level group.

If the number of layers is 3, 5 or 7, the number of layers, for which reference signals are arranged on one high-level group, may be greater than the number of layers, for which reference signals are arranged on another high-level group, by one.

If the number of layers is 4, 6 or 8, reference signals for the same number of layers may be arranged on the two high-level groups.

The code division multiplexing of the reference signals may use one or more of a scheme for multiplying an orthogonal code over different time resources on the same frequency resources and a scheme for multiplexing an orthogonal code over different frequency resources on the same time resources.

In another aspect of the present invention, there is provided a base station for transmitting a downlink signal using a plurality of layers, including a plurality of antennas, a reception module configured to receive a signal from a user equipment through the plurality of antennas, a transmission module configured to transmit a signal to the user equipment through the plurality of antennas, and a processor configured to control the base station including the plurality of antennas, the reception module and the transmission module, wherein the processor is configured to multiplex and transmit reference signals for the plurality of layers based on a reference signal pattern in a data region of a downlink subframe through the transmission module and transmit data for the plurality of layers in the data region of the downlink subframe through the transmission module, wherein the reference signals for the plurality of layers are dedicated reference signals used when the user equipment demodulates the data for the plurality of layers, and wherein the multiplexing of the reference signals includes setting locations of 24 resource elements included in the reference signal pattern as six groups, setting the six groups as two high-level groups, dividing and arranging the reference signals for the plurality of layers on the two high-level groups, and code division multiplexing reference signals for two or more layers arranged on the same group.

In another aspect of the present invention, there is provided a user equipment for receiving a downlink signal using a plurality of layers, including a plurality of antennas, a reception module configured to receive a signal from a base station through the plurality of antennas, a transmission module configured to transmit a signal to the base station through the plurality of antennas, and a processor configured to control the user equipment including the plurality of antennas, the reception module and the transmission module, wherein the processor is configured to receive reference signals for the plurality of layers multiplexed based on a reference signal pattern in a data region of a downlink subframe through the reception module, receive data for the plurality of layers in the data region of the downlink subframe through the reception module, and demodulate the data for the plurality of layers using the reference signals for the plurality of layers, wherein the reference signals for the plurality of layers are dedicated reference signals, and wherein the multiplexing of the reference signals includes setting locations of 24 resource elements included in the reference signal pattern as six groups, setting the six groups as two high-level groups, dividing and arranging the reference signals for the plurality of layers on the two high-level groups, and code division multiplexing reference signals for two or more layers arranged on the same group.

The general description and the following detailed description of the present invention are exemplary and are provided as additional description of the claims.

Advantageous Effects

According to the embodiments of the present invention, it is possible to provide a method and device for transmitting dedicated reference signals appropriately arranged on radio resources so as to increase channel estimation performance and prevent system overhead from being increased.

The effects of the present invention are not limited to the above-described effects and other effects which are not described herein will become apparent to those skilled in the art from the following description.

DESCRIPTION OF DRAWINGS

FIG. 5 is a diagram illustrating a pattern of common reference signals (CRSs) and dedicated reference signals (DRSs) in a 3GPP LTE system.

FIG. 6 is a diagram illustrating a DRS pattern according to an embodiment of the present invention.

FIGS. 7 to 11 are diagrams illustrating various embodiments of the present invention of multiplexing DRSs using a CDM scheme.

FIGS. 12 to 15 are diagrams illustrating various embodiments of the present invention of multiplexing DRSs using the DRS pattern of FIG. 6.

BEST MODE

Figure 1:
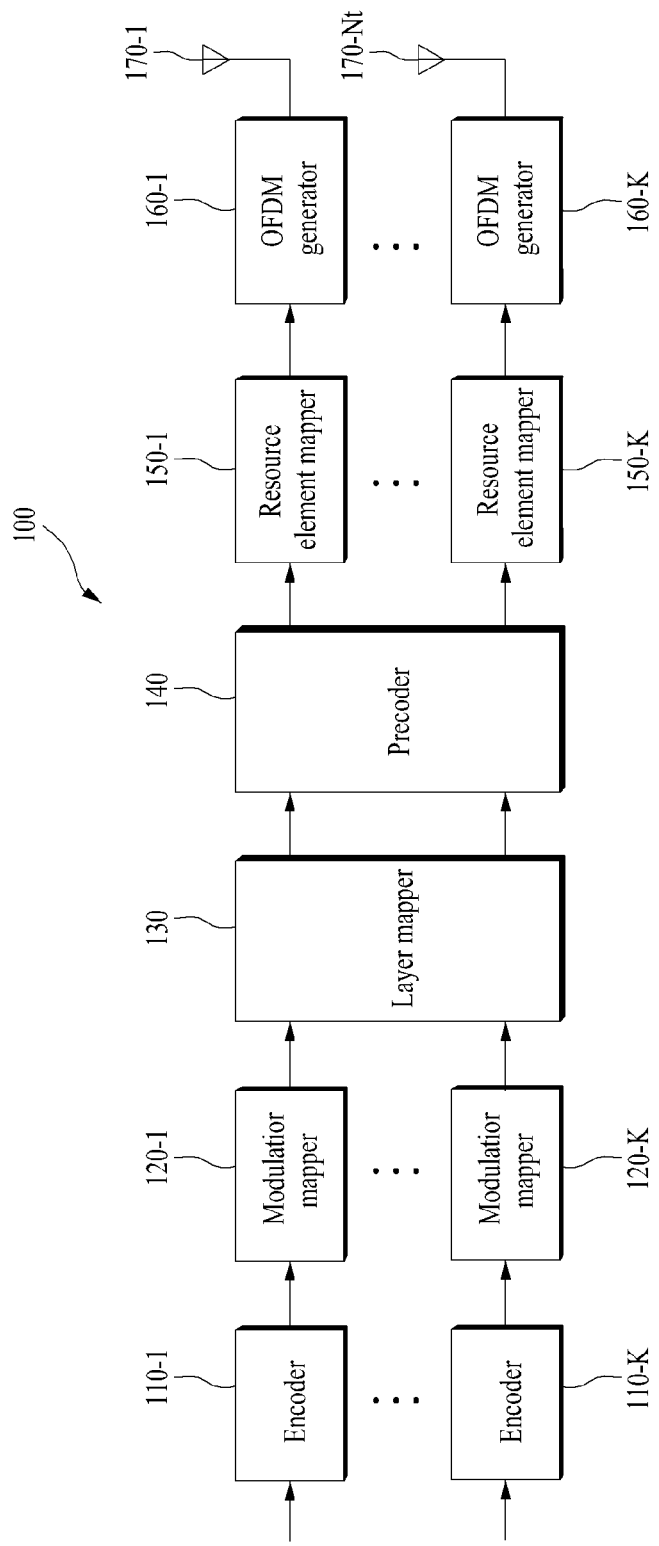
FIG. 1 is a block diagram showing the structure of a transmitter including multiple antennas.

The following embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

The embodiments of the present invention are disclosed on the basis of a data communication relationship between a base station and a terminal. In this case, the base station is used as a terminal node of a network via which the base station can directly communicate with the terminal. Specific operations to be conducted by the base station in the present invention may also be conducted by an upper node of the base station as necessary.

In other words, it will be obvious to those skilled in the art that various operations for enabling the base station to communicate with the terminal in a network composed of several network nodes including the base station will be conducted by the base station or other network nodes other than the base station. The term "Base Station (BS)" may be replaced with a fixed station, Node-B, eNode-B (eNB), or an access point as necessary. The term "relay" may be replaced with a Relay Node (RN) or a Relay Station (RS). The term "terminal" may also be replaced with a User Equipment (UE), a Mobile Station (MS), a Mobile Subscriber Station (MSS) or a Subscriber Station (SS) as necessary.

It should be noted that specific terms disclosed in the present invention are proposed for the convenience of description and better understanding of the present invention, and the use of these specific terms may be changed to another format within the technical scope or spirit of the present invention.

In some instances, well-known structures and devices are omitted in order to avoid obscuring the concepts of the present invention and the important functions of the structures and devices are shown in block diagram form. The same reference numbers will be used throughout the drawings to refer to the same or like parts.

Exemplary embodiments of the present invention are supported by standard documents disclosed for at least one of wireless access systems including an Institute of Electrical and Electronics Engineers (IEEE) 802 system, a $3^{rd}$ Generation Project Partnership (3GPP) system, a 3GPP Long Term Evolution (LTE) system, an LTE-Advanced (LTE-A) system, and a 3GPP2 system. In particular, the steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. The CDMA may be embodied with wireless (or radio) technology such as UTRA (Universal Terrestrial Radio Access) or CDMA2000. The TDMA may be embodied with wireless (or radio) technology such as GSM (Global System for Mobile communications)/GPRS (General Packet Radio Service)/EDGE (Enhanced Data Rates for GSM Evolution). The OFDMA may be embodied with wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). The UTRA is a part of the UMTS (Universal Mobile Telecommunications System). The 3GPP (3rd Generation Partnership Project) LTE (long term evolution) is a part of the E-UMTS (Evolved UMTS), which uses E-UTRA. The 3GPP LTE employs the OFDMA in downlink and employs the SC-FDMA in uplink. The LTE-Advanced (LTE-A) is an evolved version of the 3GPP LTE. WiMAX can be explained by an IEEE 802.16e (WirelessMAN-OFDMA Reference System) and an advanced IEEE 802.16m (WirelessMAN-OFDMA Advanced System). For clarity, the following description focuses on the 3GPP LTE and LTE-A system. However, the technical spirit of the present invention is not limited thereto.

In the following description, the term "rank" denotes the number of paths for independently transmitting signals, and the term "number of layers" denotes the number of signal streams transmitted through each path. In general, since a transmitter transmits layers corresponding in number to the number of ranks used for signal transmission, the rank has the same meaning as the number of layers unless otherwise noted.

FIG. 1 is a block diagram showing the structure of a transmitter including multiple antennas.

Referring to FIG. 1, a transmitter 100 includes encoders 110-1, ..., and 110-K, modulation mappers 120-1, and 120-K, a layer mapper 130, a predecoder 140, resource element mappers 150-1, and 150-K and OFDM signal generators 160-1, ..., and 160-K. The transmitter 100 includes Nt transmission antennas 170-1, ..., and 170-Nt.

The encoders 110-1, ..., and 110-K encode input data according to a predetermined coding method and generate coded data. The modulation mappers 120-1, ..., and 120-K map the coded data to modulation symbols representing locations on a signal constellation. A modulation scheme is not limited and may include m-phase shift keying (PSK) or m-quadrature amplitude modulation (QAM). For example, the m-PSK may be BPSK, QPSK or 8-PSK. The m-QAM may be 16-QAM, 64-QAM or 256-QAM.

The layer mapper 130 defines layers of the modulation symbols such that the precoder 140 distributes antenna-specific symbols into antenna paths. The layer is defined as an information path input to the precoder 140. The previous information path of the precoder 140 may be referred to as a virtual antenna or layer.

The precoder 140 processes the modulation symbols using a MIMO scheme according to the multiple transmission antennas 170-1, ..., and 170-Nt and outputs antenna-specific symbols. The precoder 140 distributes the antenna-specific symbols to the resource element mappers 150-1, ..., and 150-K of the antenna paths. Each information path transmitted to one antenna by the precoder 140 is referred to as a stream, which may be referred to as a physical antenna.

The resource element mappers 150-1, and 150-K allocate the antenna-specific symbols to appropriate resource elements and multiplex the antenna-specific symbols on a per-user basis. The OFDM signal generators 160-1, ..., and 160-K modulate the antenna-specific symbols using an OFDM scheme and output OFDM symbols. The OFDM signal generators 160-1, ..., and 160-K may perform Inverse Fast Fourier Transform (IFFT) with respect to the antenna-specific symbols and insert a cyclic prefix (CP) into time-domain symbols subjected to IFFT. The CP is a signal inserted into a guard interval in order to eliminate inter-symbol interference due to multiple paths in an OFDM transmission scheme. The OFDM symbols are transmitted via the transmission antennas 170-1, ..., and 170-Nt.

Figure 2:
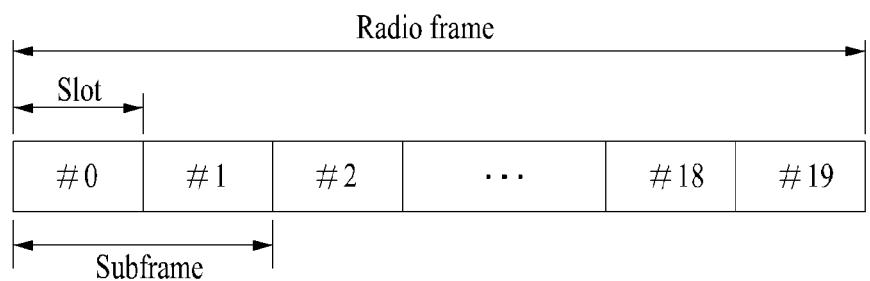
FIG. 2 is a diagram showing the structure of a downlink radio frame.

FIG. 2 is a diagram showing the structure of a downlink radio frame. Referring to FIG. 2, a downlink radio frame includes 10 subframes, and one subframe includes two slots. The downlink radio frame may be configured by frequency division duplexing (FDD) or time division duplexing (TDD). A time required for transmitting one subframe is referred to as a Transmission Time Interval (TTI). For example, one subframe may have a length of 1 ms and one slot may have a length of 0.5 ms. One slot may include a plurality of OFDM symbols in a time domain and include a plurality of Resource Blocks (RBs) in a frequency domain.

The number of OFDM symbols included in one slot may be changed according to the configuration of a Cyclic Prefix (CP). The CP includes an extended CP and a normal CP. For example, if the OFDM symbols are configured by the normal CP, the number of OFDM symbols included in one slot may be seven. If the OFDM symbols are configured by the extended CP, the length of one OFDM symbol is increased, the number of OFDM symbols included in one slot is less than that of the case of the normal CP. In the case of the extended CP, for example, the number of OFDM symbols included in one slot may be six. If a channel state is unstable, for example, if a user equipment (UE) moves at a high speed, the extended CP may be used in order to further reduce inter-symbol interference.

In case of using the normal CP, since one slot includes seven OFDM symbols, one subframe includes 14 OFDM symbols. At this time, the first two or three OFDM symbols of each subframe may be allocated to a Physical Downlink Control Channel (PDCCH) and the remaining OFDM symbols may be allocated to a Physical Downlink Shared Channel (PDSCH).

The structure of the radio frame is only exemplary. Accordingly, the number of subframes included in the radio frame, the number of slots included in the subframe or the number of symbols included in the slot may be changed in various manners.

Figure 3:
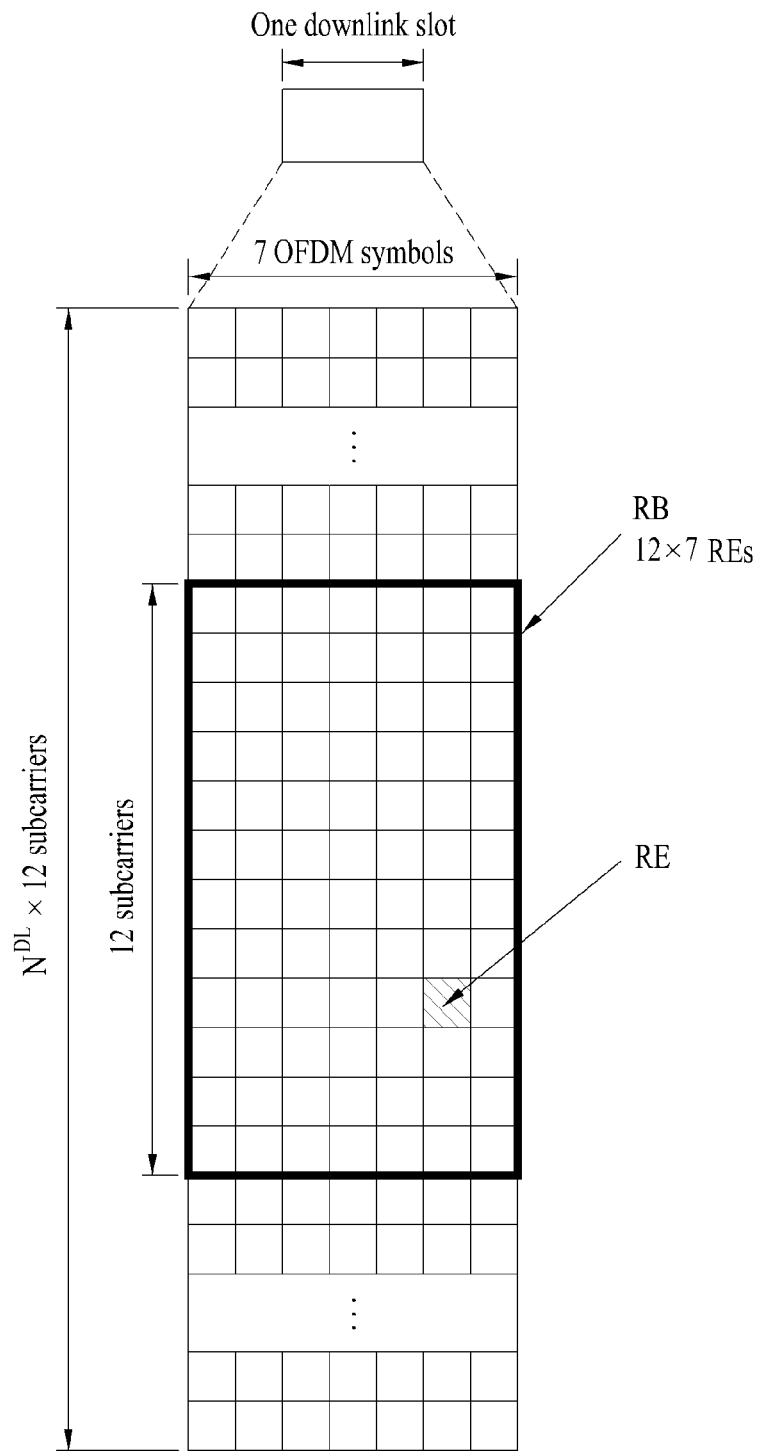
FIG. 3 is a diagram showing an example of a resource grid in one downlink slot.

FIG. 3 is a diagram showing an example of a resource grid of one downlink slot. OFDM symbols are configured by the normal CP. Referring to FIG. 3, the downlink slot includes a plurality of OFDM symbols in a time domain and includes a plurality of RBs in a frequency domain. Although one downlink slot includes seven OFDM symbols and one RB includes 12 subcarriers, the present invention is not limited thereto. Each element of the resource grid is referred to as a Resource Element (RE). For example, a RE a(k,l) refers to a RE located at a k-th subcarrier and an l-th OFDM symbol. In the case of the normal CP, one RB includes 12×7 REs (in the case of the extended CP, one RB includes 12×6 REs). Since an interval between subcarriers is 15 kHz, one RB includes about 180 kHz in the frequency domain. $N^{DL}$ denotes the number of RBs included in the downlink slot. The value of $N^{DL}$ is determined based on downlink transmission bandwidth set by scheduling of a base station.

Figure 4:
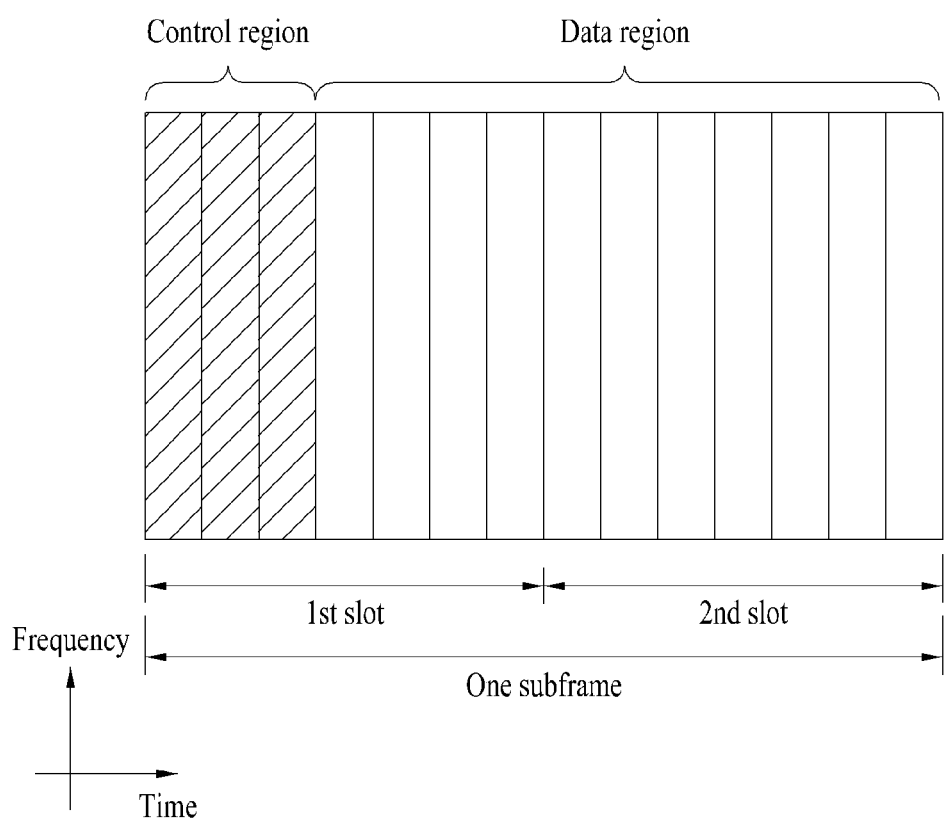
FIG. 4 is a diagram showing the structure of a downlink subframe.

FIG. 4 is a diagram showing the structure of a downlink subframe. A maximum of three OFDM symbols of a front portion of a first slot within one subframe corresponds to a control region to which control channels are allocated. The remaining OFDM symbols correspond to a data region to which Physical Downlink Shared Channels (PDSCHs) are allocated. Examples of the downlink control channels used in the 3GPP LTE system include, for example, a Physical Control Format Indicator Channel (PCFICH), a Physical Downlink Control Channel (PDCCH), a Physical Hybrid automatic repeat request Indicator Channel (PHICH), etc. The PCFICH is transmitted at a first OFDM symbol of a subframe, and includes information about the number of OFDM symbols used to transmit the control channel in the subframe. The PHICH includes a HARQ ACK/NACK signal as a response of uplink transmission. The control information transmitted through the PDCCH is referred to as Downlink Control Information (DCI). The DCI includes uplink or downlink scheduling information or an uplink transmit power control command for a certain UE group. The PDCCH may include resource allocation and transmission format of a Downlink Shared Channel (DL-SCH), resource allocation information of an Uplink Shared Channel (UL-SCH), paging information of a Paging Channel (PCH), system information on the DL-SCH, resource allocation of an higher layer control message such as a Random Access Response (RAR) transmitted on the PDSCH, a set of transmit power control commands for an individual UEs in a certain UE group, transmit power control information, activation of Voice over IP (VoIP), etc. A plurality of PDCCHs may be transmitted within the control region. A terminal may monitor the plurality of PDCCHs. The PDCCHs are transmitted on an aggregation of one or several consecutive control channel elements (CCEs). The CCE is a logical allocation unit used to provide the PDCCHs at a coding rate based on the state of a radio channel. The CCE corresponds to a plurality of resource element groups. The format of the PDCCH and the number of available bits are determined based on a correlation between the number of CCEs and the coding rate provided by the CCEs. The base station determines a PDCCH format according to a DCI to be transmitted to the terminal, and attaches a Cyclic Redundancy Check (CRC) to control information. The CRC is masked with a Radio Network Temporary Identifier (RNTI) according to an owner or usage of the PDCCH. If the PDCCH is for a specific terminal, a cell-RNTI (C-RNTI) of the terminal may be masked to the CRC. Alternatively, if the PDCCH is for a paging message, a paging indicator identifier (P-RNTI) may be masked to the CRC. If the PDCCH is for system information (more specifically, a system information block (SIB)), a system information identifier and a system information RNTI (SI-RNTI) may be masked to the CRC. To indicate a random access response that is a response for transmission of a random access preamble of the terminal, a random access-RNTI (RA-RNTI) may be masked to the CRC.

FIG. 5 is a diagram illustrating a pattern of common reference signals (CRSs) and dedicated reference signals (DRSs) in a 3GPP LTE system.

FIG. 5 is a diagram illustrating resource elements, to which CRSs and DRSs are mapped, in the case of a normal CP. In FIG. 5, a horizontal axis denotes a time domain and a vertical axis denotes a frequency domain. In association with an RS pattern, in the case of the normal CP, 14 OFDM symbols in the time domain and 12 subcarriers in the frequency domain may be used as a basic unit of a resource block (RB). In the case of an extended CP, 12 OFDM symbols and 12 subcarriers may be used as a basic unit of a RB for an RS pattern. In the time-frequency domain shown in FIG. 5, a smallest rectangular region corresponds to one OFDM symbol in the time domain and one subcarrier in the frequency domain.

In FIG. 5, Rp denotes a resource element used to transmit an RS via a p-th antenna port. For example, R0 to R3 denotes resource elements to which CRSs transmitted via 0th to $3^{rd}$ antenna ports are mapped, and R5 denotes a resource element to which a DRS transmitted via a fifth antenna port is mapped. The CRSs transmitted via $0^{th}$ and $1^{st}$ antenna ports are transmitted at an interval of six subcarriers (based on one antenna port) on $0^{th}$, $4^{th}$, $7^{th}$ and $11^{th}$ OFDM symbols. CRSs transmitted via $2^{nd}$ and $3^{rd}$ antenna ports are transmitted at an interval of six subcarriers on first and eighth OFDM symbols. DRSs are transmitted at an interval of four subcarriers on third, sixth, ninth and twelfth OFDM symbols. Accordingly, 12 DRSs are transmitted within two contiguous RBs (RB pair) in the time domain of one subframe.

A CRS (or a cell-specific RS) is used to estimate a channel of a physical antenna port and is commonly transmitted to all UEs located within a cell. Channel information estimated by a UE through a CRS may be used to demodulate data transmitted using transmission methods such as single antenna transmission, transmit diversity, closed-loop spatial multiplexing, open-loop spatial multiplexing, and multi-user MIMO (MU-MIMO), and may be used to enable a UE to measure a channel and report the channel measurement to a base station. In order to enhance channel estimation performance through a CRS, the locations of the CRSs in the subframe may be shifted on a per cell basis to be different from each other. For example, if the RSs are located at an interval of three subcarriers, the CRS may be arranged on a 3k-th subcarrier in a certain cell and the CRS may be located on a (3k+1)-th subcarrier in another cell.

A DRS (or a UE-specific RS) is used for data demodulation. By utilizing a precoding weight used for a specific UE upon MIMO transmission in an RS without change, a UE can estimate an equivalent channel, in which the precoding weight transmitted through each transmission antenna and a transmission channel are combined, when receiving the RS. In addition, the DRS requires orthogonality between transmission layers.

The conventional 3GPP LTE system supports a maximum of 4-transmission (Tx) antenna transmission and defines a cell-specific RS for supporting a single Tx antenna, a 2-Tx antenna and a 4-Tx antenna and a UE-specific RS for Rank 1 beamforming. Meanwhile, in an LTE-Advanced (LTE-A) system which is evolved from the 3GPP LTE system, high order MIMO, multi-cell transmission or advanced multi-user (MU)-MIMO may be considered. In order to support efficient RS management and an advanced transmission method, data demodulation based on a DRS is considered. In addition, the DRS is preferably set such that downlink transmission by a base station is only present in a scheduled resource block and layer.

In arrangement of the DRS for supporting maximum Rank 8 transmission on radio resources, DRSs of layers may be multiplexed and arranged. Time division multiplexing (TDM) indicates that DRSs for two or more layers are arranged on different time resources (e.g., OFDM symbols). Frequency division multiplexing (FDM) indicates that DRSs for two or more layers are arranged on different frequency resources (e.g., subcarriers). Code division multiplexing (CDM) indicates that DRSs for two or more layers arranged on the same radio resources are multiplexed using an orthogonal sequence (or orthogonal covering).

Hereinafter, embodiments of the present invention for a DRS pattern capable of enabling a reception device to perform efficient channel estimation and data restoration with respect to maximum Rank 8 transmission in consideration of the above description will be described.

FIG. 6 is a diagram illustrating a DRS pattern according to an embodiment of the present invention. DRS patterns of FIGS. 6(a), 6(b) and 6(c) are referred to as embodiments (a), (b) and (c) of the present invention, respectively.

Locations of DRSs for maximum Rank 8 transmission are denoted by A, B, C and D on one RB (an RB including 14 OFDM symbols and 12 subcarriers in the case of a normal CP or an RB including 12 OFDM symbols and 12 subcarriers in the case of an extended CP).

In FIGS. 6(a) to 6(c), A, B, C and D denoting DRS locations may be arranged on six REs on one RB. For example, DRSs denoted by A may be located on two OFDM symbols in the time domain and may be located on three subcarriers in the frequency domain on one OFDM symbol. DRSs may be designed to be located at an arbitrary interval in the time domain and at the same interval in the frequency domain. DRSs denoted by B, C and D may be located on REs in a similar manner and REs on which DRSs denoted by A, B, C and D are located do not overlap each other. Accordingly, the DRSs denoted by A, B, C and D may be located on 24 REs on one RB.

In FIG. 6(a), A, B, C and D denoting DRS locations may be arranged on two OFDM symbols and may be arranged on different frequencies (subcarriers) on the two OFDM symbols. A DRS located on any one of the two OFDM symbols may have a frequency offset of a constant interval from the DRS located on the other OFDM symbol thereof. The frequency offset may indicate one or more subcarrier offset or ½ of a frequency interval between DRSs arranged on any one OFDM symbol. For example, in FIG. 6(a), the DRSs denoted by A are located on a sixth OFDM symbol and a tenth OFDM symbol on one RB and the frequency location of the DRS on the sixth OFDM symbol has an offset of two subcarriers from the frequency location of the DRS on the tenth OFDM symbol. The DRSs denoted by A, B, C and D may be arranged so as not to be contiguous to each other in the frequency domain and may be arranged contiguously or at an arbitrary interval in the time domain.

In FIGS. 6(b) and 6(c), A, B, C and D denoting the DRS locations may be arranged on two OFDM symbols and may be arranged on the same frequency (subcarrier) on the two OFDM symbols. For example, in FIGS. 6(b) and 6(c), the DRSs denoted by A are located on a sixth OFDM symbol and a tenth OFDM symbol on one RB and the frequency location of the DRS on the sixth OFDM symbol is equal to the frequency location of the DRS on the tenth OFDM symbol. DRSs denoted by A, B, C and D may be arranged contiguously in the frequency domain and may be arranged contiguously or at an arbitrary interval in the time domain.

When the REs on which DRSs are arranged are located on one RB, the following matters may be considered.

DRSs may not be arranged in a control region (first three OFDM symbols of a first slot) in which a PDCCH is located. In addition, DRSs may not be arranged on OFDM symbols on which CRSs are located (e.g., first, second and fifth OFDM symbols of a first slot and first, second and fifth OFDM symbols of a second slot). In addition, in the case in which a relay is used, DRSs may not be arranged on last two OFDM symbols of a second slot, in consideration that a guard time for switching a transmission mode and a reception mode of the relay is set in a last OFDM symbol of a second slot and a sounding RS is located on an OFDM symbol located just before the last OFDM symbol.

If all the above-described restrictions in arrangement of DRSs are applied, channel estimation performance may deteriorate by DRSs. That is, since channels for REs on which DRSs are not located are estimated so as to restore data by interpolating and/or extrapolating the DRSs, if the DRSs are located on specific OFDM symbols, channel estimation performance is relatively inefficient as compared to the case in which the DRSs are dispersed and arranged on several OFDM symbols. Accordingly, DRSs may be appropriately arranged as necessary. That is, the above-described restrictions in arrangement of DRSs may not be considered or at least one restriction may be considered.

In association with a DRS arrangement pattern according to the present invention, A, B, C and D indicating DRS locations may be grouped as shown in Table 1.

TABLE 1

|  | Case 1 | Case 2 | Case 3 |
| --- | --- | --- | --- |
| DRS group #0 | A, B | A, C | A, D |
| DRS group #1 | C, D | B, D | B, C |

A DRS group #0 and a DRS group #1 are used for different antenna port (or layer) groups. Here, the antenna port may refer to a virtual antenna port or a physical antenna port. For example, the DRS group #0 may indicate the DRS locations for first to fourth antenna ports and the DRS group #1 may indicate the DRS locations for fifth to eighth antenna ports. Although A and B indicate the DRS locations for one antenna port group and C and D indicate the DRS locations for another antenna port group in the following embodiment as shown in Case 1 of Table 1, the present invention is not limited thereto and A and C/B and D or A and D/B and C may indicate the DRS locations for different antenna port groups as shown in Case 2 or Case 3 of Table 1.

In addition, a determination as to which antenna port (or layer) for which the DRS locations are indicated by A, B, C and D is made according to the DRS multiplexing scheme. For example, in A and B of the DRS group #0, A may indicate a DRS location for one antenna port and B may indicate a DRS location for another antenna port in the case of TDM or FDM. In the case of CDM, A and B indicate DRS locations for one antenna port and different antenna ports are distinguished by an orthogonal code.

Hereinafter, a DRS group used in the case of Ranks 1 to 8 will be described.

In the following description of the present specification, for convenience of description, the terms "layer", "virtual antenna port" and "physical antenna port" are collectively referred to as "layer". That is, the term "layer" used in the present specification may be replaced with the terms "virtual antenna port" or "physical antenna port" as necessary.

In the case of Rank 1 transmission, one of the DRS groups #0 and #1 is used and all DRS locations in the DRS group are used. For example, if the DRS group #0 is used, DRSs for a corresponding layer are arranged on all REs denoted by A and B and DRSs for one layer are arranged on 12 REs within one RB.

In the case of Rank 2 transmission, one of the DRS groups #0 and #1 is used and DRSs for two layers may be multiplexed within the DRS group using a TDM/FDM/CDM scheme. For example, if the DRS group #0 is used, an RE denoted by A indicates a DRS location for a first layer and an RE denoted by B indicates a DRS location for a second layer in the case of TDM/FDM. In this case, FIG. 6(a) or 6(b) shows a TDM scheme (A and B are arranged on different OFDM symbols on the same subcarrier to be distinguished) and FIG. 6(c) shows an FDM scheme (A and B are arranged on different subcarriers on the same OFDM symbol to be distinguished). Meanwhile, in a CDM scheme, both A and B indicate DRS locations for first and second layers and the DRSs for the first and second layers may be distinguished by a code.

In the case of Rank 3 transmission, both the DRS groups #0 and #1 may be used in order to multiplex DRSs for three different layers according to a TDM/FDM scheme. For example, DRSs for the first and second layers may be arranged on A and B of the DRS group #0 and DRSs for the third layer may be arranged on C (or D) of the DRS group #1. Meanwhile, in the case of Rank 3 transmission, if DRSs for three different layers are multiplexed according to the CDM scheme, both the DRS groups #0 and #1 may be used or one of the DRS groups #0 and #1 may be used. This will be described in detail below.

In the case of Rank 4 transmission, both the DRS groups #0 and #1 may be used in order to multiplex DRSs for four different layers according to a TDM/FDM scheme. For example, DRSs for the first and second layers may be arranged on A and B of the DRS group #0 and DRSs for the third and fourth layers may be arranged on C and D of the DRS group #1. Meanwhile, in the case of Rank 4 transmission, if DRSs for four different layers are multiplexed according to the CDM scheme, both the DRS groups #0 and #1 may be used or one of the DRS groups #0 and #1 may be used.

The above description may be commonly applied to various embodiments of the present invention.

Hereinafter, a CDM scheme using orthogonal covering in a DRS multiplexing scheme will be described. In the CDM of DRSs, orthogonal covering such as a Walsh code or a Discrete Fourier Transform (DFT) matrix may be used.

The Walsh code is composed of a square matrix and $2^n$ signals may be distinguished using a Walsh code matrix. The Walsh code may be composed of a matrix shown in Table 2.

TABLE 2

$$H_n = \begin{bmatrix} H_{n-1} & H_{n-1} \\ H_{n-1} & -H_{n-1} \end{bmatrix},$$

where $H_1 = 1$ $$H_2 = \begin{bmatrix} 1 & 1 \\ 1 & -1 \end{bmatrix},$$

$$H_3 = \begin{bmatrix} 1 & 1 & 1 & 1 \\ 1 & -1 & 1 & -1 \\ 1 & 1 & -1 & -1 \\ 1 & -1 & -1 & 1 \end{bmatrix}$$

A DFT matrix is composed of a square matrix and has a size of N×N (N being a natural number). If the DFT matrix is used for an orthogonal sequence for CDM of DRSs, a normalization factor $1/\sqrt{N}$ may be omitted. The DFT matrix may be composed of a matrix shown in Table 3.

TABLE 3

$$D_N = \frac{1}{\sqrt{N}} \begin{bmatrix} 1 & 1 & \cdots & 1 \\ 1 & e^{j2\pi \frac{1 \cdot 1}{N}} & \cdots & e^{j2\pi \frac{1 \cdot (k-1)}{N}} \\ \vdots & \vdots & \ddots & \vdots \\ 1 & e^{j2\pi \frac{(n-1) \cdot 1}{N}} & \cdots & e^{j2\pi \frac{(n-1) \cdot (k-1)}{N}} \end{bmatrix}$$

$$D_1 = 1, D_2 = \frac{1}{\sqrt{2}} \begin{bmatrix} 1 & 1 \\ 1 & -1 \end{bmatrix}$$

$$D_3 = \frac{1}{\sqrt{3}} \begin{bmatrix} 1 & 1 & 1 \\ 1 & e^{j\frac{2\pi}{3}} & e^{j\frac{4\pi}{3}} \\ 1 & e^{j\frac{4\pi}{3}} & e^{j\frac{8\pi}{3}} \end{bmatrix}$$

$$D_4 = \frac{1}{\sqrt{4}} \begin{bmatrix} 1 & 1 & 1 & 1 \\ 1 & j & -1 & -j \\ 1 & -1 & 1 & -1 \\ 1 & -j & -1 & j \end{bmatrix}$$

A method of multiplexing DRSs using orthogonal covering according to a CDM scheme will be described with reference to FIG. 7. In FIG. 7, a sequence transmitted as a DRS is denoted by $S^n(i)$ and n denotes a layer index. Here, the sequence $S^n(i)$ may be a specific code string or an arbitrary value.

As shown in FIG. 7(a), DRSs located at the same time location and different frequency locations may be multiplexed using the above orthogonal covering. Although REs on which DRSs are arranged are shown as being contiguous to each other in the frequency domain in FIG. 7(a), the present invention is not limited thereto and REs on which DRSs are arranged may not be contiguous to each other in the frequency domain. In FIG. 7(a), REs on which DRSs for the first and second layers are arranged denote REs of the same location.

For example, when DRSs are applied in order to distinguish between channels of two layers, at least two DRSs may be used. In order to estimate the channel of the first layer, the same sequence $S^1(i)$ is transmitted at the two DRS locations. Accordingly, $S^1(i)$ and $S^1(i)$ may be transmitted through two DRS locations for the first layer, which may be expressed by multiplication of the sequence transmitted at two DRS locations for the first layer by an orthogonal cover (1, 1) of a first row of an orthogonal matrix (a Walsh matrix $H_2$ or a DFT matrix $D_2$) having a size of 2.

In addition, in order to estimate the channel of the second layer, the same sequence $S^2(i)$ is transmitted at the two DRS locations, and one of the two DRSs may be multiplied by an orthogonal phase (e.g., "−1"). Accordingly, $S^2(i)$ and $-S^2(i)$ may be transmitted at two DRS locations for the second layer, which may be expressed by multiplication of the sequence transmitted at two DRS locations for the second layer by an orthogonal cover (1, −1) of a second row of an orthogonal matrix (Walsh matrix $H_2$ or a DFT matrix $D_2$) having a size of 2. Here, the sequence $S^1(i)$ for the first layer and the sequence $S^2(i)$ for the second layer may be the same or different.

As shown in FIG. 7(b), DRSs located at the same frequency location and different time locations may be multiplexed using the above orthogonal covering. Although REs on which DRSs are arranged are shown as being contiguous to each other in the time domain in FIG. 7(b), the present invention is not limited thereto and REs on which DRSs are arranged may not be contiguous to each other in the time domain. In FIG. 7(b), REs on which DRSs for the first and second layers are arranged denote REs of the same location.

For example, in order to estimate the channel of the first layer, the same sequence $S^1(i)$ is transmitted at the two DRS locations. Accordingly, $S^1(i)$ and $S^1(i)$ may be transmitted at two DRS locations for the first layer, which may be expressed by multiplication of the sequence transmitted at two DRS locations for the first layer by an orthogonal cover (1, 1) of a first row of an orthogonal matrix (a Walsh matrix $H_2$ or a DFT matrix $D_2$) having a size of 2.

In addition, in order to estimate the channel of the second layer, the same sequence $S^2(i)$ is transmitted at the two DRS locations, and one (e.g., a DRS denoted by B) of the two DRSs may be multiplied by an orthogonal phase (e.g., "−1"). Accordingly, $S^2(i)$ and $-S^2(i)$ may be transmitted at two DRS locations for the second layer, which may be expressed by multiplication of the sequence transmitted at two DRS locations for the second layer by an orthogonal cover (1, −1) of a second row of an orthogonal matrix (a Walsh matrix $H_2$ or a DFT matrix $D_2$) having a size of 2.

Hereinafter, in the case of Ranks 3 and 4, a method of multiplexing DRSs using orthogonal covering according to a CDM scheme will be described.

The case in which at least three DRSs are used when DRSs are transmitted in order to distinguish among channels of three layers will be described with reference to FIG. 8. Three DRS locations may become three different subcarrier locations on the same OFDM symbol (FIG. 8(a)) or may become three different OFDM symbol locations on the same subcarrier (FIG. 8(b)). Although REs on which DRSs are arranged are shown as being contiguous to each other in the time or frequency domain in FIG. 8, the present invention is not limited thereto and REs on which DRSs are arranged may not be contiguous to each other in the time or frequency domain. In FIG. 8, REs on which DRSs for the first to third layers are arranged denote REs of the same location.

For example, in order to estimate the channel of the first layer, the same sequence $S^1(i)$ is transmitted at the three DRS locations. Accordingly, $S^1(i)$, $S^1(i)$ and $S^1(i)$ may be transmitted at three DRS locations, which will be expressed by multiplication of the sequence transmitted at three DRS locations for the first layer by an orthogonal cover (1, 1, 1) of a first row of an orthogonal matrix (DFT matrix $D_3$) having a size of 3.

In addition, in order to estimate the channel of the second layer, the same sequence $S^2(i)$ is transmitted at the three DRS locations, and any two DRSs among three DRSs may be multiplied by an orthogonal phase. For example, if a DFT matrix is used as an orthogonal sequence, multiplied orthogonal phases may be $e^{j(4\pi/3)}$ and $e^{j(4\pi/3)}$. In this case, $S^2(i)$, $e^{j(2\pi/3)} \cdot S^2(i)$ and $e^{j(4\pi/3)} \cdot S^2(i)$ may be transmitted at three DRS locations for the second layer, which will be expressed by multiplication of the sequence transmitted at three DRS locations for the second layer by an orthogonal cover (1, $e^{j(2\pi/3)}$, $e^{j(4\pi/3)}$) of a second row of an orthogonal matrix (a DFT matrix $D_3$) having a size of 3.

In addition, in order to estimate the channel of the third layer, the same sequence $S^3(i)$ is transmitted at the three DRS locations, and any two DRSs among three DRSs may be multiplied by $e^{j(4\pi/3)}$ and $e^{j(8\pi/3)}(=e^{j(2\pi/3)})$. In this case, $S^3(i)$, $e^{j(4\pi/3)} \cdot S^3(i)$ and $e^{j(2\pi/3)} \cdot S^3(i)$ may be transmitted at three DRS locations for the third layer, which will be expressed by multiplication of the sequence transmitted at three DRS locations for the third layer by an orthogonal cover (1, $e^{j(4\pi/3)}$, $e^{j(8\pi/3)}$) of a third row of an orthogonal matrix (a DFT matrix $D_3$) having a size of 3. Here, the sequences $S^1(i)$, $S^2(i)$ and $S^3(i)$ may be the same or different.

Figure 9:
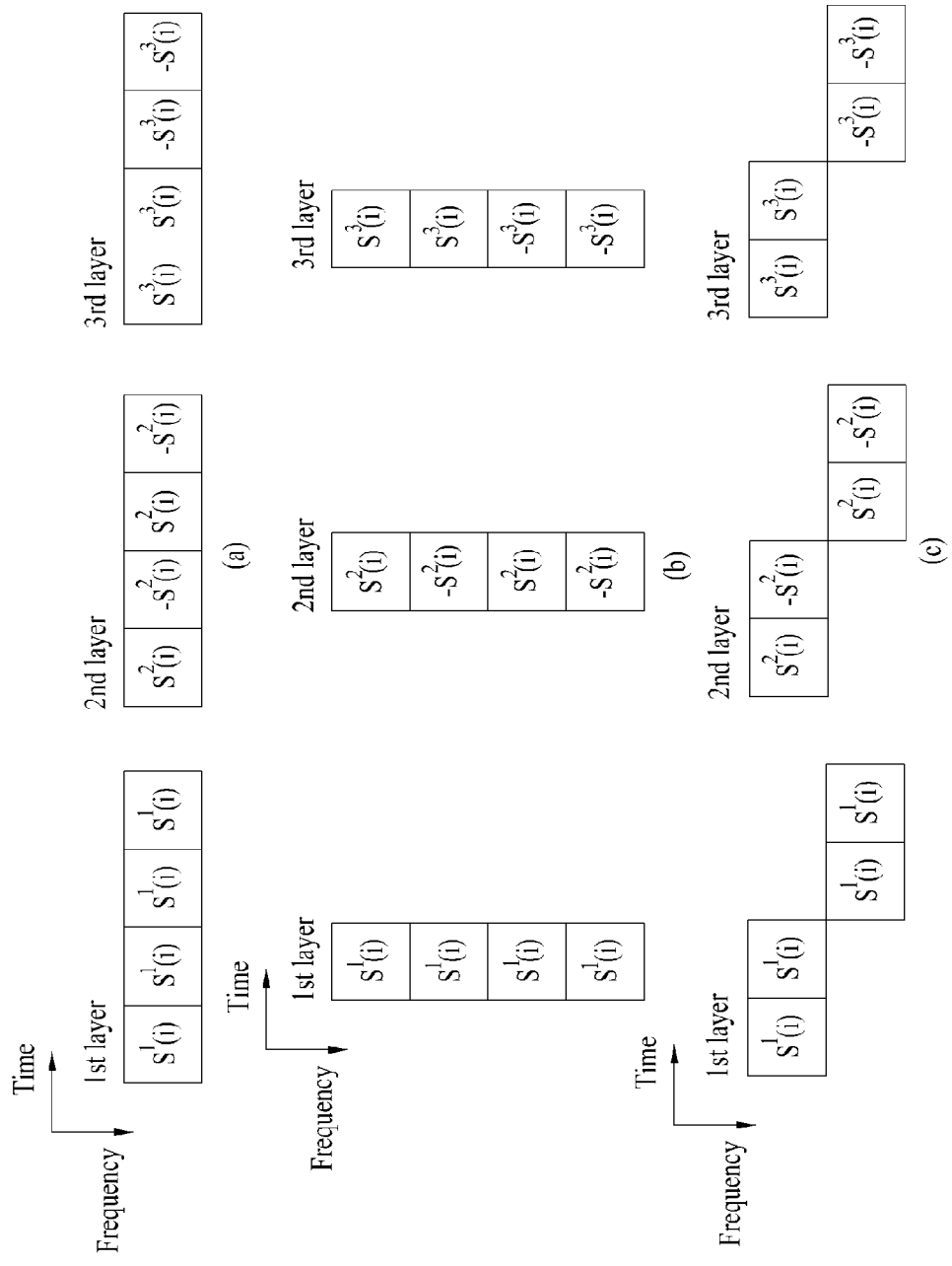

The case in which at least four DRSs are used when DRSs are transmitted in order to distinguish among channels of three layers will be described with reference to FIG. 9. Four DRS locations may become four different subcarrier locations on the same OFDM symbol (FIG. 9(a)) or may become four different OFDM symbol locations on the same subcarrier (FIG. 9(b)). Alternatively, four DRS locations may become two different OFDM symbol locations on one subcarrier and two different OFDM symbol locations on another subcarrier (FIG. 9(c)). Although REs on which DRSs are arranged are shown as being contiguous to each other in the time or frequency domain in FIG. 9, the present invention is not limited thereto and REs on which DRSs are arranged may not be contiguous to each other in the time or frequency domain. In FIG. 9, REs on which DRSs for the first to third layers are arranged denote REs of the same location.

In the case in which at least four DRSs are used when DRSs are transmitted in order to distinguish among channels of three layers, any three rows or columns of a DFT matrix $D_4$ having a size of 4 or a Walsh matrix $H_3$ having a size of 4 may be used as orthogonal covering. For example, it is assumed that first to third rows of the Walsh matrix $H_3$ may be used. For example, in order to estimate the channel of the first layer, the same sequence $S^1(i)$ is transmitted at the four DRS locations and is multiplied by a first row (1, 1, 1, 1) of the Walsh matrix $H_3$. That is, $S^1(i)$, $S^1(i)$, $S^1(i)$ and $S^1(i)$ may be transmitted at four DRS locations. In order to estimate the channel of the second layer, the same sequence $S^2(i)$ is transmitted at the four DRS locations and is multiplied by a second row (1, −1, 1, −1) of the Walsh matrix $H_3$. That is, $S^2(i)$, $-S^2(i)$, $S^2(i)$ and $-S^2(i)$ may be transmitted at four DRS locations. In order to estimate the channel of the third layer, the same sequence $S^3(i)$ is transmitted at the four DRS locations and is multiplied by a third row (1, 1, −1, −1) of the Walsh matrix $H_3$. That is, $S^3(i)$, $S^3(i)$, $-S^3(i)$ and $-S^3(i)$ may be transmitted at four DRS locations. Here, the sequences $S^1(i)$, $S^2(i)$ and $S^3(i)$ may be the same or different.

Figure 10:
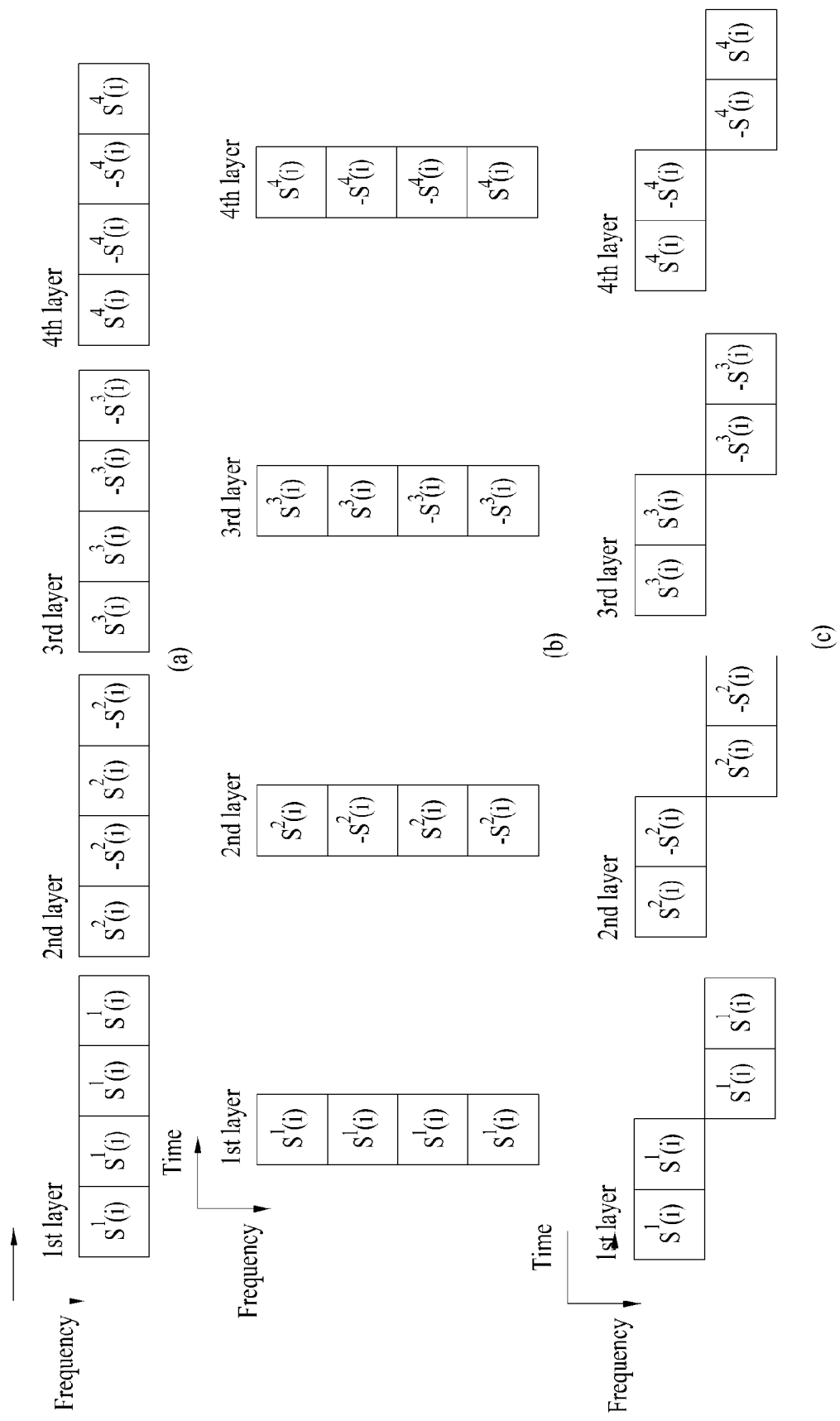

The case in which at least four DRSs are used when DRSs are transmitted in order to distinguish among channels of four layers will be described with reference to FIG. 10. Four DRS locations may become four different subcarrier locations on the same OFDM symbol (FIG. 10(*a*)) or may become four different OFDM symbol locations on the same subcarrier (FIG. 10(*b*)). Alternatively, four DRS locations may become two different OFDM symbol locations on one subcarrier and two different OFDM symbol locations on another subcarrier (FIG. 10(*c*)). Although REs on which DRSs are arranged are shown as being contiguous to each other in the time or frequency domain in FIG. 10, the present invention is not limited thereto and REs on which DRSs are arranged may not be contiguous to each other in the time or frequency domain. In FIG. 10, REs on which DRSs for the first to fourth layers are arranged denote REs of the same location.

In the case in which at least four DRSs are used when DRSs are transmitted in order to distinguish among channels of four layers, rows or columns of a DFT matrix $D_4$ having a size of 4 or a Walsh matrix $H_3$ having a size of 4 may be used as orthogonal covering.

For example, it is assumed that the Walsh matrix $H_3$ may be used. For example, in order to estimate the channel of the first layer, the same sequence $S^1(i)$ is transmitted at the four DRS locations and is multiplied by a first row (1, 1, 1, 1) of the Walsh matrix $H_3$. That is, $S^1(i)$, $S^1(i)$, $S^1(i)$ and $S^1(i)$ may be transmitted at four DRS locations. In order to estimate the channel of the second layer, the same sequence $S^2(i)$ is transmitted at the four DRS locations and is multiplied by a second row (1, −1, 1, −1) of the Walsh matrix $H_3$. That is, $S^2(i)$, $-S^2(i)$, $S^2(i)$ and $-S^2(i)$ may be transmitted at four DRS locations. In order to estimate the channel of the third layer, the same sequence $S^3(i)$ is transmitted at the four DRS locations and is multiplied by a third row (1, 1, −1, −1) of the Walsh matrix $H_3$. That is, $S^3(i)$, $S^3(i)$, $-S^3(i)$ and $-S^3(i)$ may be transmitted at four DRS locations. In order to estimate the channel of the fourth layer, the same sequence $S^4(i)$ is transmitted at the four DRS locations and is multiplied by a fourth row (1, −1, −1, 1) of the Walsh matrix $H_3$. That is, $S^4(i)$, $-S^4(i)$, $-S^4(i)$ and $S^4(i)$ may be transmitted at four DRS locations. Here, the sequences $S^1(i)$, $S^2(i)$, $S^3(i)$ and $S^4(i)$ may be the same or different.

For example, it is assumed that the DFT matrix $D_4$ may be used. For example, in order to estimate the channel of the first layer, the same sequence $S^1(i)$ is transmitted at the four DRS locations and is multiplied by a first row (1, 1, 1, 1) of the DFT matrix $D_4$. That is, $S^1(i)$, $S^1(i)$, $S^1(i)$ and $S^1(i)$ may be transmitted at four DRS locations. In order to estimate the channel of the second layer, the same sequence $S^2(i)$ is transmitted at the four DRS locations and is multiplied by a second row (1, j, −1, −j) of the DFT matrix $D_4$. That is, $S^2(i)$, $jS^2(i)$, $-S^2(i)$ and $-jS^2(i)$ may be transmitted at four DRS locations. In order to estimate the channel of the third layer, the same sequence $S^3(i)$ is transmitted at the four DRS locations and is multiplied by a third row (1, −1, 1, −1) of the DFT matrix $D_4$. That is, $S^3(i)$, $-S^3(i)$, $S^3(i)$ and $-S^2(i)$ may be transmitted at four DRS locations. In order to estimate the channel of the fourth layer, the same sequence $S^4(i)$ is transmitted at the four DRS locations and is multiplied by a fourth row (1, −j, −1, j) of the DFT matrix $D_4$. That is, $S^4(i)$, $-jS^4(i)$, $-S^4(i)$ and $jS^4(i)$ may be transmitted at four DRS locations. Here, the sequences $S^1(i)$, $S^2(i)$, $S^3(i)$ and $S^4(i)$ may be the same or different.

Figure 11:
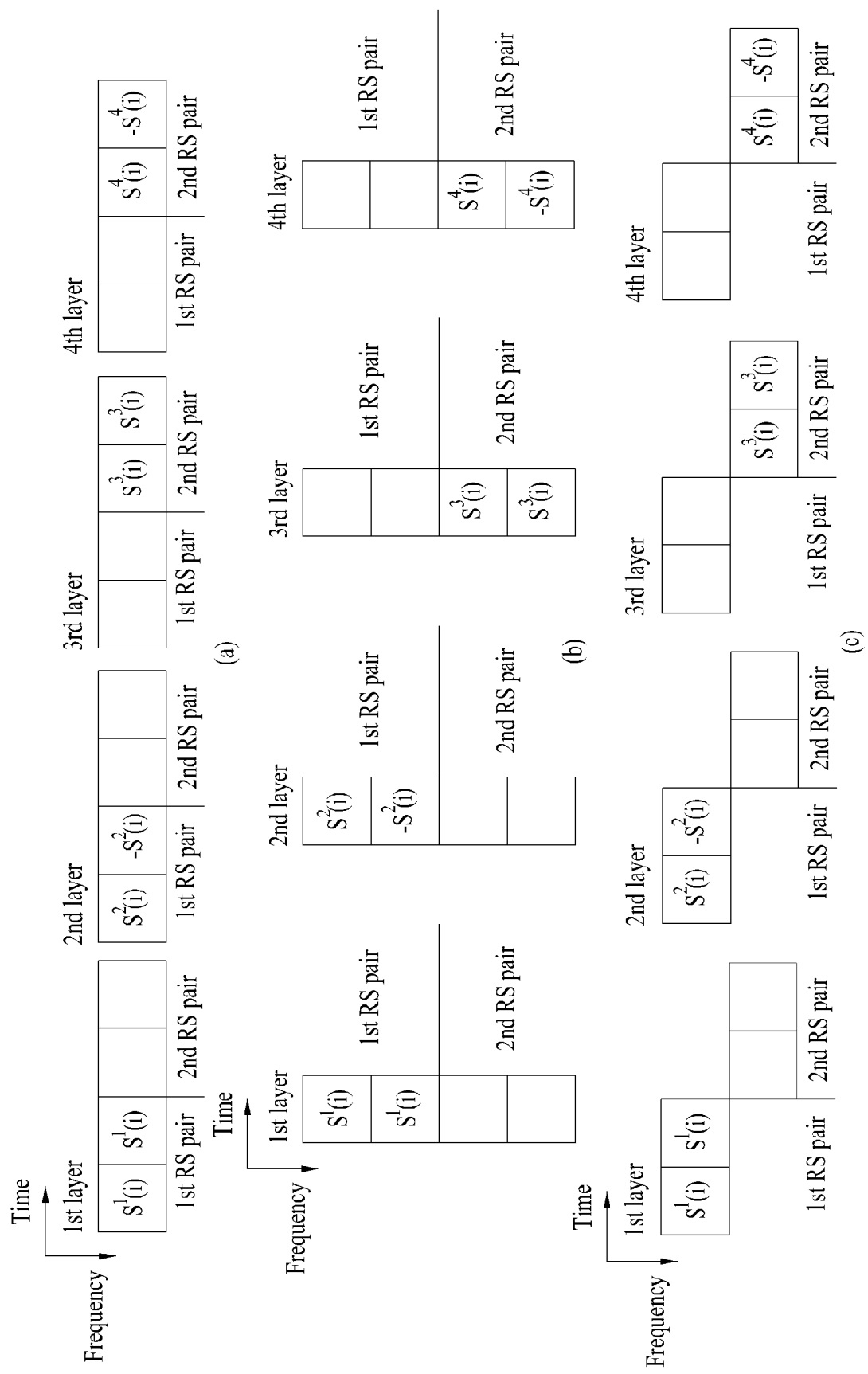

The case in which at least four DRSs are used when DRSs are transmitted in order to distinguish among channels of four layers will be described with reference to FIG. 11. Four DRS locations may be grouped into two DRS pairs each having two DRSs and the two DRS pairs may be arranged to be distinguished in the frequency or time domain (that is, using the FDM or TDM scheme). Here, two layers are distinguished using an orthogonal code using one DRS pair and the other two layers are distinguished using an orthogonal code using another DRS pair. Four DRS locations may become four different subcarrier locations on the same OFDM symbol (FIG. 11(*a*)) or may become four different OFDM symbol locations on the same subcarrier (FIG. 11(*b*)). Alternatively, four DRS locations may become two different OFDM symbol locations on one subcarrier and two different OFDM symbol locations on another subcarrier (FIG. 11(*c*)). Although REs on which DRSs are arranged are shown as being contiguous to each other in the time or frequency domain in FIG. 11, the present invention is not limited thereto and REs on which DRSs are arranged may not be contiguous to each other in the time or frequency domain.

For example, two DRS locations of a first DRS pair are used for first and second layers, and the first and second layers may be distinguished using orthogonal covering (e.g., a Walsh matrix $H_2$ having a size of 2). In addition, two DRS locations of a second DRS pair are used for third and fourth layers, and the third and fourth layers may be distinguished using orthogonal covering (e.g., a Walsh matrix $H_2$ having a size of 2). In FIG. 11, REs (first DRS pair) on which the DRSs for the first and second layers denote REs of the same location. In FIG. 11, REs (second DRS pair) on which the DRSs for the third and fourth layers denote REs of the same location.

For example, in the first DRS pair, in order to estimate the channel of the first layer, the same sequence $S^1(i)$ is transmitted at the two DRS locations and is multiplied by a first row (1, 1) of the Walsh matrix $H_2$. That is, $S^1(i)$ and $S^1(i)$ may be transmitted at two DRS locations. In order to estimate the channel of the second layer, the same sequence $S^2(i)$ is transmitted at the two DRS locations and is multiplied by a second row (1, −1) of the Walsh matrix $H_2$. That is, $S^2(i)$ and $-S^2(i)$ may be transmitted at two DRS locations.

Next, in the second DRS pair, in order to estimate the channel of the third layer, the same sequence $S^3(i)$ is transmitted at the two DRS locations and is multiplied by a second row (1, 1) of the Walsh matrix $H_2$. That is, $S^2(i)$, and $S^3(i)$ may be transmitted at two DRS locations. In order to estimate the channel of the fourth layer, the same sequence $S^4(i)$ is transmitted at the two DRS locations and is multiplied by a second row (1, −1) of the Walsh matrix $H_2$. That is, $S^4(i)$, $-S^4(i)$ may be transmitted at two DRS locations.

Hereinafter, embodiments of arranging and transmitting DRSs for multiple layers on REs using the above-described orthogonal covering using a CDM scheme will be described. Although the following embodiments are described based on a DRS pattern shown in FIG. 6, the present invention is not limited thereto. In particular, methods of the following embodiments may be equally applied to FIGS. 16 to 30 which are various modifications of the DRS pattern shown in FIG. 6.

An embodiment of arranging DRSs on REs using a CDM scheme in the case of Rank 2 transmission will be described with reference to FIG. 12.

In the case of Rank 2 transmission, one of the DRS groups #0 and #1 may be used. For example, if the DRS group #0 is used, DRS locations denoted by A and B are used in FIG. 12. In contrast, if the DRS group #1 is used, DRS locations denoted by C and D are used in FIG. 12. In the following description, it is assumed that the DRS group #0 is used.

An orthogonal cover used to distinguish between two layers will be described with reference to FIG. 12.

In the case in which DRSs are located on four OFDM symbols as shown in FIGS. 12(a) and 12(b), an orthogonal code having a length of 4 may be used. If an orthogonal cover matrix having a size of 2 is used in order to generate the orthogonal code having the length of 4, elements of one row or column of the matrix may be circularly repeated. For example, (1, 1) of a first row of a Walsh matrix having a size of 2 may be circularly repeated and an orthogonal code (1, 1, 1, 1) having a length of 4 may be multiplied over four OFDM symbols and (1, −1) of a second row of a Walsh matrix having a size of 2 may be circularly repeated and an orthogonal code (1, −1, 1, −1) having a length of 4 may be multiplied over four OFDM symbols. Alternatively, any one row or column of a Walsh matrix or a DFT matrix having a size of 4 may be used as an orthogonal code having a length of 4. In this case, any two rows or columns of the Walsh matrix or the DFT matrix having the size of 4 may be used as an orthogonal code for distinguishing between two layers.

In the case in which DRSs are located on six OFDM symbols as shown in FIG. 12(c), an orthogonal code having a length of 6 may be used. If a Walsh matrix having a size of 2 is used in order to generate the orthogonal code having the length of 6, (1, 1) of a first row of a Walsh matrix having a size of 2 may be circularly repeated and an orthogonal code (1, 1, 1, 1, 1, 1) having a length of 6 may be multiplied over six OFDM symbols or (1, −1) of a second row of a Walsh matrix having a size of 2 may be circularly repeated and an orthogonal code (1, −1, 1, −1, 1, −1) having a length of 6 may be multiplied over six OFDM symbols. Alternatively, any one row or column of a DFT matrix having a size of 3 may be used as an orthogonal code having a length of 6. In this case, any two rows or columns of the DFT matrix having the size of 3 may be used as an orthogonal code for distinguishing between two layers. Alternatively, any one row or column of a Walsh matrix or a DFT matrix having a size of 4 may be used as an orthogonal code having a length of 6. In this case, any two rows or columns of the Walsh matrix or the DFT matrix having the size of 4 may be used as an orthogonal code for distinguishing between two layers.

The orthogonal cover matrix for generating the orthogonal code is not limited to the above-described examples. If the length of an orthogonal code to be multiplied is determined according to DRS locations, a row or column of an orthogonal cover matrix having an appropriate size may be directly used as an orthogonal code or an orthogonal code may be generated by circularly repeating elements of a row or column.

Referring to FIG. 12(a), A and B are located on two different OFDM symbols with respect to six subcarriers. For example, A and B are located at sixth and seventh OFDM symbol locations with respect to fourth, eighth and twelfth subcarriers and A and B are located at tenth and eleventh OFDM symbol locations with respect to second, sixth and tenth subcarriers.

In order to estimate the channel of the first layer, the orthogonal cover (1, 1, 1, 1) may be multiplied over four OFDM symbols (that is, time domain covering). For example, the sequence $S^1(i)$ of the DRS locations denoted by A and B on the sixth, seventh, tenth and eleventh OFDM symbols of FIG. 12(a) may be multiplied by the orthogonal cover (1, 1, 1, 1) and $S^1(i)$, $S^1(i)$, $S^1(i)$ and $S^1(i)$ may be transmitted.

In order to estimate the channel of the second layer, the orthogonal cover (1, −1, 1, −1) may be multiplied over four OFDM symbols (that is, time domain covering). For example, the sequence $S^2(i)$ of the DRS locations denoted by A and B on the sixth, seventh, tenth and eleventh OFDM symbols of FIG. 12(a) may be multiplied by the orthogonal cover (1, −1, 1, −1) and $S^2(i)$, $-S^2(i)$, $S^2(i)$ and $-S^2(i)$ may be transmitted. Here $S^1(i)$ and $S^2(i)$ may be the same or different.

Referring to FIG. 12(b), A and B are located on four different OFDM symbols with respect to three subcarriers. For example, A and B are located at sixth and seventh OFDM symbol locations and A and B are located at tenth and eleventh OFDM symbol locations, with respect to first, sixth and eleventh subcarriers.

In order to estimate the channel of the first layer, the orthogonal cover (1, 1, 1, 1) may be multiplied over four OFDM symbols (that is, time domain covering). For example, the sequence $S^1(i)$ of the DRS locations denoted by A and B on the sixth, seventh, tenth and eleventh OFDM symbols of FIG. 12(a) may be multiplied by the orthogonal cover (1, 1, 1, 1) and $S^1(i)$, $S^1(i)$, $S^1(i)$ and $S^1(i)$ may be transmitted.

In order to estimate the channel of the second layer, the orthogonal cover (1, −1, 1, −1) may be multiplied over four OFDM symbols (that is, time domain covering). For example, the sequence $S^2(i)$ of the DRS locations denoted by A and B on the sixth, seventh, tenth and eleventh OFDM symbols of FIG. 12(a) may be multiplied by the orthogonal cover (1, −1, 1, −1) and $S^2(i)$, $-S^2(i)$, $S^2(i)$ and $-S^2(i)$ may be transmitted. Here $S^1(i)$ and $S^2(i)$ may be the same or different.

Referring to FIG. 12(c), A and B are located on six different subcarriers with respect to two OFDM symbols. For example, A and B are located at first and second subcarriers, A and B are located on sixth and seventh subcarriers, and A and B are located on eleventh and twelfth subcarriers, at a sixth OFDM symbol location. In addition, A and B are located on first and second subcarriers, A and B are located on sixth and seventh subcarriers, and A and B are located on eleventh and twelfth subcarriers, at an eleventh OFDM symbol location.

In order to estimate the channel of the first layer, the orthogonal cover (1, 1, 1, 1, 1, 1) may be multiplied over six subcarrier locations (that is, frequency domain covering). For example, the sequence $S^1(i)$ of the DRS locations denoted by A and B on the first, second, sixth, seventh and eleventh subcarriers of FIG. 12(a) may be multiplied by the orthogonal cover (1, 1, 1, 1, 1, 1) and $S^1(i)$, $S^1(i)$, $S^1(i)$, $S^1(i)$, $S^1(i)$ and $S^1(i)$ may be transmitted.

In order to estimate the channel of the second layer, the orthogonal cover (1, −1, 1, −1, 1, −1) may be multiplied over six subcarrier locations (that is, frequency domain covering). For example, the sequence $S^2(i)$ of the DRS locations denoted by A and B on the first, second, sixth, seventh, eleventh and twelfth subcarriers of FIG. 12(a) may be multiplied by the orthogonal cover (1, −1, 1, −1, 1, −1) and $S^2(i)$, $-S^2(i)$, $S^2(i)$, $-S^2(i)$, $S^2(i)$ and $-S^2(i)$ may be transmitted. Here $S^1(i)$ and $S^2(i)$ may be the same or different.

Although time domain covering is described in FIGS. 12(a) and 12(b), frequency domain covering may be applied to the same DRS pattern using the scheme described with reference to FIG. 12(c). That is, two orthogonal codes having a length of 3 may be multiplied over three subcarriers to distinguish between DRSs for two layers. Similarly, although frequency domain covering is described in FIG. 12(c), time domain covering may be applied to the same DRS pattern using the scheme described with reference to FIG. 12(a) or 12(b). That is, two orthogonal codes having a length of 2 may be multiplied to distinguish between DRSs for two layers.

An embodiment of arranging DRSs on REs using a CDM scheme in the case of Rank 3 transmission will be described with reference to FIG. 13.

In the case of Rank 3 transmission, one of the DRS groups #0 and #1 may be used. For example, if the DRS group #0 is used, DRS locations denoted by A and B are used in FIG. 13.

Figure 13:
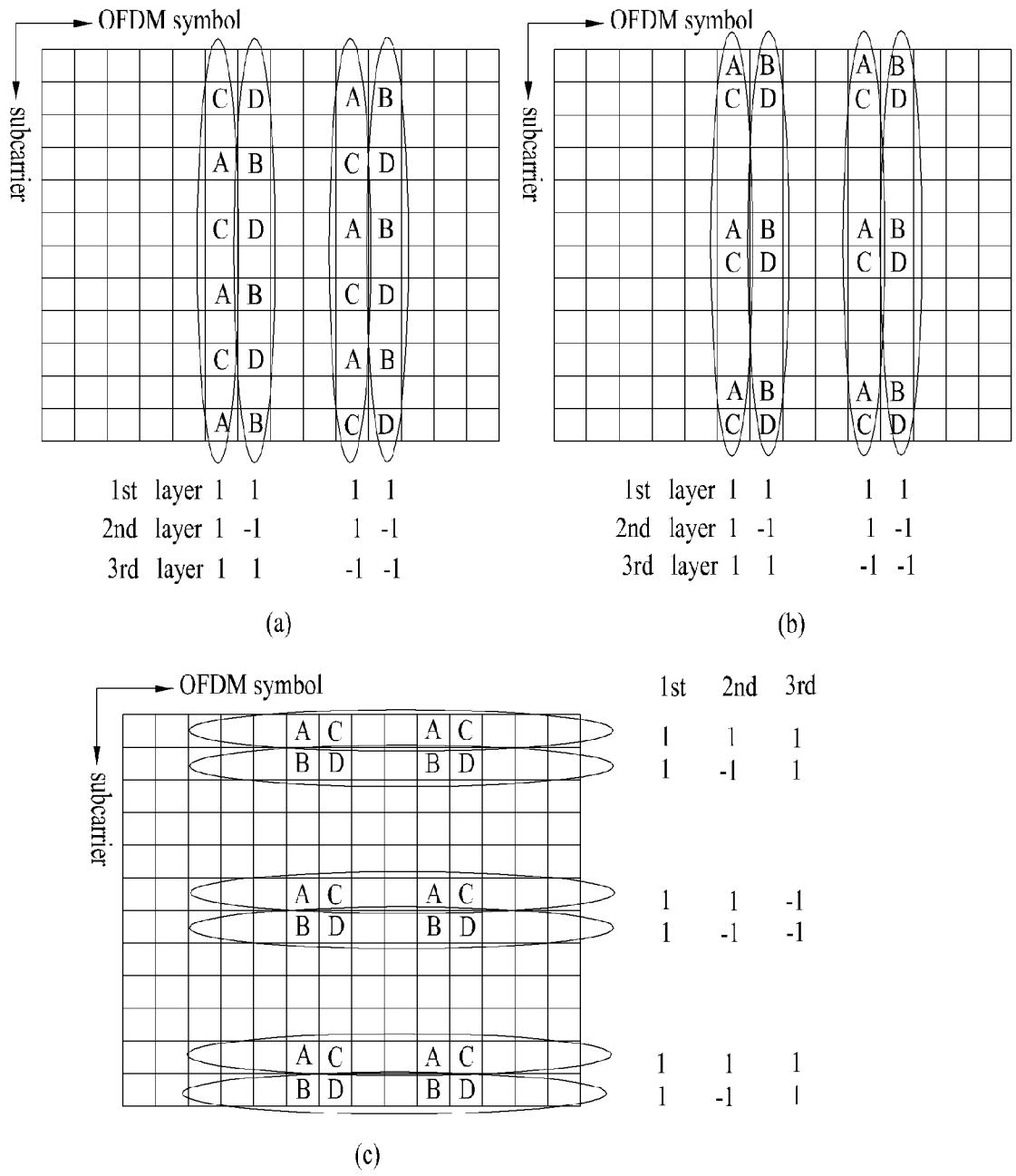

In contrast, if the DRS group #1 is used, DRS locations denoted by C and D are used in FIG. 13. In the following description, it is assumed that the DRS group #0 is used.

An orthogonal cover used to distinguish among three layers will be described with reference to FIG. 13.

In the case in which DRSs are located on four OFDM symbols as shown in FIGS. 13(a) and 13(b), an orthogonal code having a length of 4 may be used. If a DFT matrix having a size of 3 is used in order to generate the orthogonal code having the length of 4, elements of one row or column of the DFT matrix having the size of 3 may be circularly repeated. For example, (1, 1, 1) of a first row of the DFT matrix having a size of 3 may be circularly repeated and an orthogonal code (1, 1, 1, 1) having a length of 4 may be multiplied over four OFDM symbols, $(1, e^{j(2\pi/3)}, e^{j(4\pi/3)})$ of a second row of a DFT matrix having a size of 3 may be circularly repeated and an orthogonal code $(1, e^{j(2\pi/3)}, e^{j(4\pi/3)}, 1)$ having a length of 4 may be multiplied over four OFDM symbols, and $(1, e^{j(4\pi/3)}, e^{j(8\pi/3)})$ of a third row of a DFT matrix having a size of 3 may be circularly repeated and an orthogonal code $(1, e^{j(4\pi/3)}, e^{j(8\pi/3)}, 1)$ having a length of 4 may be multiplied over four OFDM symbols. Alternatively, any one row or column of a Walsh matrix or a DFT matrix having a size of 4 may be used as an orthogonal code having a length of 4. In this case, any three rows or columns of the Walsh matrix or the DFT matrix having the size of 4 may be used as an orthogonal code for distinguishing among three layers.

In the case in which DRSs are located on six OFDM symbols as shown in FIG. 13(c), an orthogonal code having a length of 6 may be used. If a DFT matrix having a size of 3 is used in order to generate the orthogonal code having the length of 6, (1, 1, 1) of a first row of a DFT matrix having a size of 3 may be circularly repeated and an orthogonal code (1, 1, 1, 1, 1, 1) having a length of 6 may be multiplied over six subcarriers, $(1, e^{j(2\pi/3)}, e^{j(4\pi/3)})$ of a second row of a DFT matrix having a size of 3 may be circularly repeated and an orthogonal code $(1, e^{j(2\pi/3)}, e^{j(4\pi/3)}, 1, e^{j(2\pi/3)}, e^{j(4\pi/3)})$ having a length of 6 may be multiplied over six OFDM symbols or $(1, e^{j(4\pi/3)}, e^{j(8\pi/3)})$ of a third row of a DFT matrix having a size of 3 may be circularly repeated and an orthogonal code $(1, e^{j(4\pi/3)}, e^{j(8\pi/3)}, 1, e^{j(4\pi/3)}, e^{j(8\pi/3)})$ having a length of 6 may be multiplied over six OFDM symbols. Alternatively, any one row or column of a Walsh matrix or DFT matrix having a size of 4 may be used as an orthogonal code having a length of 6. In this case, any three rows or columns of the Walsh matrix or DFT matrix having the size of 4 may be used as an orthogonal code for distinguishing between three layers.

The orthogonal cover matrix for generating the orthogonal code is not limited to the above-described examples. If the length of an orthogonal code to be multiplied is determined according to DRS locations, a row or column of an orthogonal cover matrix having an appropriate size may be directly used as an orthogonal code or an orthogonal code may be generated by circularly repeating elements of a row or column.

In the following embodiments, an example of distinguishing among three layers using an orthogonal code generated from a Walsh matrix having a length of 4 will be described.

Referring to FIG. 13(a), A and B are located on two different OFDM symbols with respect to six subcarriers. For example, A and B are located at sixth and seventh OFDM symbol locations with respect to fourth, eighth and twelfth subcarriers and A and B are located at tenth and eleventh OFDM symbol locations with respect to second, sixth and tenth subcarriers.

Referring to FIG. 13(b), A and B are located on four different OFDM symbols with respect to three subcarriers. For example, A and B are located at sixth and seventh OFDM symbol locations and A and B are located at tenth and eleventh OFDM symbol locations, with respect to first, sixth and eleventh subcarriers.

With respect to the DRS patterns respectively shown in FIGS. 13(a) and 13(b), in order to estimate the channel of the first layer, an orthogonal cover (1, 1, 1, 1) may be multiplied over four OFDM symbols. In addition, in order to estimate the channel of the second layer, an orthogonal cover (1, −1, 1, −1) may be multiplied over four OFDM symbols. In addition, in order to estimate the channel of the third layer, an orthogonal cover (1, 1, −1, −1) may be multiplied over four OFDM symbols. That is, the DRS sequence is subjected to time domain covering by an orthogonal code.

For example, at DRS locations denoted by A and B at sixth, seventh, tenth and eleventh OFDM symbols of FIG. 13(a) or 13(b), a sequence $S^1(i)$ for a first layer may be multiplied by the orthogonal cover (1, 1, 1, 1) and $S^1(i), S^1(i), S^1(i)$ and $S^1(i)$ may be transmitted, a sequence $S^2(i)$ for a second layer may be multiplied by the orthogonal cover (1, −1, 1, −1) and $S^2(i), -S^2(i), S^2(i)$ and $-S^2(i)$ may be transmitted, and a sequence $S^3(i)$ for a third layer may be multiplied by the orthogonal cover (1, 1, −1, −1) and $S^3(i), S^3(i), -S^3(i)$ and $-S^3(i)$ may be transmitted. Here, $S^1(i), S^2(i)$ and $S^3(i)$ may be the same or different.

Referring to FIG. 13(c), A and B are located on six different subcarriers with respect to two OFDM symbols. For example, at a sixth OFDM symbol location, A and B are located on first and second subcarriers, A and B are located on sixth and seventh subcarriers, and A and B are located on eleventh and twelfth subcarriers. At an eleventh OFDM symbol location, A and B are located on first and second subcarriers, A and B are located on sixth and seventh subcarriers, and A and B are located on eleventh and twelfth subcarriers.

In order to estimate the channel of the first layer, an orthogonal cover (1, 1, 1, 1, 1, 1) may be multiplied over six subcarriers. In addition, in order to estimate the channel of the second layer, an orthogonal cover (1, −1, 1, −1, 1, −1) may be multiplied over six subcarriers. In addition, in order to estimate the channel of the third layer, an orthogonal cover (1, 1, −1, −1, 1, 1) may be multiplied over six subcarriers. That is, the DRS sequence is subjected to frequency domain covering by an orthogonal code.

For example, at DRS locations denoted by A and B on first, second, sixth, seventh, eleventh and twelfth subcarriers of FIG. 13(c), a sequence $S^1(i)$ for a first layer may be multiplied by the orthogonal cover (1, 1, 1, 1, 1, 1) and $S^1(i), S^1(i), S^1(i), S^1(i), S^1(i)$ and $S^1(i)$ may be transmitted, a sequence $S^2(i)$ for a second layer may be multiplied by the orthogonal cover (1, −1, 1, −1, 1, −1) and $S^2(i), -S^2(i), S^2(i), -S^2(i), S^2(i)$ and $-S^2(i)$ may be transmitted, and a sequence $S^3(i)$ for a third layer may be multiplied by the orthogonal cover (1, 1, −1, −1, 1, 1) and $S^3(i), S^3(i), -S^3(i), -S^3(i), S^3(i)$ and $S^3(i)$ may be transmitted. Here, $S^1(i), S^2(i)$ and $S^3(i)$ may be the same or different.

Although time domain covering is described in FIGS. 13(a) and 13(b), frequency domain covering may be applied to the same DRS pattern using the scheme described with reference to FIG. 13(c). That is, three orthogonal codes having a length of 3 may be multiplied over three subcarriers to distinguish among DRSs for three layers. Similarly, although frequency domain covering is described in FIG. 13(c), time domain covering may be applied to the same DRS pattern using the scheme described with reference to FIG. 13(a) or 13(b). At this time, a CDM scheme and an FDM scheme may be mixed and applied. For example, two orthogonal codes having a length of 2 may be multiplied at DRS locations denoted by A to distinguish between DRSs for first and second layers and DRSs for a third layer may be distinguished using DRSs denoted by B. First and second layers and a third layer are distinguished according to an FDM scheme by locations of different subcarriers of A and B and, similarly, the first layer and the second layer may be distinguished according to a CDM scheme at a location denoted by A.

An embodiment of arranging DRSs on REs using a CDM scheme in the case of Rank 4 transmission will be described with reference to FIG. 14.

In the case of Rank 4 transmission, one of the DRS groups #0 and #1 may be used. For example, if the DRS group #0 is used, DRS locations denoted by A and B are used in FIG. 14. In contrast, if the DRS group #1 is used, DRS locations denoted by C and D are used in FIG. 14. In the following description, it is assumed that the DRS group #0 is used.

An orthogonal cover used to distinguish among four layers will be described with reference to FIG. 14.

In the case in which DRSs are located on four different OFDM symbols as shown in FIGS. 14(a) and 14(b), an orthogonal code having a length of 4 may be used. In order to generate the orthogonal code having the length of 4, a Walsh matrix or DFT matrix having a size of 4 may be used.

In the case in which DRSs are located on six subcarriers as shown in FIG. 14(c), an orthogonal code having a length of 6 may be used. In order to generate an orthogonal code having a length of 4, a Walsh matrix or DFT matrix having a size of 4 may be used. For example, in the case in which the Walsh matrix having the size of 4 is used in order to generate the orthogonal code having the length of 6, (1, 1, 1, 1) of a first row of the Walsh matrix having the length of 4 may be circularly repeated and an orthogonal code (1, 1, 1, 1, 1, 1) having a length of 6 may be multiplied over six subcarriers, (1, −1, 1, −1) of a second row of the Walsh matrix having the length of 4 may be circularly repeated and an orthogonal code (1, −1, 1, −1, 1, −1) having a length of 6 may be multiplied over six subcarriers, (1, 1, −1, −1) of a third row of the Walsh matrix having the length of 4 may be circularly repeated and an orthogonal code (1, 1, −1, −1, 1, 1) having a length of 6 may be multiplied over six subcarriers, and (1, −1, −1, 1) of a fourth row of the Walsh matrix having the length of 4 may be circularly repeated and an orthogonal code (1, −1, −1, 1, 1, −1) having a length of 6 may be multiplied over six subcarriers.

The orthogonal cover matrix for generating the orthogonal code is not limited to the above-described examples. If the length of an orthogonal code to be multiplied is determined according to DRS locations, a row or column of an orthogonal cover matrix having an appropriate size may be directly used as an orthogonal code or an orthogonal code may be generated by circularly repeating elements of a row or column.

In the following embodiments, an example of distinguishing among four layers using an orthogonal code generated from a Walsh matrix having a length of 4 will be described.

Referring to FIG. 14(a), A and B are located on two different OFDM symbols with respect to six subcarriers. For example, A and B are located at sixth and seventh OFDM symbol locations with respect to fourth, eighth and twelfth subcarriers and A and B are located at tenth and eleventh OFDM symbol locations with respect to second, sixth and tenth subcarriers.

Referring to FIG. 14(b), A and B are located on four different OFDM symbols with respect to three subcarriers. For example, A and B are located at sixth and seventh OFDM symbol locations and A and B are located at tenth and eleventh OFDM symbol locations, with respect to first, sixth and eleventh subcarriers.

With respect to the DRS patterns respectively shown in FIGS. 14(a) and 14(b), in order to estimate the channel of the first layer, an orthogonal cover (1, 1, 1, 1) may be multiplied over four OFDM symbols. In addition, in order to estimate the channel of the second layer, an orthogonal cover (1, −1, 1, −1) may be multiplied over four OFDM symbols. In addition, in order to estimate the channel of the third layer, an orthogonal cover (1, 1, −1, −1) may be multiplied over four OFDM symbols. In addition, in order to estimate the channel of the fourth layer, an orthogonal cover (1, −1, −1, 1) may be multiplied over four OFDM symbols. That is, the DRS sequence is subjected to time domain covering by an orthogonal code.

For example, at DRS locations denoted by A and B at sixth, seventh, tenth and eleventh OFDM symbols of FIG. 14(a) or 14(b), a sequence $S^1(i)$ for a first layer may be multiplied by the orthogonal cover (1, 1, 1, 1) and $S^1(i)$, $S^1(i)$, $S^1(i)$ and $S^1(i)$ may be transmitted, a sequence $S^2(i)$ for a second layer may be multiplied by the orthogonal cover (1, −1, 1, −1) and $S^2(i)$, $-S^2(i)$, $S^2(i)$ and $-S^2(i)$ may be transmitted, a sequence $S^3(i)$ for a third layer may be multiplied by the orthogonal cover (1, 1, −1, −1) and $S^3(i)$, $S^3(i)$, $-S^3(i)$ and $-S^3(i)$ may be transmitted, and a sequence $S^4(i)$ for a fourth layer may be multiplied by the orthogonal cover (1, −1, −1, 1) and $S^4(i)$, $-S^4(i)$, $-S^4(i)$ and $S^4(i)$ may be transmitted. Here, $S^1(i)$, $S^2(i)$, $S^3(i)$ and $S^4(i)$ may be the same or different.

Referring to FIG. 14(c), A and B are located on six different subcarriers with respect to two OFDM symbols. For example, at a sixth OFDM symbol location, A and B are located on first and second subcarriers, A and B are located on sixth and seventh subcarriers, and A and B are located on eleventh and twelfth subcarriers. At an eleventh OFDM symbol location, A and B are located on first and second subcarriers, A and B are located on sixth and seventh subcarriers, and A and B are located on eleventh and twelfth subcarriers.

In order to estimate the channel of the first layer, an orthogonal cover (1, 1, 1, 1, 1, 1) may be multiplied over six subcarriers. In addition, in order to estimate the channel of the second layer, an orthogonal cover (1, −1, 1, −1, 1, −1) may be multiplied over six subcarriers. In addition, in order to estimate the channel of the third layer, an orthogonal cover (1, 1, −1, −1, 1, 1) may be multiplied over six subcarriers. In addition, in order to estimate the channel of the fourth layer, an orthogonal cover (1, −1, −1, 1, 1, −1) may be multiplied over six subcarriers. That is, the DRS sequence is subjected to frequency domain covering by an orthogonal code.

For example, at DRS locations denoted by A and B on first, second, sixth, seventh, eleventh and twelfth subcarriers of FIG. 14(c), a sequence $S^1(i)$ for a first layer may be multiplied by the orthogonal cover (1, 1, 1, 1, 1, 1) and $S^1(i)$, $S^1(i)$, $S^1(i)$, $S^1(i)$, $S^1(i)$ and $S^1(i)$ may be transmitted, a sequence $S^2(i)$ for a second layer may be multiplied by the orthogonal cover (1, −1, 1, −1, 1, −1) and $S^2(i)$, $-S^2(i)$, $S^2(i)$, $-S^2(i)$, $S^2(i)$ and $-S^2(i)$ may be transmitted, a sequence $S^3(i)$ for a third layer may be multiplied by the orthogonal cover (1, 1, −1, −1, 1, 1) and $S^3(i)$, $S^3(i)$, $-S^3(i)$, $-S^3(i)$, $S^3(i)$ and $S^3(i)$ may be transmitted, and a sequence $S^4(i)$ for a fourth layer may be multiplied by the orthogonal cover (1, −1, −1, 1, 1, −1) and $S^4(i)$, $-S^4(i)$, $-S^4(i)$, $S^4(i)$, $S^4(i)$ and $-S^4(i)$ may be transmitted. Here, $S^1(i)$, $S^2(i)$, $S^3(i)$ and $S^4(i)$ may be the same or different.

Although time domain covering is described in FIGS. 14(a) and 14(b), frequency domain covering may be applied to the same DRS pattern using the scheme described with reference to FIG. 14(c). That is, four orthogonal codes having a length of 3 may be multiplied over three subcarriers to distinguish among DRSs for four layers. The orthogonal code having the length of 3 may be generated from an orthogonal cover matrix having a size of 2 using a circular repetition scheme. Similarly, although frequency domain covering is described in FIG. 14(c), time domain covering may be applied to the same DRS pattern using the scheme described with reference to FIG. 14(a) or 14(b). At this time, a CDM scheme and an FDM scheme may be mixed and applied. For example, two orthogonal codes having a length of 2 may be multiplied at DRS locations denoted by A to distinguish between DRSs for first and second layers and two orthogonal codes having a length of 2 may be multiplied at DRS locations denoted by B to distinguish between DRSs for third and fourth layers.

An embodiment of arranging DRSs on REs using a CDM scheme in the case of Rank 4 transmission will be described with reference to FIG. 15. In the present embodiment, similarly to FIG. 14, it is assumed that the DRS group #0 (A and B) is used.

The case in which an orthogonal cover matrix having a size of 2 (e.g., a Walsh matrix having a size of 2) is used to distinguish among four layers will be described with reference to FIG. 15.

In the case in which DRSs are located on four different OFDM symbols as shown in FIGS. 15(a) and 15(b), two layers may be distinguished through DRSs located on two OFDM symbols and the remaining two layers may be distinguished through DRSs located on the remaining two OFDM symbols. For example, in FIGS. 15(a) and 15(b), two layers may be distinguished using an orthogonal code having a length of 2 over two OFDM symbols on which A is located and the remaining two layers may be distinguished using an orthogonal code having a length of 2 over two OFDM symbols on which B is located. Alternatively, two layers may be distinguished using an orthogonal code having a length of 2 over one OFDM symbol on which A is located and one OFDM symbol on which B is located, and the remaining two layers may be distinguished using an orthogonal code having a length of 2 over one OFDM symbol on which A is located and one OFDM symbol on which B is located.

Since the two layers (first layer group) and the remaining two layers (second layer group) among four layers are distinguished using DRS patterns located on different OFDM symbols, the layer groups are multiplexed according to a TDM scheme. In addition, the two layers of one layer group use the same DRS pattern and are multiplexed using an orthogonal code according to a CDM scheme. The embodiments of FIGS. 15(a) and 15(b) show schemes for distinguishing between four layers using an orthogonal cover matrix having a size of 2 by simultaneously applying the TDM scheme and the CDM scheme.

In the case in which DRSs are located on six subcarriers as shown in FIG. 15(c), A is located on three subcarriers and B is located on three subcarriers. At this time, two layers may be distinguished using an orthogonal code having a length of 3 over three subcarriers on which A is located and the remaining two layers may be distinguished using an orthogonal code having a length of 3 over three subcarriers on which B is located. The orthogonal code having the length of 3 may be generated by circularly repeating elements of one row or column of a Walsh matrix having a size of 2.

Since the two layers (first layer group) and the remaining two layers (second layer group) among four layers are distinguished using DRS patterns located on different subcarriers, the layer groups are multiplexed according to an FDM scheme. In addition, the two layers of one layer group use the same DRS pattern and are multiplexed using an orthogonal code according to a CDM scheme. The embodiment of FIG. 15(c) shows a scheme for distinguishing among four layers using an orthogonal cover matrix having a size of 2 by simultaneously applying the FDM scheme and the CDM scheme.

In the following embodiments, an example of distinguishing among four layers using an orthogonal code generated from a Walsh matrix having a length of 2 will be described.

Referring to FIG. 15(a), A and B are located on two different OFDM symbols with respect to six subcarriers. More specifically, A is arranged on fourth, eighth and twelfth subcarrier locations at a sixth OFDM symbol and second, sixth and tenth subcarrier locations at a tenth OFDM symbol. B is arranged on fourth, eighth and twelfth subcarrier locations at a seventh OFDM symbol and second, sixth and tenth subcarrier locations at an eleventh OFDM symbol.

Referring to FIG. 15(b), A and B are located on four different OFDM symbols with respect to three subcarriers. More specifically, A is arranged on first, sixth and eleventh subcarrier locations at sixth and tenth OFDM symbols. B is arranged on first, sixth and eleventh subcarrier locations at seventh and eleventh OFDM symbols.

With respect to the DRS patterns respectively shown in FIGS. 15(a) and 15(b), in order to estimate the channel of the first layer, an orthogonal cover (1, 1) may be multiplied at DRS locations denoted by A over two OFDM symbols. In addition, in order to estimate the channel of the second layer, an orthogonal cover (1, −1) may be multiplied at DRS locations denoted by A over two OFDM symbols. In addition, in order to estimate the channel of the third layer, an orthogonal cover (1, 1) may be multiplied at DRS locations denoted by B over two OFDM symbols. In addition, in order to estimate the channel of the fourth layer, an orthogonal cover (1, −1) may be multiplied at DRS locations denoted by B over two OFDM symbols. That is, the DRS sequence is subjected to time domain covering by an orthogonal code.

For example, at DRS locations denoted by A at the sixth and tenth OFDM symbols of FIG. 15(a) or 15(b), a sequence $S^1(i)$ for a first layer may be multiplied by the orthogonal cover (1, 1) and $S^1(i)$ and $S^1(i)$ may be transmitted, and a sequence $S^2(i)$ for a second layer may be multiplied by the orthogonal cover (1, −1) and $S^2(i)$ and $-S^2(i)$ may be transmitted. In addition, at DRS locations denoted by B at the seventh and eleventh OFDM symbols of FIG. 15(a) or 15(b), a sequence $S^3(i)$ for a third layer may be multiplied by the orthogonal cover (1, 1) and $S^3(i)$ and $S^3(i)$ may be transmitted, and a sequence $S^4(i)$ for a fourth layer may be multiplied by the orthogonal cover (1, −1) and $S^4(i)$ and $-S^4(i)$ may be transmitted. Here, $S^1(i)$, $S^2(i)$, $S^3(i)$ and $S^4(i)$ may be the same or different.

With respect to the DRS patterns respectively shown in FIGS. 15(a) and 15(b), in order to estimate the channel of the first and second layers, orthogonal covers (1, 1) and (1, −1) may be multiplied at DRS locations denoted by A and B over one OFDM symbol on which A is located and one OFDM symbol on which B is located. In addition, in order to estimate the channel of the third and fourth layers, orthogonal covers (1, 1) and (1, −1) may be multiplied at DRS locations denoted by A and B over one OFDM symbol on which A is located and one OFDM symbol on which B is located. That is, the DRS sequence is subjected to time domain covering by an orthogonal code.

For example, at DRS locations denoted by A and B at sixth and seventh OFDM symbols of FIG. 15(a) or 15(b), a sequence $S^1(i)$ for a first layer may be multiplied by the orthogonal cover (1, 1) and $S^1(i)$ and $S^1(i)$ may be transmitted, and a sequence $S^2(i)$ for a second layer may be multiplied by the orthogonal cover (1, −1) and $S^2(i)$ and $-S^2(i)$ may be transmitted. In addition, at DRS locations denoted by A and B at tenth and eleventh OFDM symbols of FIG. 15(a) or 15(b), a sequence $S^3(i)$ for a third layer may be multiplied by the orthogonal cover (1, 1) and $S^3(i)$ and $S^3(i)$ may be transmitted, and a sequence $S^4(i)$ for a fourth layer may be multiplied by the orthogonal cover (1, −1) and $S^4(i)$ and −$S^4(i)$ may be transmitted. Here, $S^1(i)$, $S^2(i)$, $S^3(i)$ and $S^4(i)$ may be the same or different.

Referring to FIG. 15(c), A and B are located on six different subcarriers with respect to two OFDM symbols. For example, A is located on first, sixth and eleventh subcarriers at sixth and eleventh OFDM symbol locations and B is located on second, seventh and twelfth subcarriers at sixth and eleventh OFDM symbol locations.

In order to estimate the channel of the first layer, an orthogonal cover (1, 1, 1) may be multiplied over three subcarriers denoted by A. In addition, in order to estimate the channel of the second layer, an orthogonal cover (1, −1, 1) may be multiplied over three subcarriers denoted by A. In addition, in order to estimate the channel of the third layer, an orthogonal cover (1, 1, 1) may be multiplied over three subcarriers denoted by B. In addition, in order to estimate the channel of the fourth layer, an orthogonal cover (1, −1, 1) may be multiplied over three subcarriers denoted by B. That is, the DRS sequence is subjected to frequency domain covering by an orthogonal code.

For example, at DRS locations denoted by A on first, sixth and eleventh subcarriers of FIG. 15(c), a sequence $S^1(i)$ for a first layer may be multiplied by the orthogonal cover (1, 1, 1) and $S^1(i)$, $S^1(i)$ and $S^1(i)$ may be transmitted, and a sequence $S^2(i)$ for a second layer may be multiplied by the orthogonal cover (1, −1, 1) and $S^2(i)$, −$S^2(i)$ and $S^2(i)$ may be transmitted. In addition, at DRS locations denoted by B on second, seventh and twelfth subcarriers of FIG. 15(c), a sequence $S^3(i)$ for a third layer may be multiplied by the orthogonal cover (1, 1, 1) and $S^3(i)$, $S^3(i)$ and $S^3(i)$ may be transmitted, and a sequence $S^4(i)$ for a fourth layer may be multiplied by the orthogonal cover (1, −1, 1) and $S^4(i)$, −$S^4(i)$ and −$S^4(i)$ may be transmitted.

Although time domain covering is described in FIGS. 15(a) and 15(b), frequency domain covering may be applied to the same DRS pattern using the scheme described with reference to FIG. 15(c). That is, the first layer group and the second layer group may be distinguished using a TDM scheme and DRSs for two layers may be distinguished using two orthogonal codes having a length of 3 on three subcarriers between the two layers of each layer group. Similarly, although frequency domain covering is described in FIG. 15(c), time domain covering may be applied to the same DRS pattern using the scheme described with reference to FIG. 15(a) or 15(b). That is, the first layer group and the second layer group may be distinguished using an FDM scheme and DRSs for two layers may be distinguished using two orthogonal codes having a length of 2 on two subcarriers between the two layers of each layer group.

The above description of the present invention relates to multiplexing multiple layers using time resources, frequency resources and/or code resources, for transmission up to Rank 4.

In the case of Ranks 5 to 8, DRSs for multiple layers may be multiplexed by a combination of various embodiments for Ranks 2 to 4. That is, in the case of Rank 5 to 8 transmission, both the DRS group #0 (e.g., DRS locations denoted by A and B) and the DRS group #1 (e.g., DRS locations denoted by C and D) may be used and the various embodiments of the present invention for the above-described DRS group #0 (A and B) may be equally applied to the DRS group #1 (C and D). Accordingly, hereinafter, the overlapped description of the present invention will be omitted for clarity.

In the case of Ranks 5 and 8, the same number of layers may be distinguished in the DRS groups #0 and #1.

In the case of Rank 5 transmission, two layers may be distinguished using one DRS group according to a TDM, FDM and/or CDM scheme and three layers may be distinguished using another DRS group according to a TDM, FDM and/or CDM scheme. For example, the DRS groups #0 (e.g., A and B) and #1 (e.g., C and D) are distinguished by different time and frequency resources. In addition, first and second layers may be distinguished using the schemes of the embodiments of FIG. 12 with respect to the DRS group #0 and third, fourth and fifth layers may be distinguished using the schemes of the embodiments of FIG. 13 with respect to the DRS group #1 (e.g., C and D).

In the case of Rank 6 transmission, three layers may be distinguished using one DRS group according to a TDM, FDM and/or CDM scheme and three layers may be distinguished using another DRS group according to a TDM, FDM and/or CDM scheme.

In the case of Rank 7 transmission, three layers may be distinguished using one DRS group according to a TDM, FDM and/or CDM scheme and four layers may be distinguished using another DRS group according to a TDM, FDM and/or CDM scheme.

In the case of Rank 8 transmission, four layers may be distinguished using one DRS group according to a TDM, FDM and/or CDM scheme and four layers may be distinguished using another DRS group according to a TDM, FDM and/or CDM scheme.

As described above, DRSs may be arranged on a total of 24 REs within one RB, DRSs may be multiplexed and transmitted using 12 REs among 24 REs in the case of low Ranks (e.g., Ranks 1 and 2) and DRSs may be multiplexed and transmitted using all 24 REs in the case of high Ranks (e.g., Ranks 3 to 8). For example, DRSs for layers 1, 2, 5 and 6 may be arranged at A and B locations and DRSs for layers 3, 4, 7 and 8 may be arranged at C and D locations.

Figure 16:
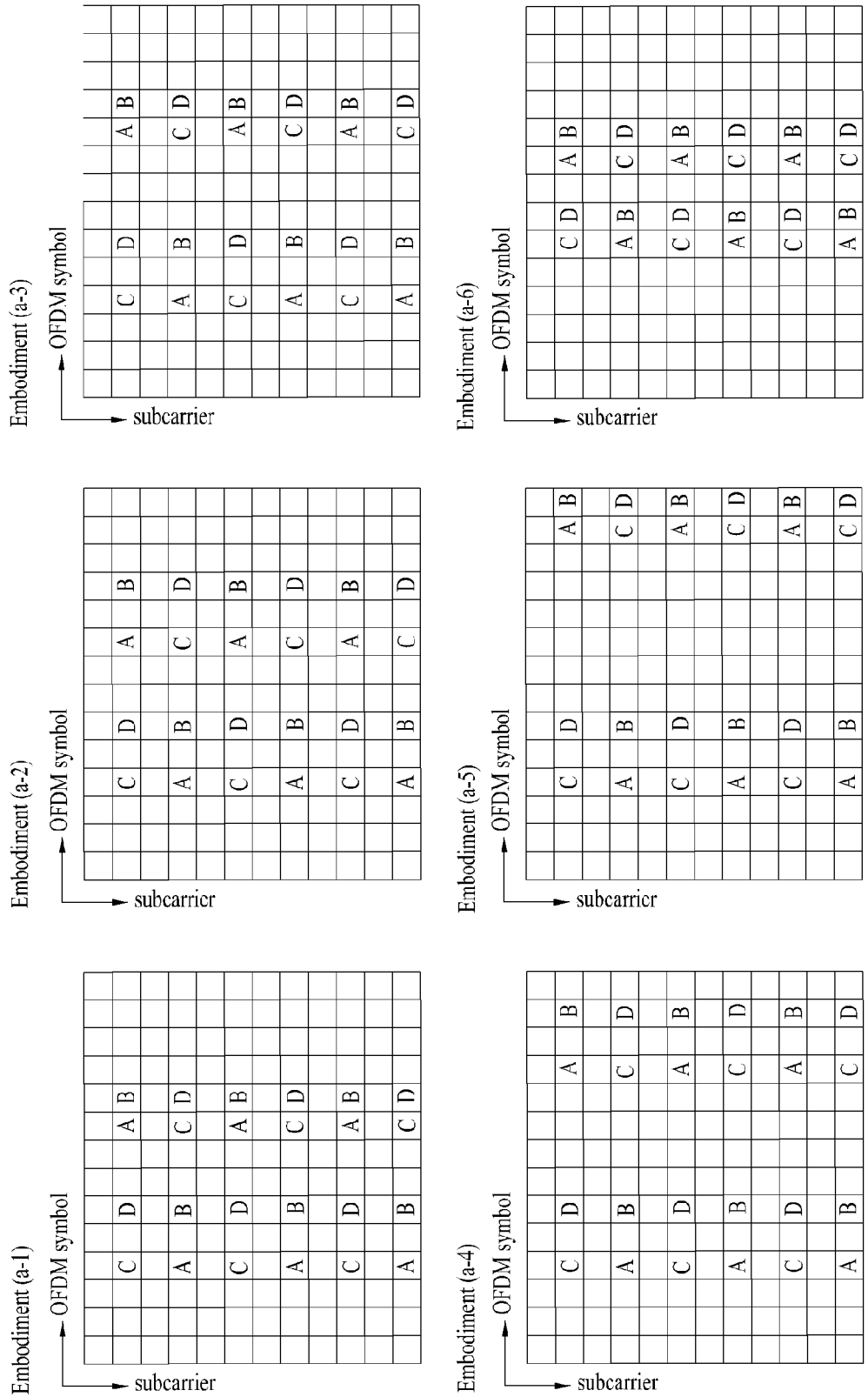
FIGS. 16 to 30 are diagrams showing various modifications of a DRS pattern to which the present invention is applicable.
Figure 17:
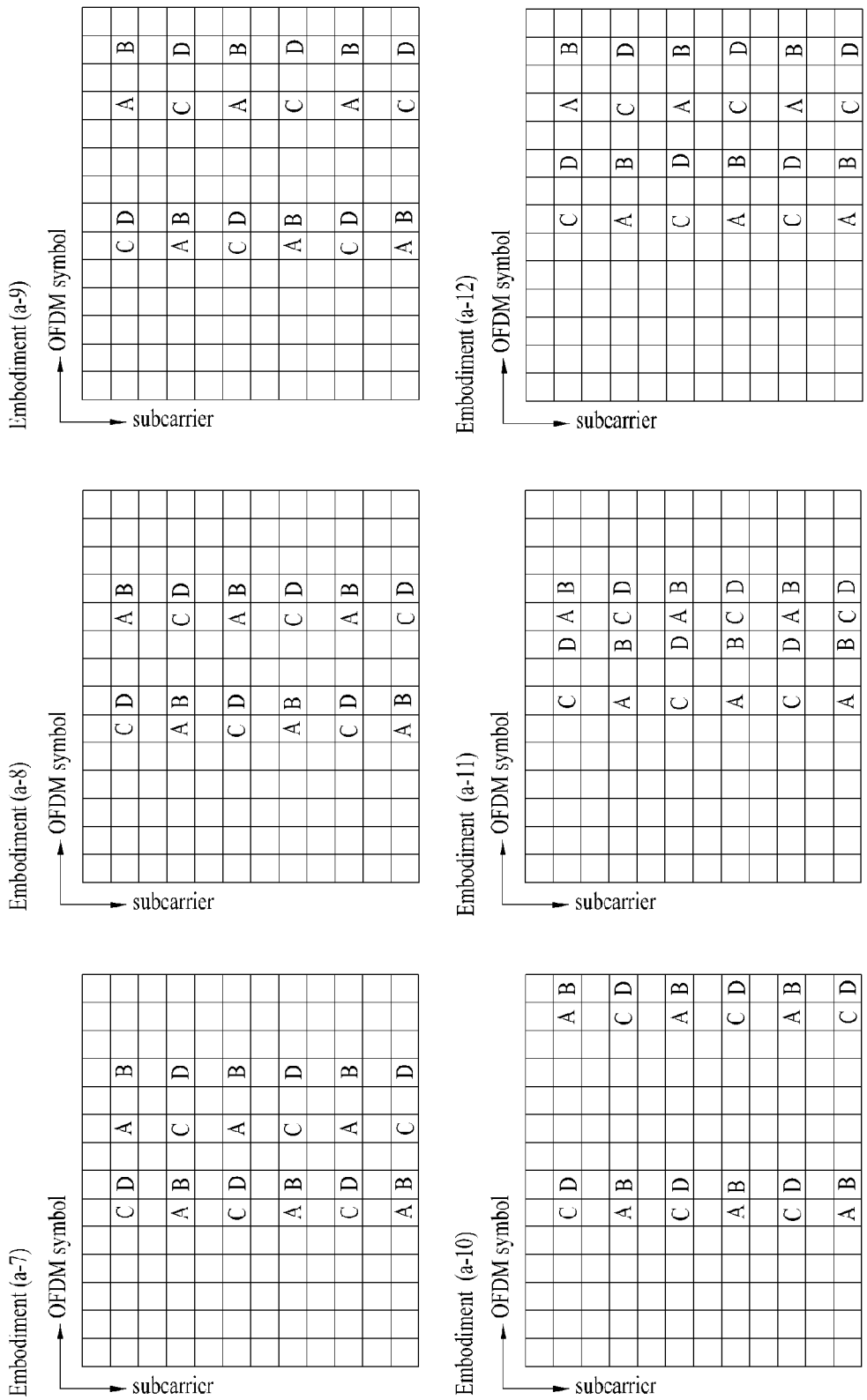
Figure 18:
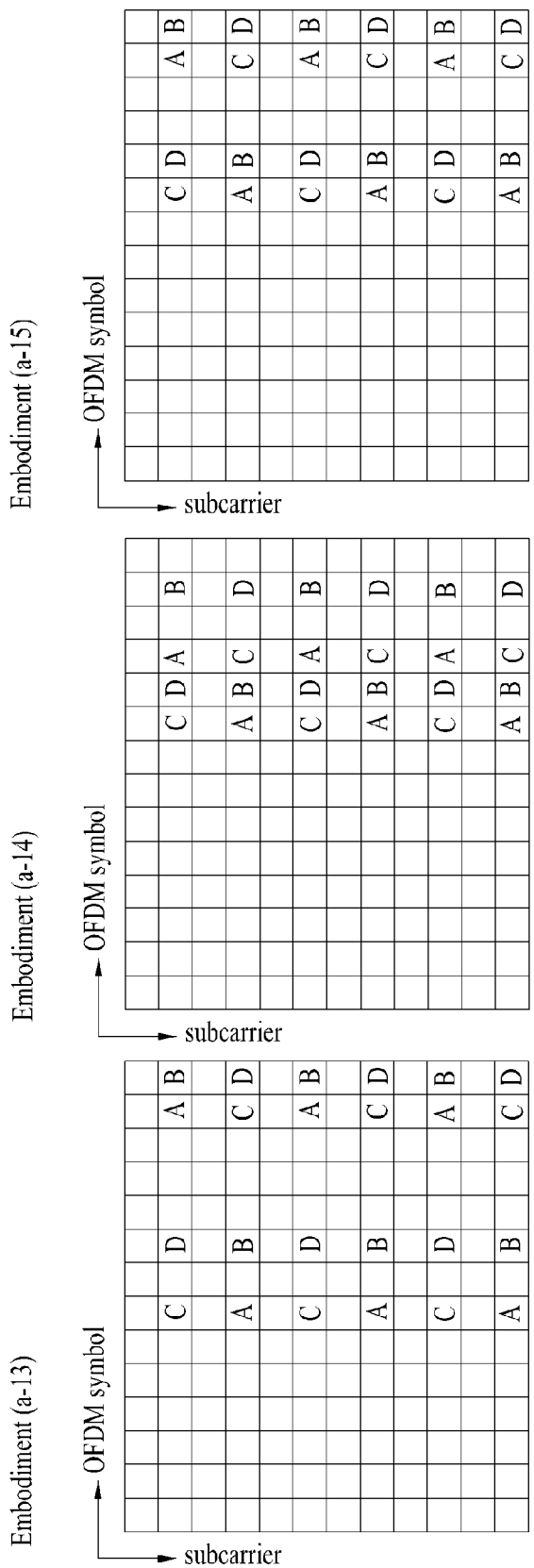
Figure 19:
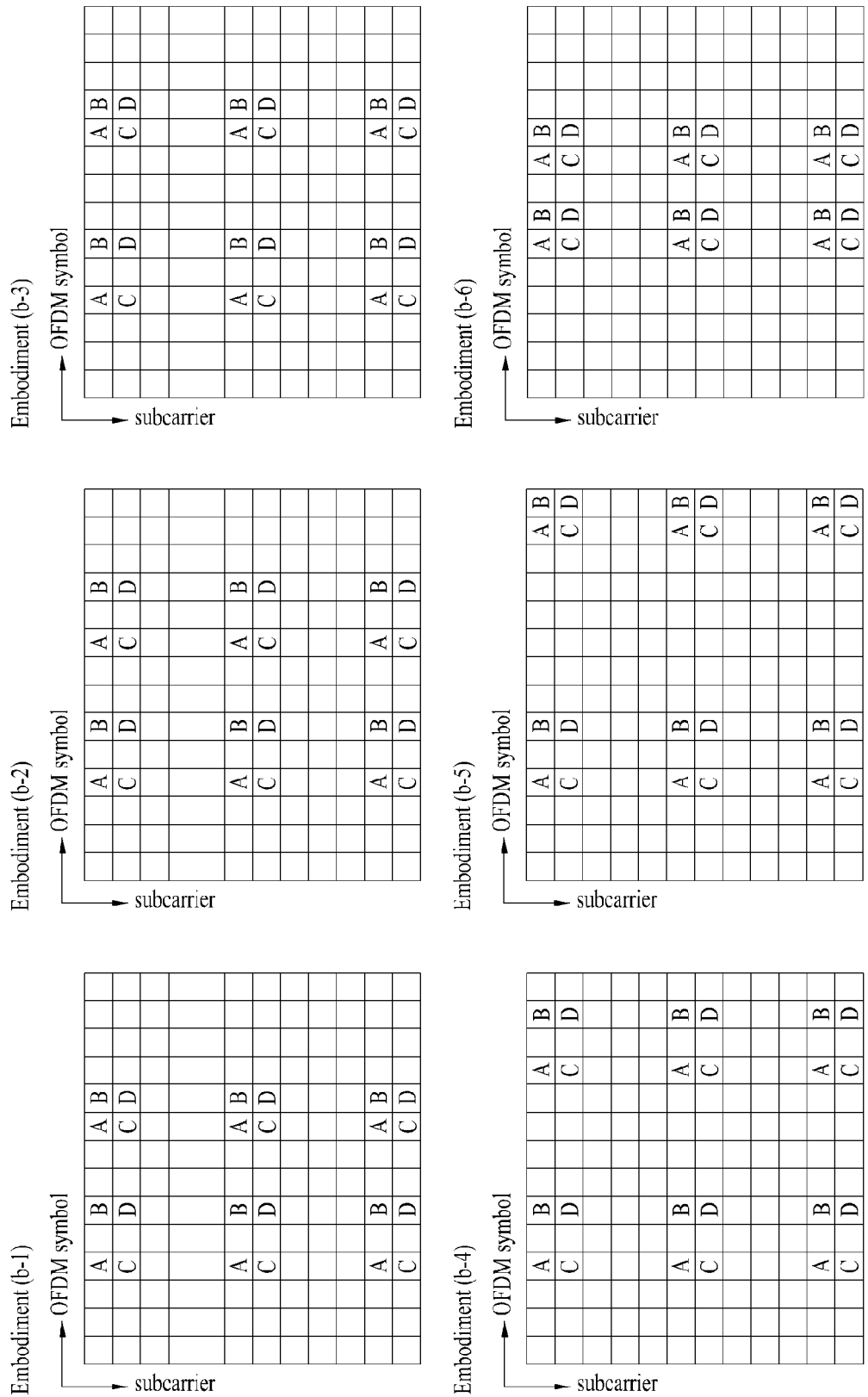
Figure 20:
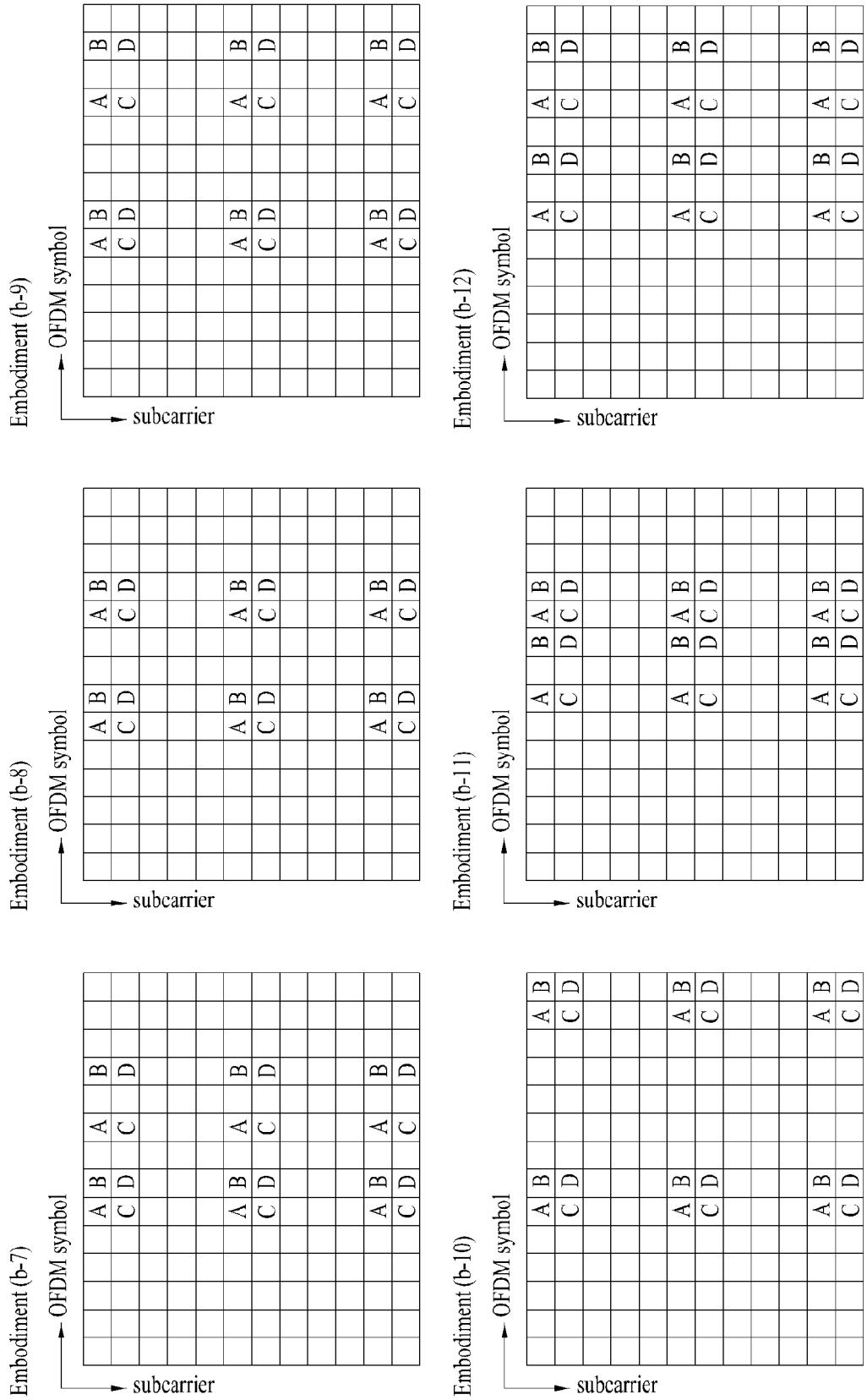
Figure 21:
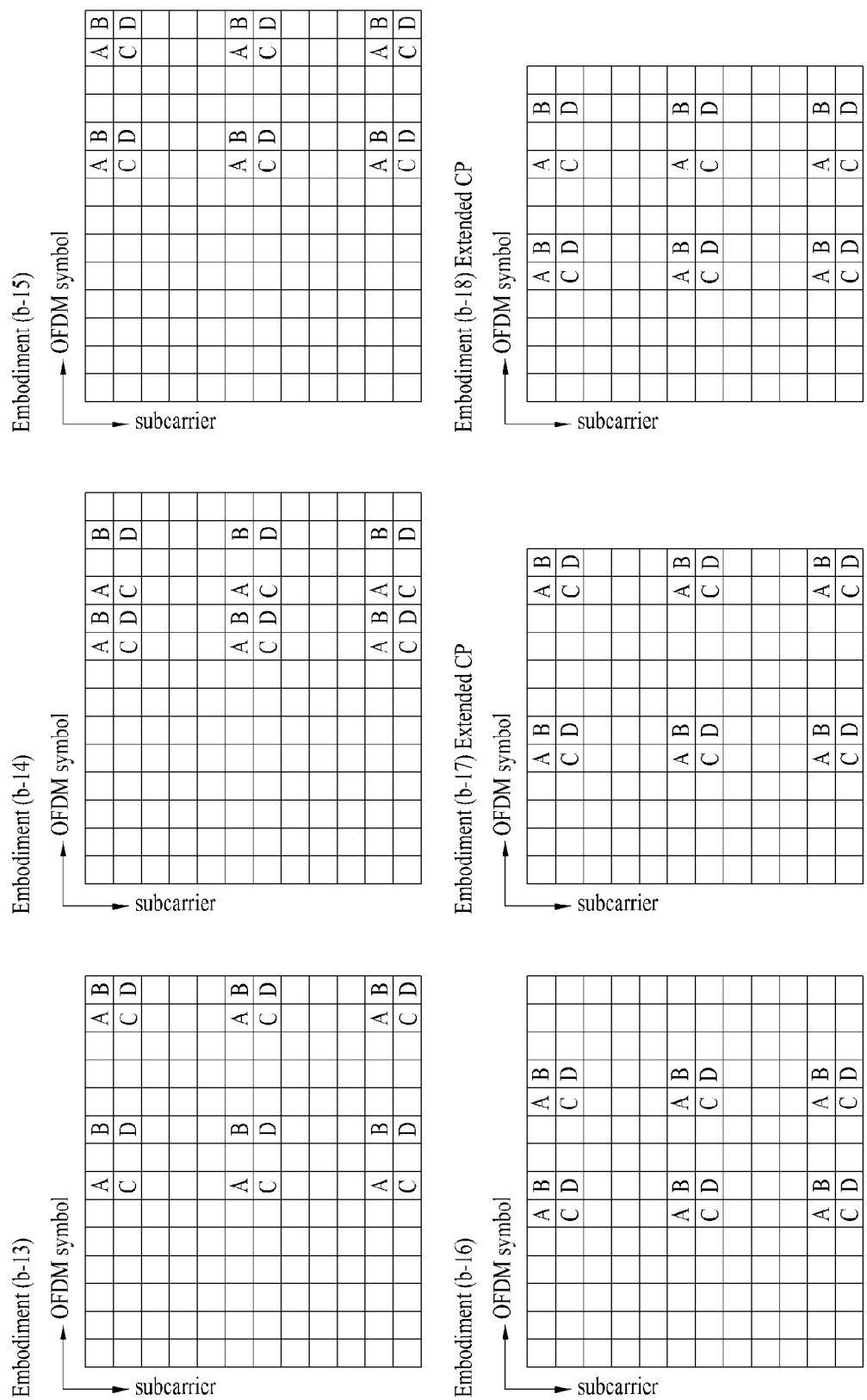
Figure 22:
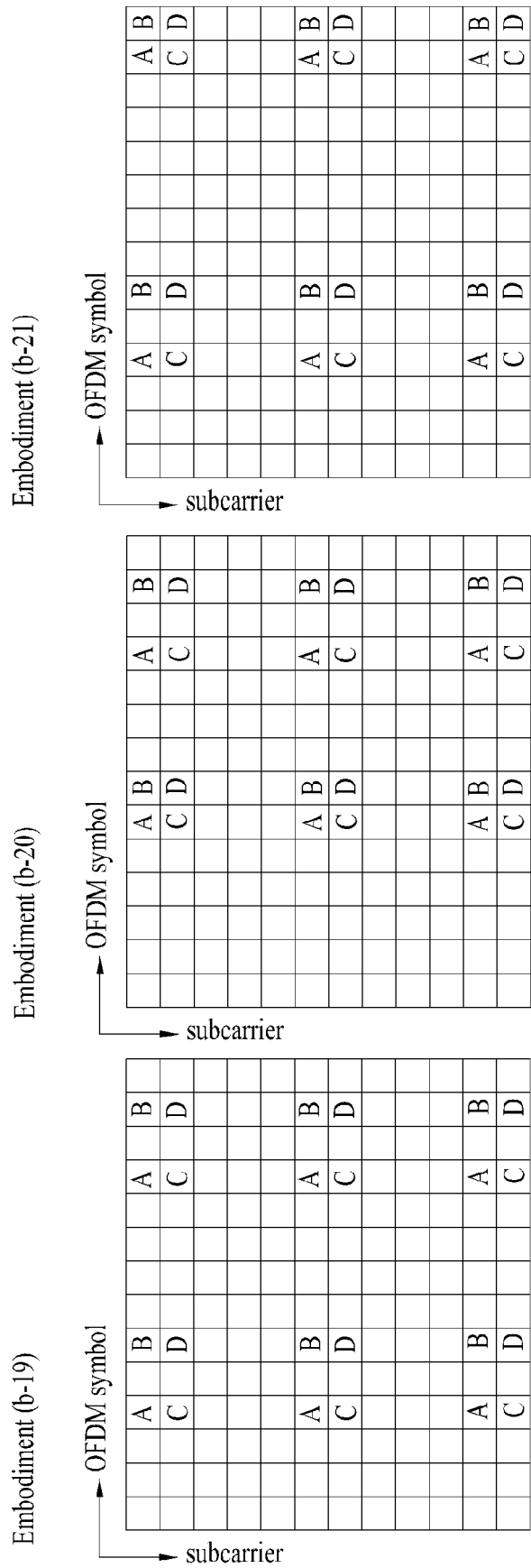
Figure 23:
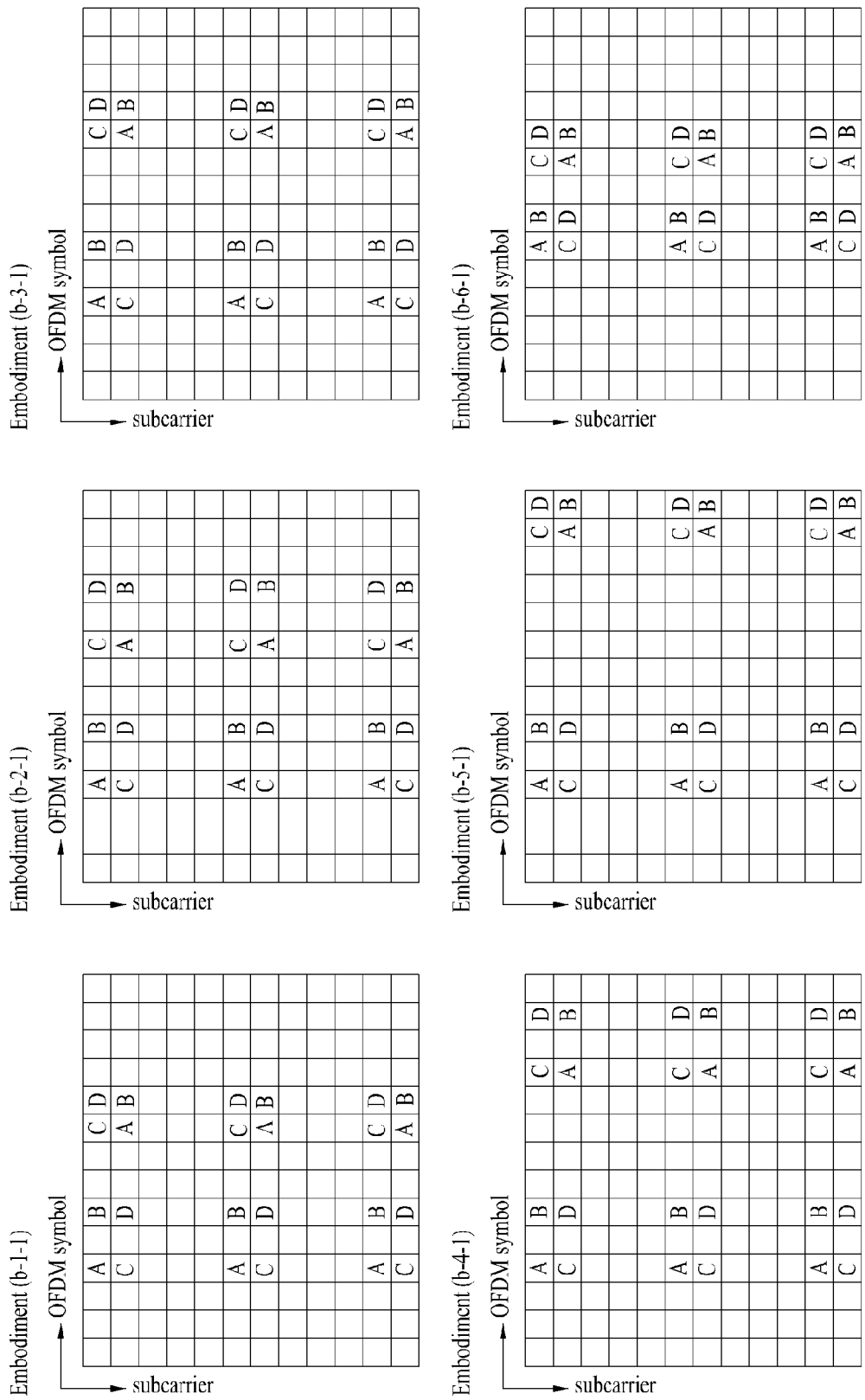
Figure 24:
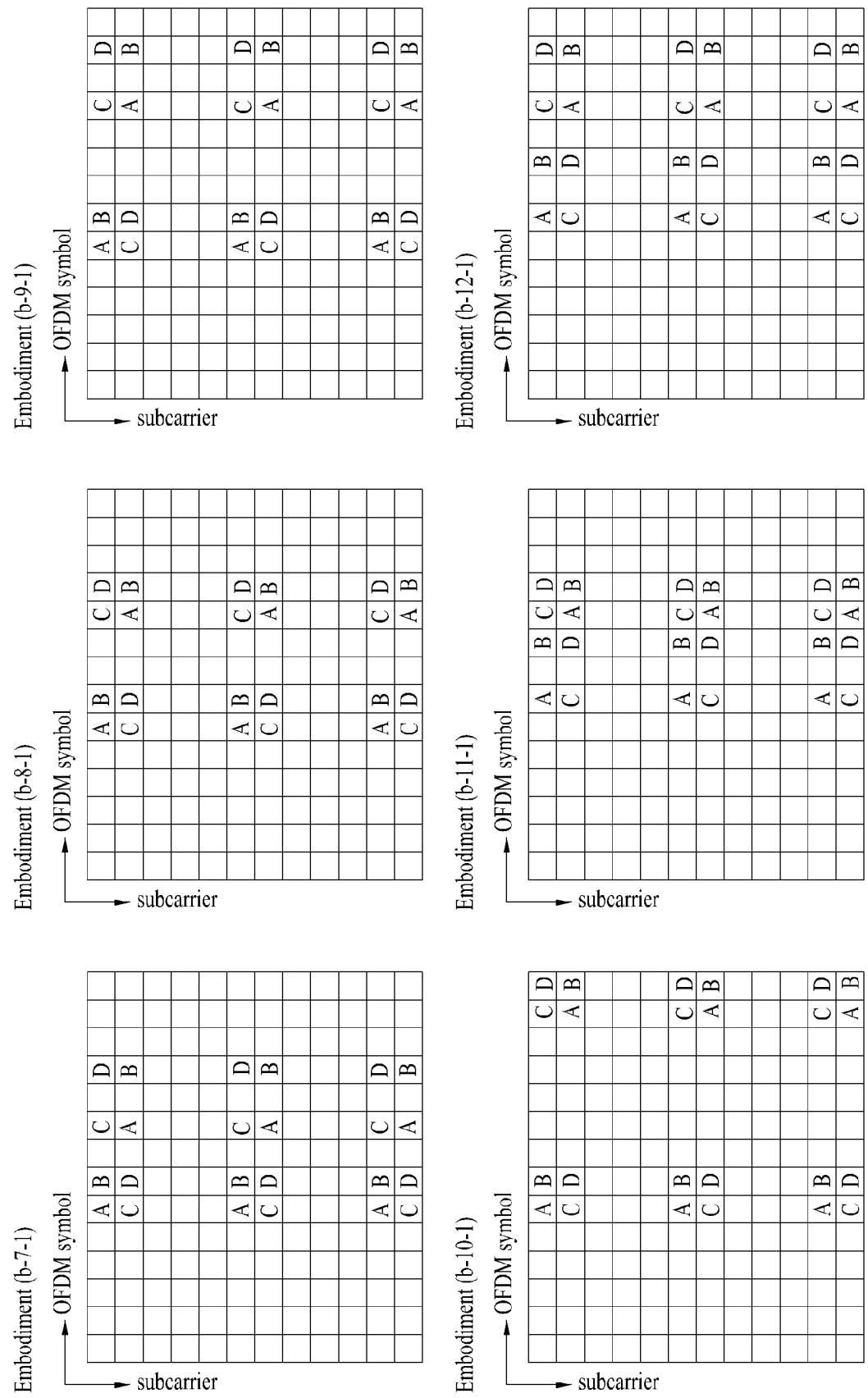

FIGS. 16 to 18 show various modifications of the DRS pattern shown in FIG. 6(a).

Figure 25:
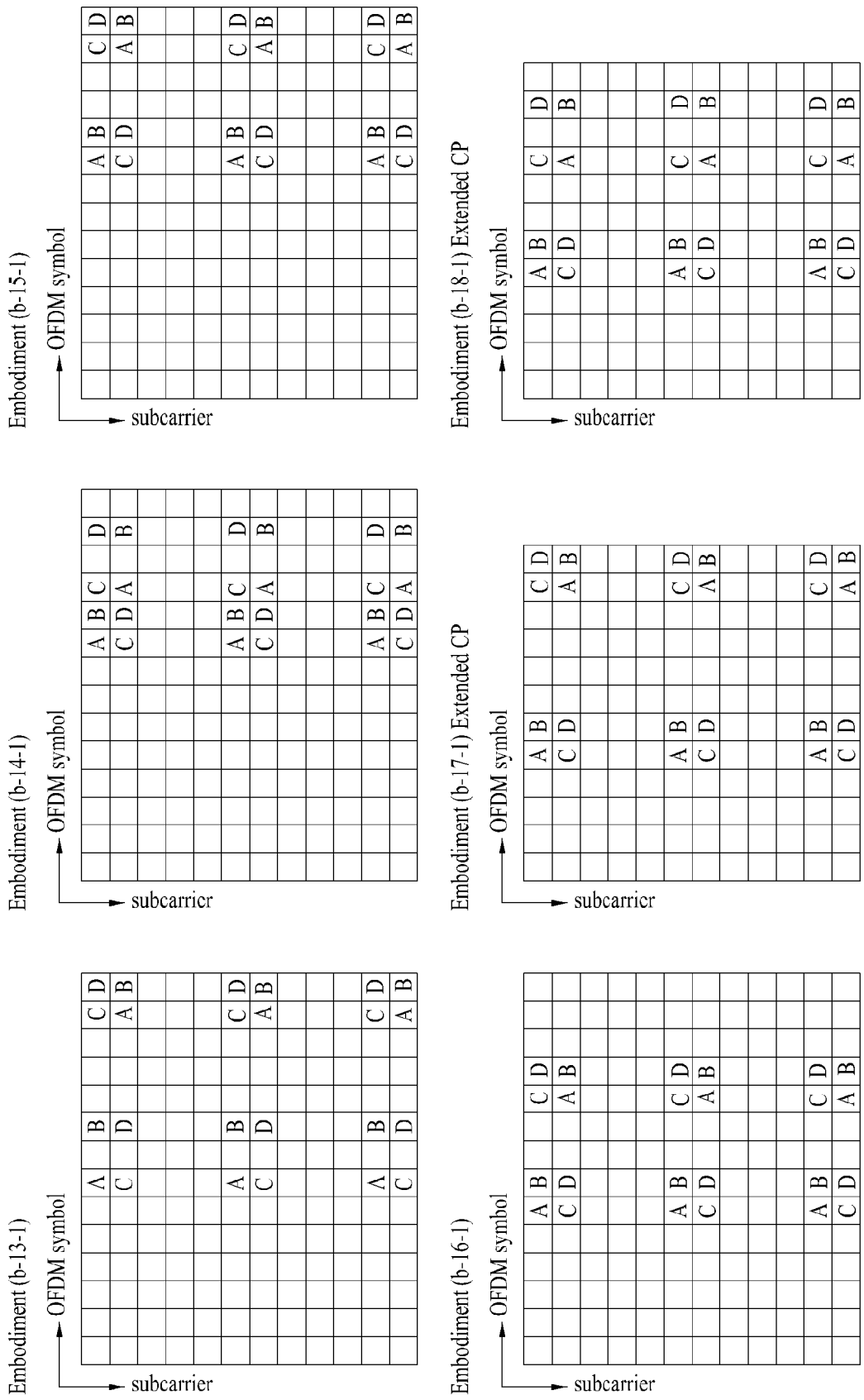
Figure 26:
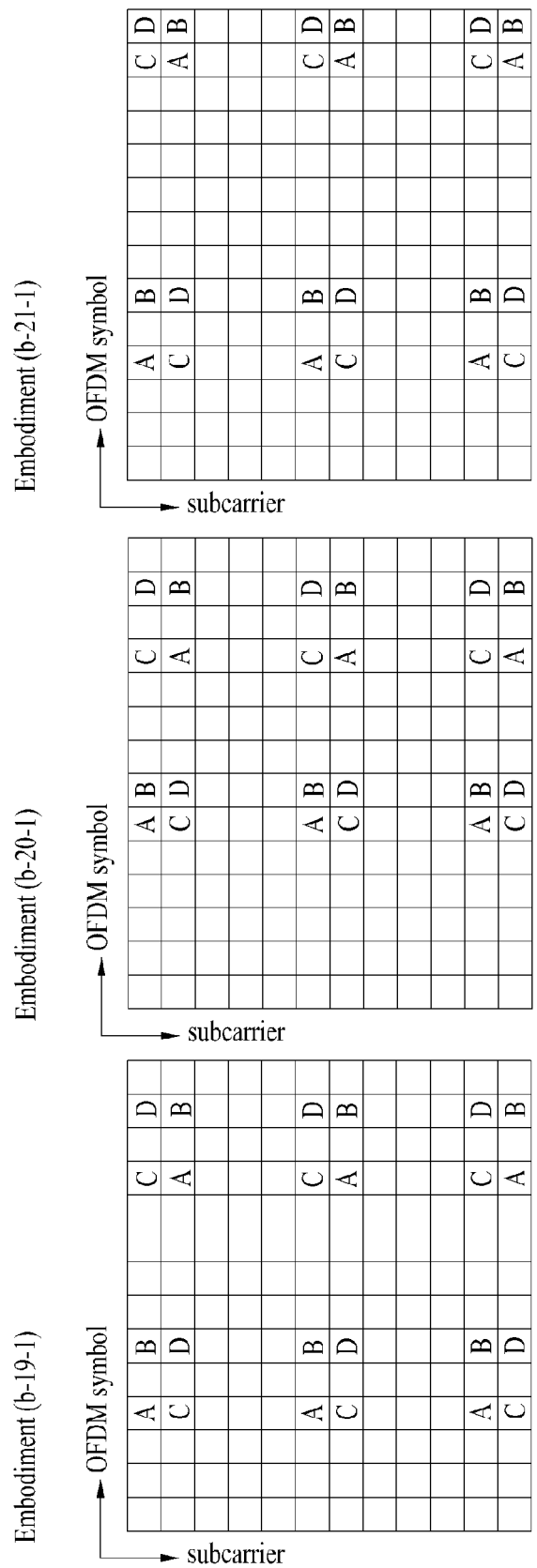
Figure 27:
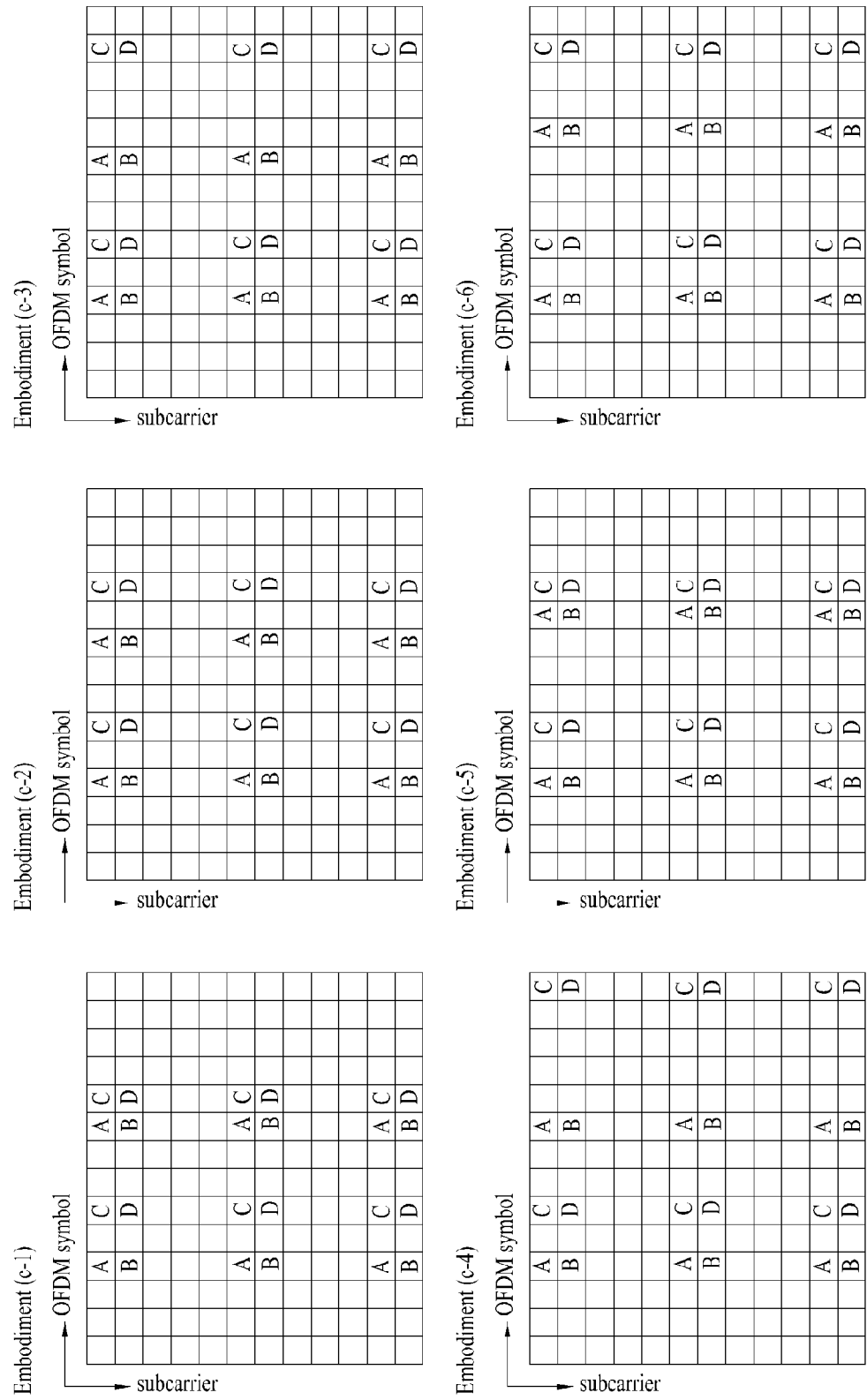
Figure 28:
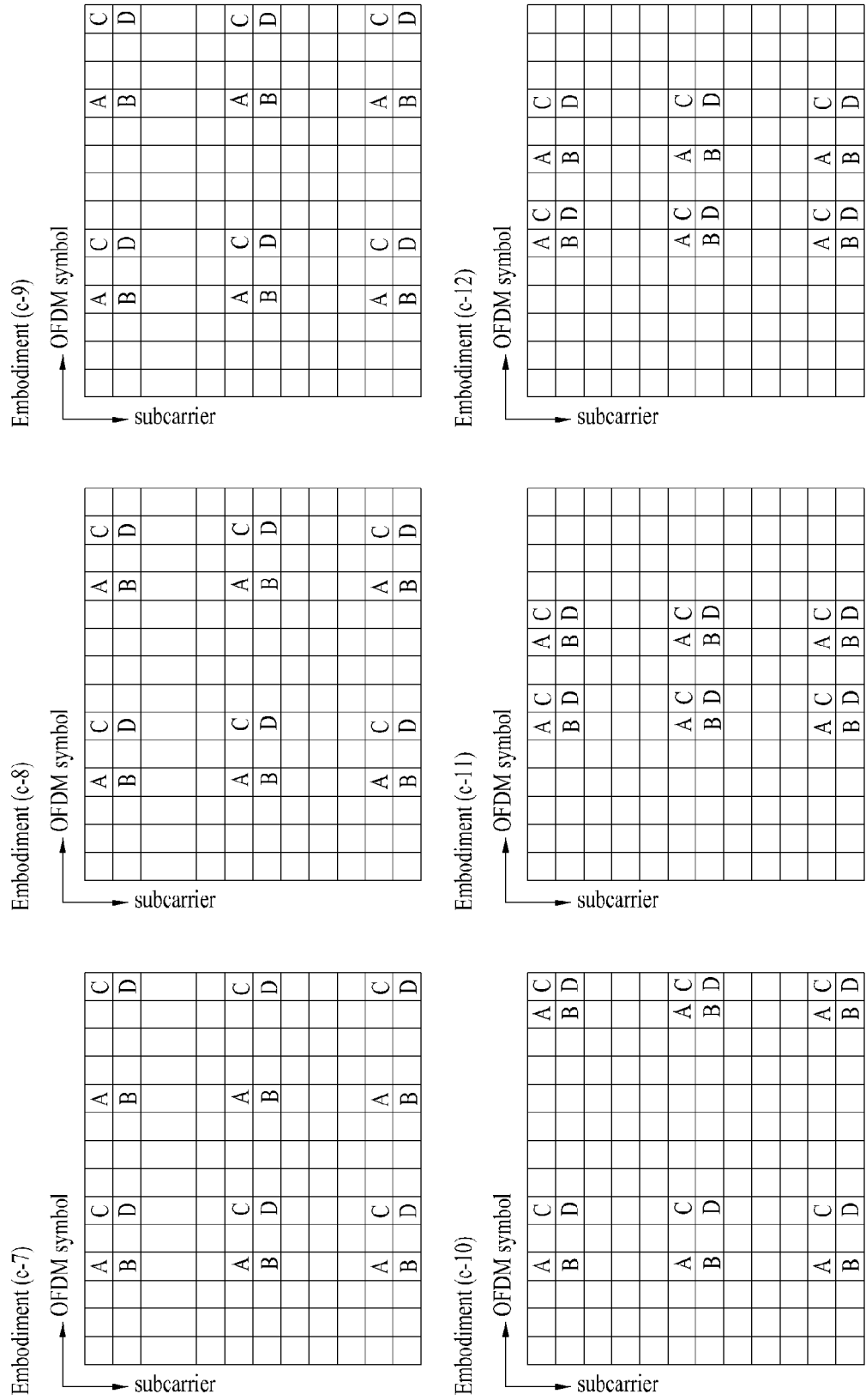
Figure 29:
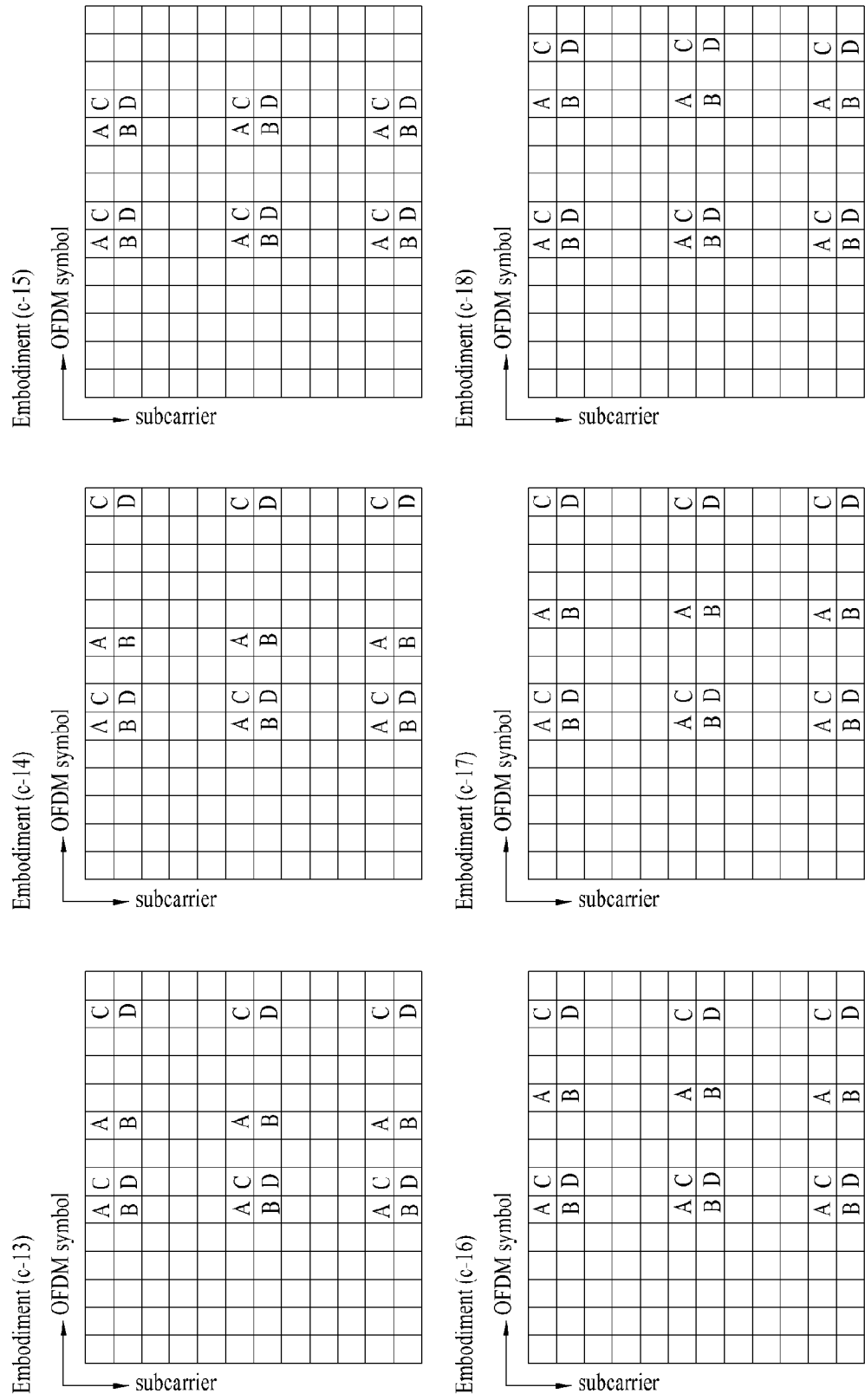
Figure 30:
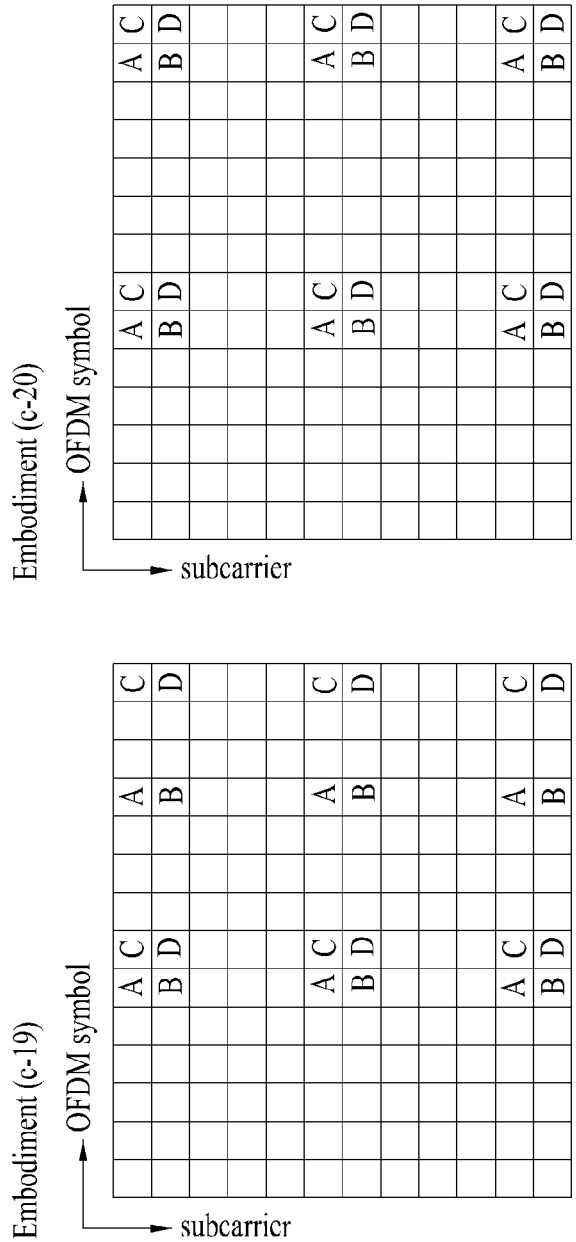

FIGS. 19 to 22 show various modifications of the DRS pattern shown in FIG. 6(b). FIGS. 23 to 26 show modifications in which DRS locations of a second slot are swapped between DRS groups. That is, the locations of A and B and the locations of C and D of the second slot are swapped in the frequency domain, thereby improving channel estimation performance. Embodiments (b-17) and (b-18) of FIG. 21 and embodiments (b-17-1) and (b-18-1) of FIG. 25 show DRS patterns in the case of an extended CP.

FIGS. 27 to 30 show various modifications of the DRS pattern shown in FIG. 6(c).

The features of the present invention described with reference to FIGS. 6 to 15 may be equally applied to various DRS patterns of FIGS. 16 to 30. In particular, various embodiments of the present invention of distinguishing and multiplexing DRSs for multiple layers using time resources, frequency resources and/or code resources may be easily applied to various DRS patterns of FIGS. 16 to 30. In addition, as described above, the method of multiplexing DRSs for layers up to Rank 8 may be applied to various DRS patterns of FIGS. 16 to 30. Accordingly, the above-described DRS multiplexing method is applied to various DRS patterns without departing from the scope of the present invention.

Figure 31:
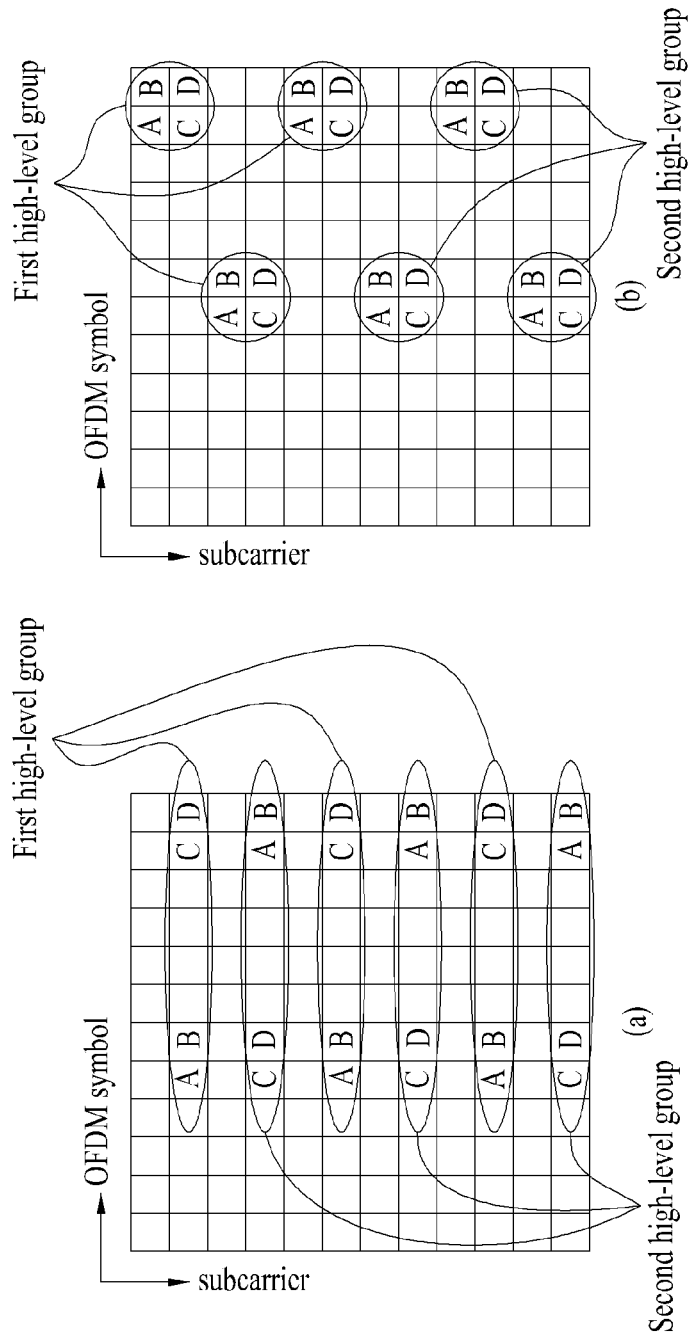
FIG. 31 is a diagram illustrating multiplexing groups of DRS patterns according to the present invention.
Figure 32:
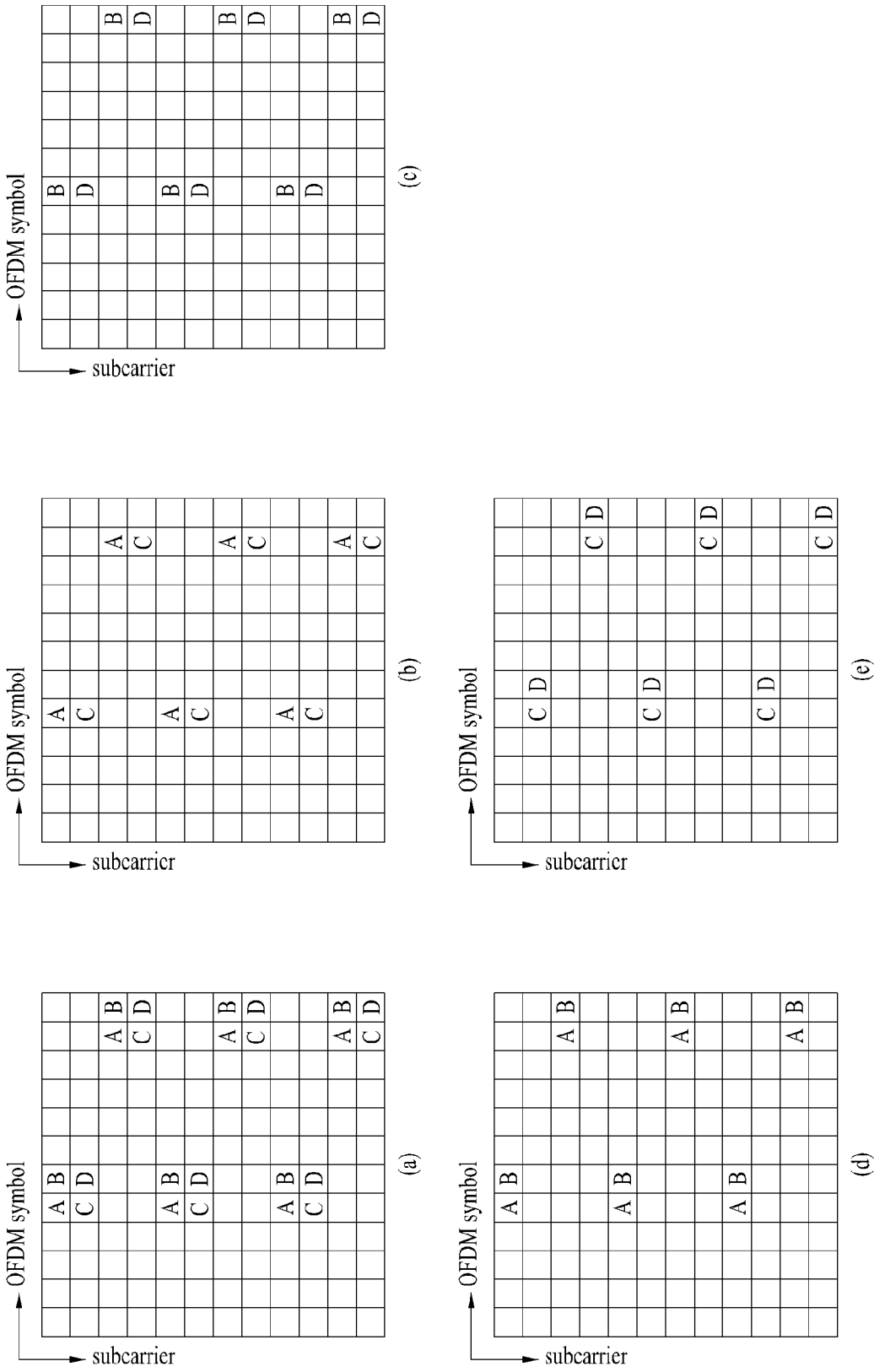
FIGS. 32 to 58 are diagram showing various modifications of a DRS pattern to which the present invention is applicable.

Multiplexing groups of DRS patterns according to the present invention will be described with reference to FIG. 31.

FIGS. 31(a) and 31(b) show DRS multiplexing group settings of a type A and a type B, respectively. DRS multiplexing according to transmission rank in FIGS. 31(a) and 31(b) is shown in Table 4.

TABLE 4

|  | Type A (FIG. 31(a)) | Type B (FIG. 31(b)) |
| --- | --- | --- |
| Ranks 1 to 2 | Layers 1 to 2: A and B (or C and D) | Layers 1 to 2: A and B (or C and D) |
| Ranks 3 to 4 | Layers 1 to 2: A and B (or C and D) Layers 3 to 4: C and D (or A and B) | Layers 1 to 2: A and B (or C and D) Layers 3 to 4: C and D (or A and B) |
| Ranks 5 to 8 | REs of A, B, C and D locations located on the same frequency are grouped and DRSs are transmitted using a CDM scheme. Two high-level groups are used and DRSs for Ranks 2 to 4 are transmitted in each high-level group (2 + 3, 3 + 3, 3 + 4, 4 + 4). | REs of A, B, C and D locations located on contiguous symbols/frequency are grouped and DRSs are transmitted using a CDM scheme. Two high-level groups are used and DRSs for Ranks 2 to 4 are transmitted in each high-level group (2 + 3, 3 + 3, 3 + 4, 4 + 4). |

DRS patterns may be divided into two groups. For example, as described with reference to Table 1, one group includes A and B and another group includes C and D, one group includes A and C and another group includes B and D, or one group includes A and D and another group includes B and C. In the following description, it is assumed that one group includes A and B and another group includes C and D.

In the case of Ranks 1 and 2, only one group of the DRS patterns may be used. For example, for DRS transmission, only a pattern including A and B (or C and D) may be used.

In the case of Rank 1, DRSs for a layer 1 may be arranged on REs denoted by A and B (or C and D). In the case of Rank 2, DRSs for layers 1 and 2 may be arranged on REs denoted by A and B (or C and D). Here, the DRSs for the layers 1 and 2 may be multiplexed using a CDM scheme.

In the case of Ranks 3 and 4, both the two groups of the DRS patterns may be used.

In the case of Rank 3, DRSs for the layers 1 and 2 may be arranged on one group (e.g., A and B) of DRS patterns and DRSs for the layer 3 may be arranged on another group (e.g., C and D). Here, the DRSs for the layers 1 and 2 may be multiplexed using a CDM scheme.

In the case of Rank 4, DRSs for the layers 1 and 2 may be arranged on one group (e.g., A and B) of DRS patterns and DRSs for the layers 3 and 4 may be arranged on another group (e.g., C and D). Here, the DRSs for the layers 1 and 2 may be multiplexed using a CDM scheme and DRSs for the layers 3 and 4 may be multiplexed using a CDM scheme.

In the case of Ranks 5 to 8, a DRS pattern group different from the above-described DRS pattern groups (one group includes A and B and another group includes C and D), which is expressed by a high-level group of DRS patterns.

In the case of Type A (FIG. 31(a)), A, B, C and D located on the same frequency may be combined and defined as a group (that is, six groups are present) and these groups may be combined and defined as two high-level groups. For example, the first high-level group may include groups A, B, C and D and the second high-level group may include C, D, A and B. The configuration of the high-level group is not limited thereto and different configurations of the high-level groups may be set. DRSs for two or more layers in each high-level group may be multiplexed and transmitted using a CDM scheme. DRSs transmitted in the first high-level group and the second high-level group may be distinguished using an FDM scheme.

In the case of Type A (FIG. 31(b)), A, B, C and D located on contiguous symbols/frequencies may be combined and defined as a group (that is, six groups are present) and two high-level groups may be defined. For example, the first high-level group may include three groups located on high frequencies and the second high-level group may include three groups located on low frequencies. Alternatively, the first high-level group may include three groups located on a first slot and the second high-level group may include three groups located on a second slot. Alternatively, the first high-level group may include two groups located on a first slot and one group located on a second slot and the second high-level group may include one group located on a first slot and two groups located on a second slot. The configuration of the high-level group is not limited thereto and different configurations of the high-level groups may be set. The high-level groups may include REs located on contiguous OFDM symbols and subcarriers and DRSs for two or more layers may be multiplexed and transmitted using a CDM scheme.

If the high-level groups are configured as described above, a method of multiplexing DRSs in the case of Ranks 5 to 8 for the DRS multiplexing method of Type A and Type B will be described.

In the case of Rank 5, DRSs for two layers may be multiplexed and arranged in a first high-level group using a CDM scheme and DRSs for three layers may be multiplexed and arranged in a second high-level group using a CDM scheme. Alternatively, DRSs for three layers may be multiplexed and arranged in a first high-level group using a CDM scheme and DRSs for two layers may be multiplexed and arranged in a second high-level group using a CDM scheme.

In the case of Rank 6, DRSs for three layers may be multiplexed and arranged in a first high-level group using a CDM scheme and DRSs for three layers may be multiplexed and arranged in a second high-level group using a CDM scheme.

In the case of Rank 7, DRSs for three layers may be multiplexed and arranged in a first high-level group using a CDM scheme and DRSs for four layers may be multiplexed and arranged in a second high-level group using a CDM scheme. Alternatively, DRSs for four layers may be multiplexed and arranged in a first high-level group using a CDM scheme and DRSs for three layers may be multiplexed and arranged in a second high-level group using a CDM scheme.

In the case of Rank 8, DRSs for four layers may be multiplexed and arranged in a first high-level group using a CDM scheme and DRSs for four layers may be multiplexed and arranged in a second high-level group using a CDM scheme.

Meanwhile, when DRSs for certain layers are transmitted using an FDM scheme, DRSs separated in the frequency domain may use the same sequence. For example, when DRSs for first and second layers are transmitted at locations A and B and DRSs for third and third layers are transmitted at location C and D, the sequence of the DRSs for the first and second layers may be used as the sequence of the DRSs for the third and fourth layers. The sequence of the DRSs for two or more layers transmitted on the same RE may be multiplexed using the same sequence or different sequences according to a CDM scheme.

FIGS. 32 to 58 show various embodiments of a DRS pattern according to the present invention in the case of an extended CP.

FIG. 32(a) shows another embodiment of a DRS pattern according to the present invention. Based on a basic DRS pattern of FIG. 32(a), as shown in FIGS. 32(b) to 32(e), various DRS pattern groups may be defined. FIGS. 32(b) and 32(c) show examples in which one DRS group includes A and C and another DRS group includes B and D. In this case, DRSs for a plurality of layers within one DRS group may be multiplexed using a CDM-F scheme (a CDM scheme for applying an orthogonal code over different subcarrier locations on the same OFDM symbol). FIGS. 32(d) and 32(e)

show examples in which one DRS group includes A and B and another DRS group includes C and D. In this case, DRSs for a plurality of layers within one DRS group may be multiplexed using a CDM-T scheme (a CDM scheme for applying an orthogonal code over different OFDM symbol locations on the same subcarrier).

Figure 33:
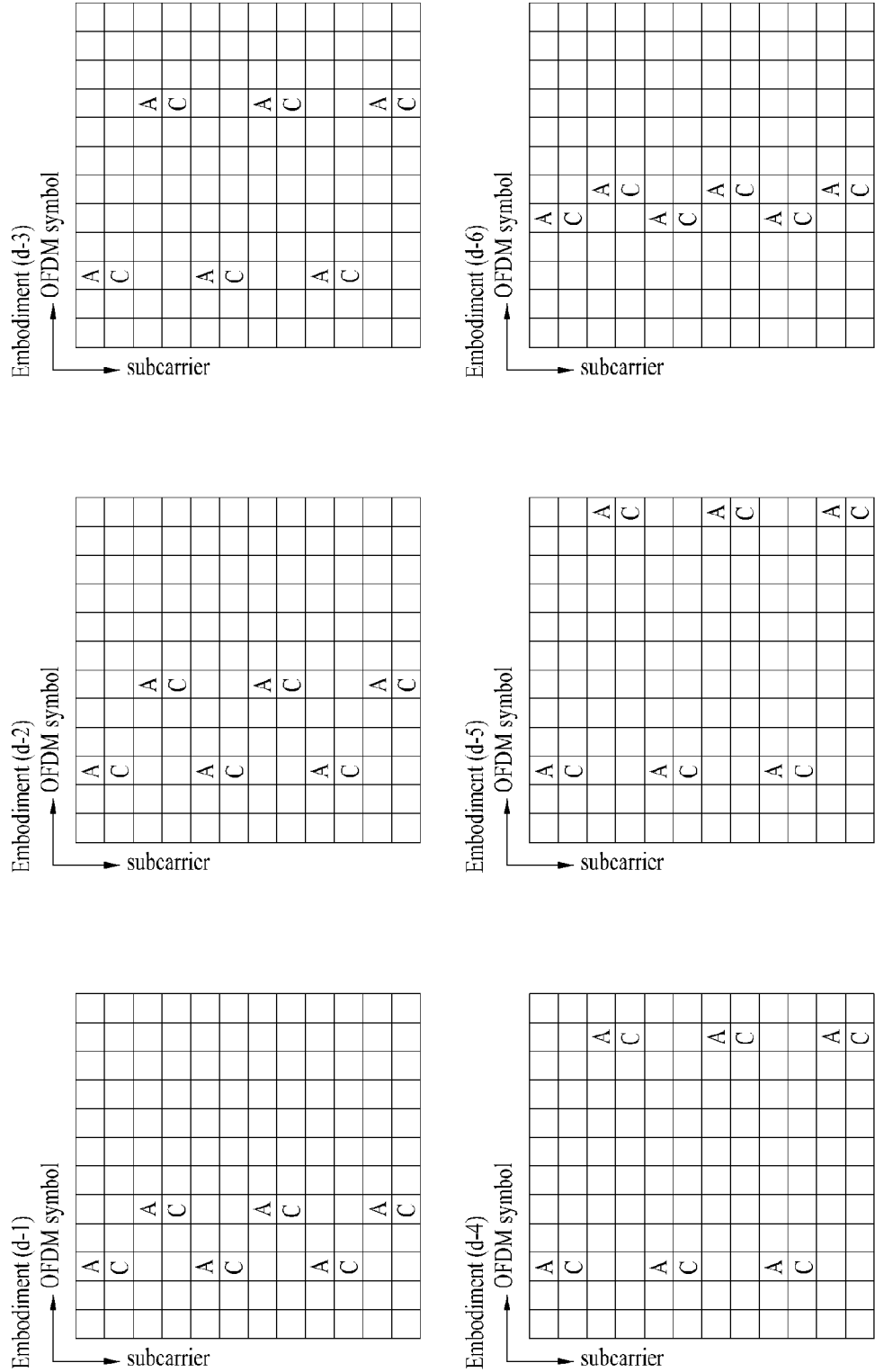
Figure 34:
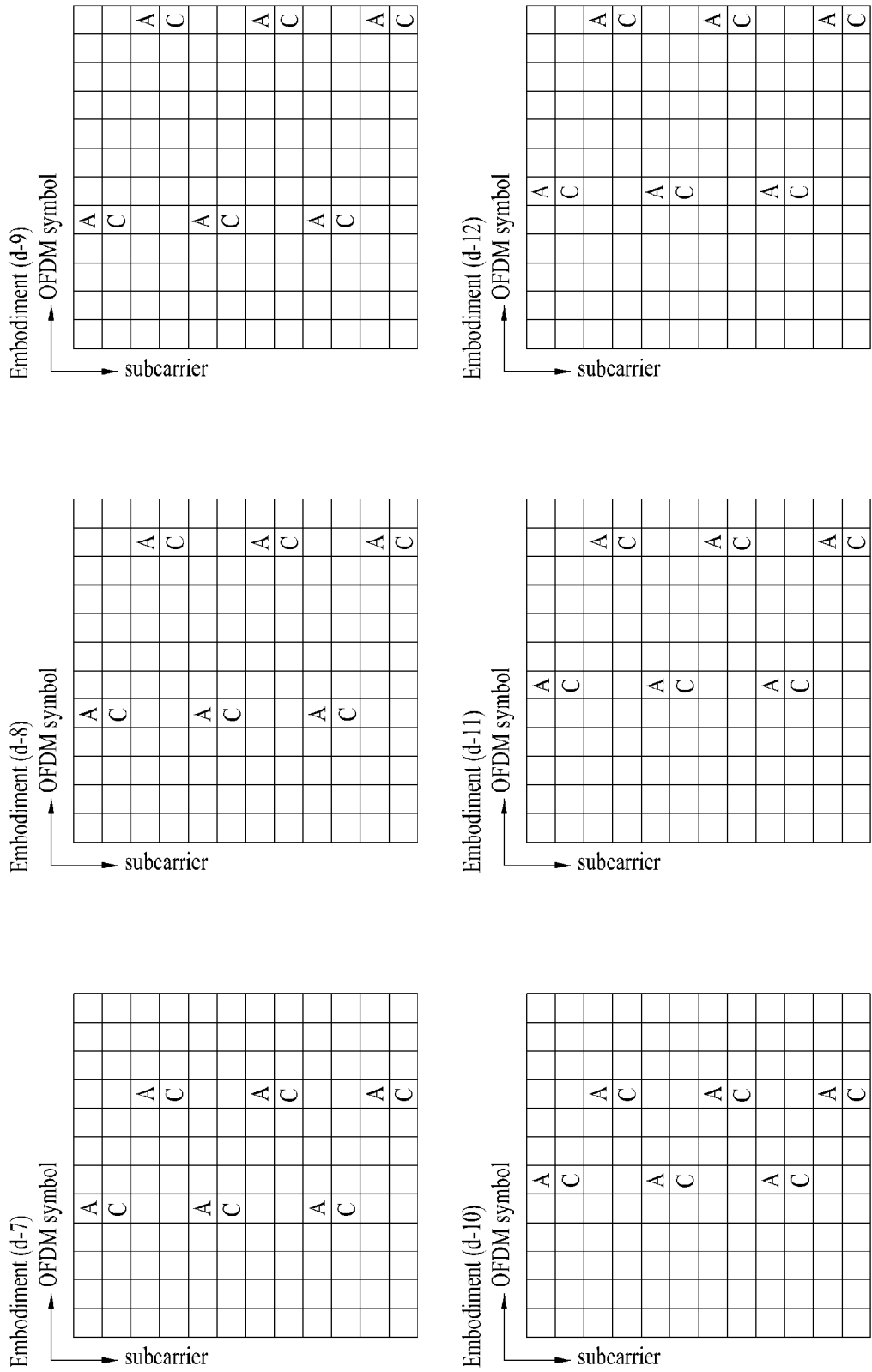
Figure 35:
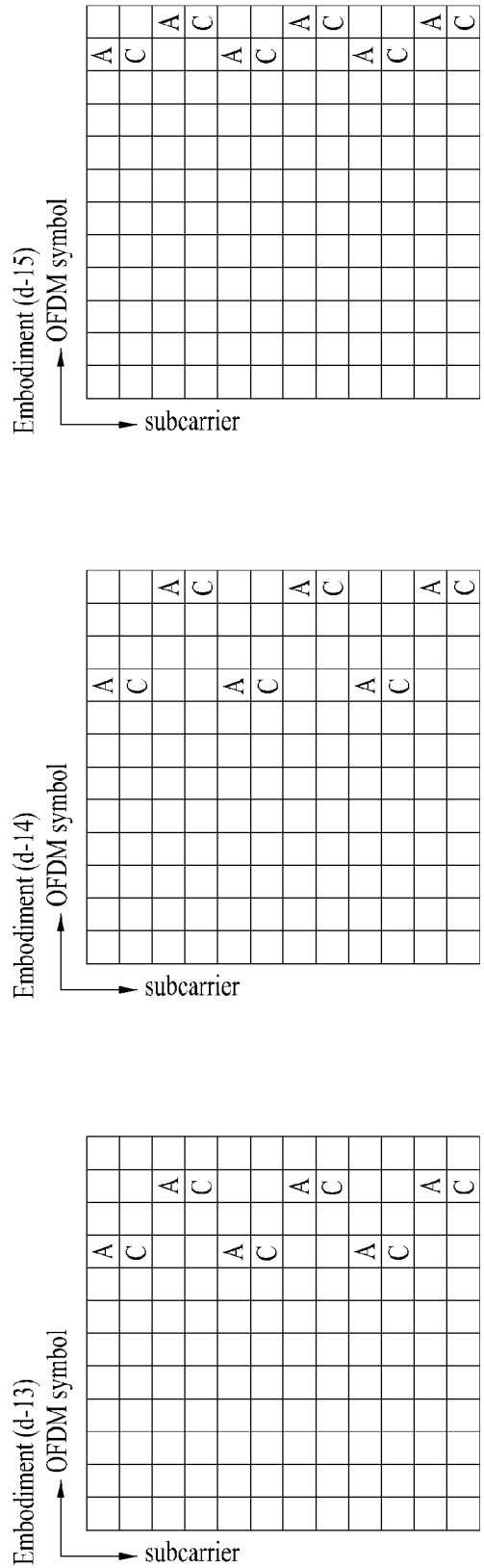

FIGS. 33 to 35 show various modifications of a location on a RB of a DRS group of FIG. 32(b). Since the locations of the DRS groups are changed in the time (OFDM symbol) in modifications of FIGS. 33 to 35, they may be time-shifted (T-shifted). The DRS groups of FIGS. 32(c) to 32(e) may be T-shifted using methods similar to the modifications of FIGS. 33 to 35.

Figure 36:
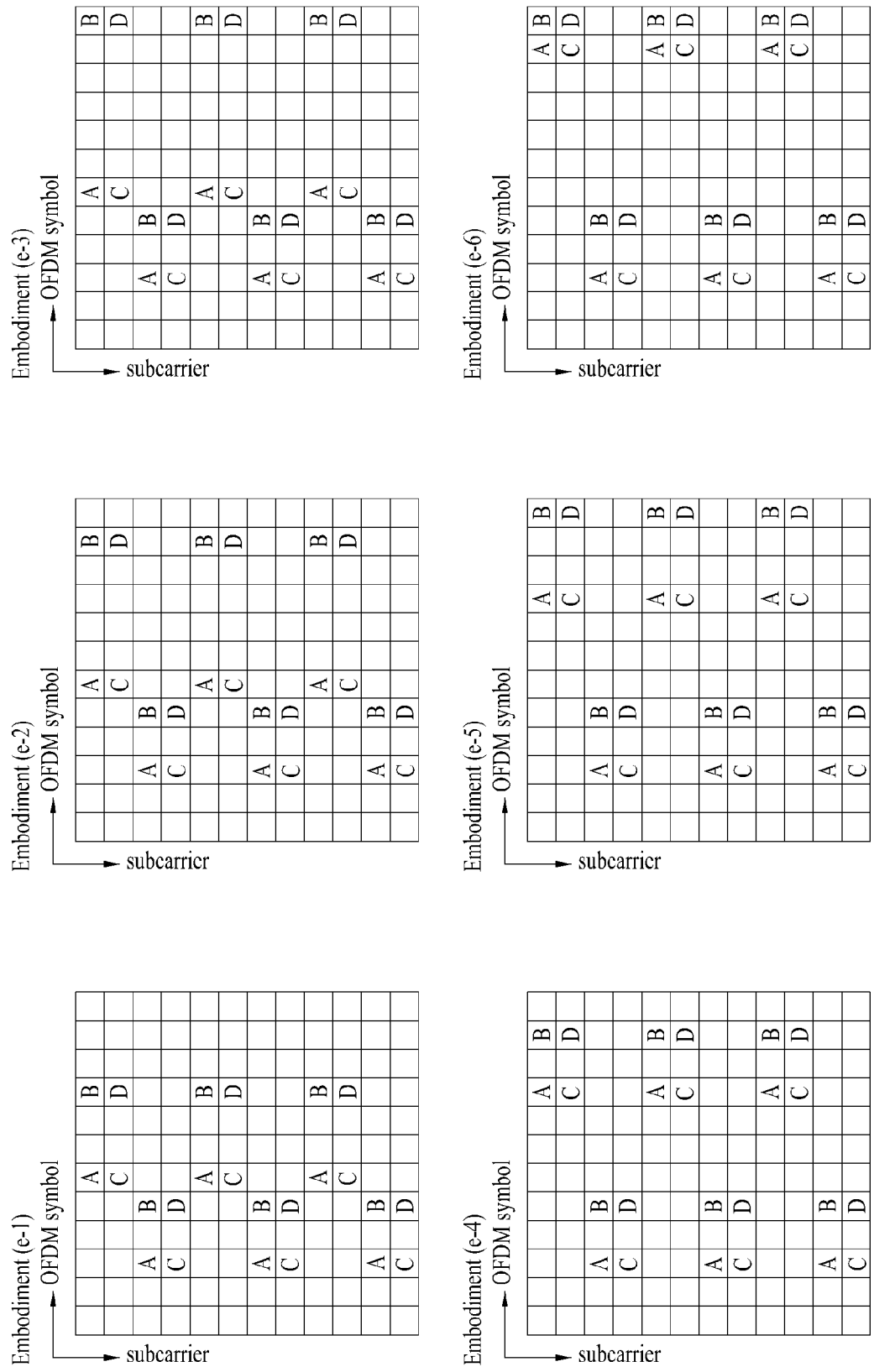
Figure 37:
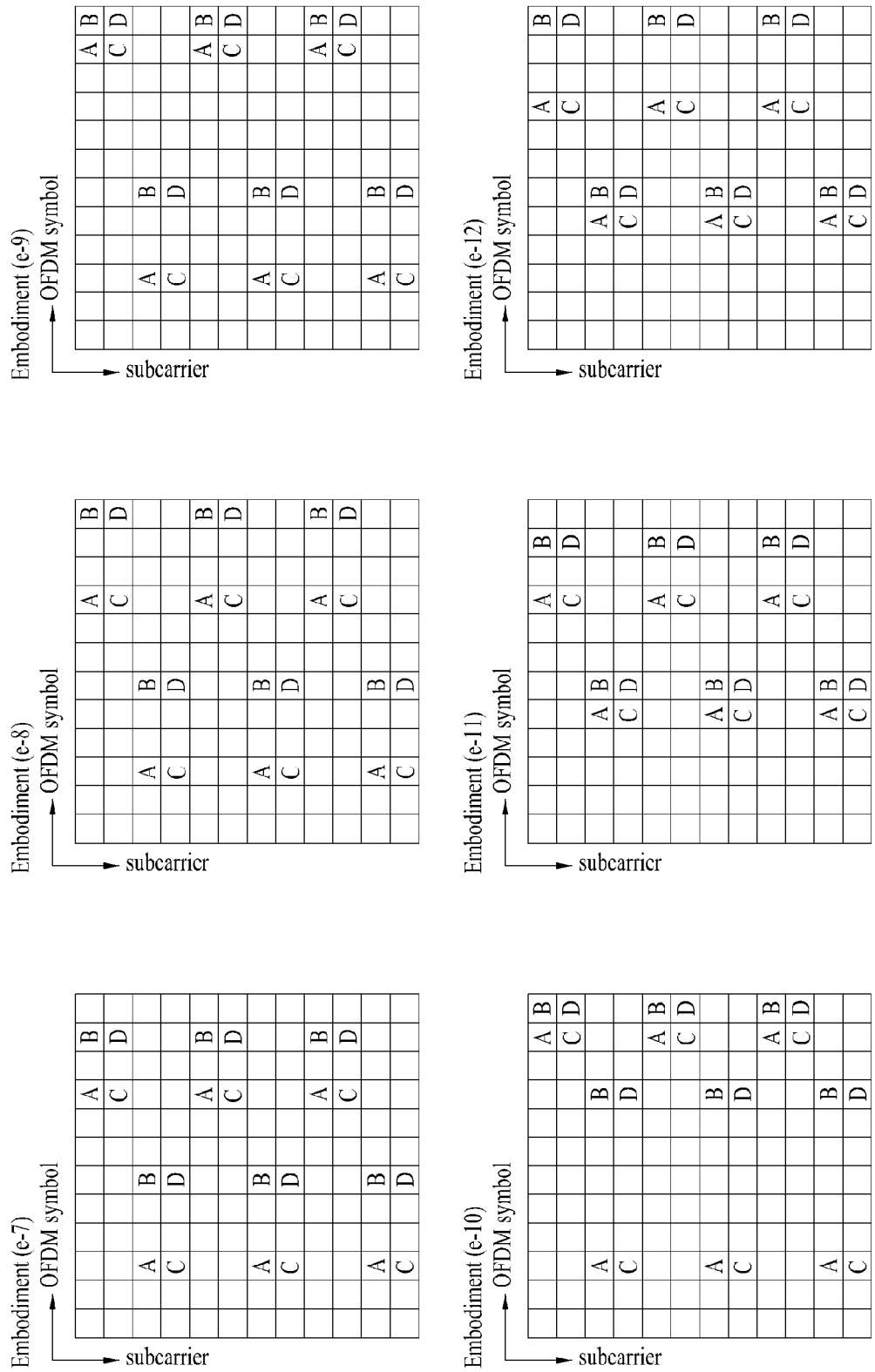
Figure 38:
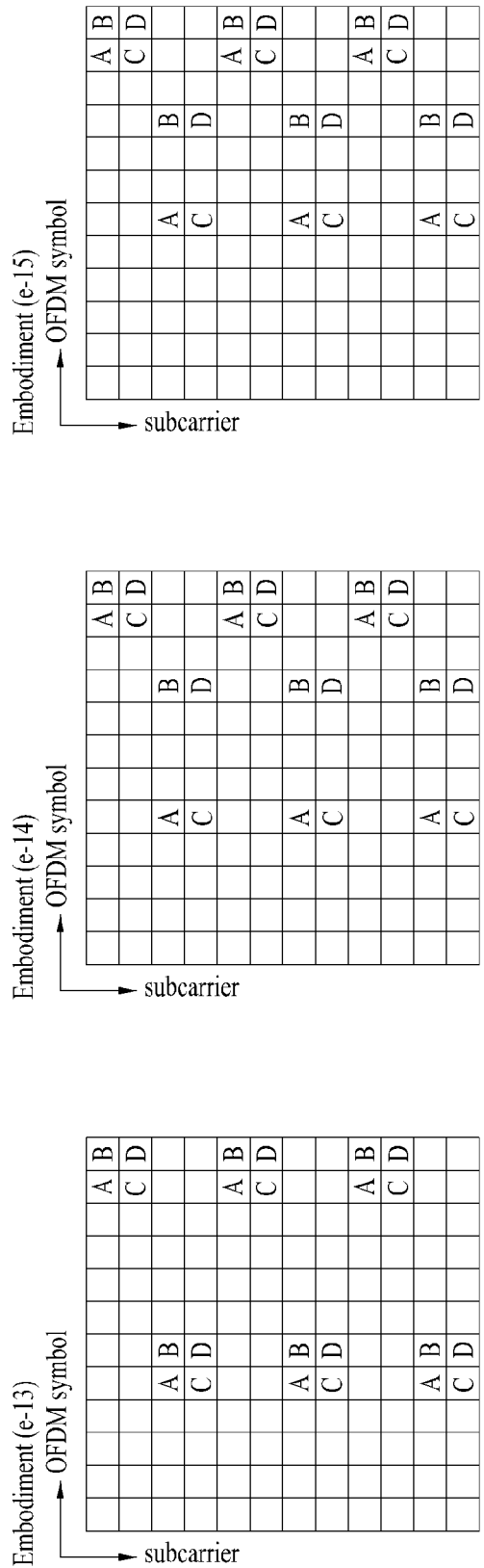
Figure 39:
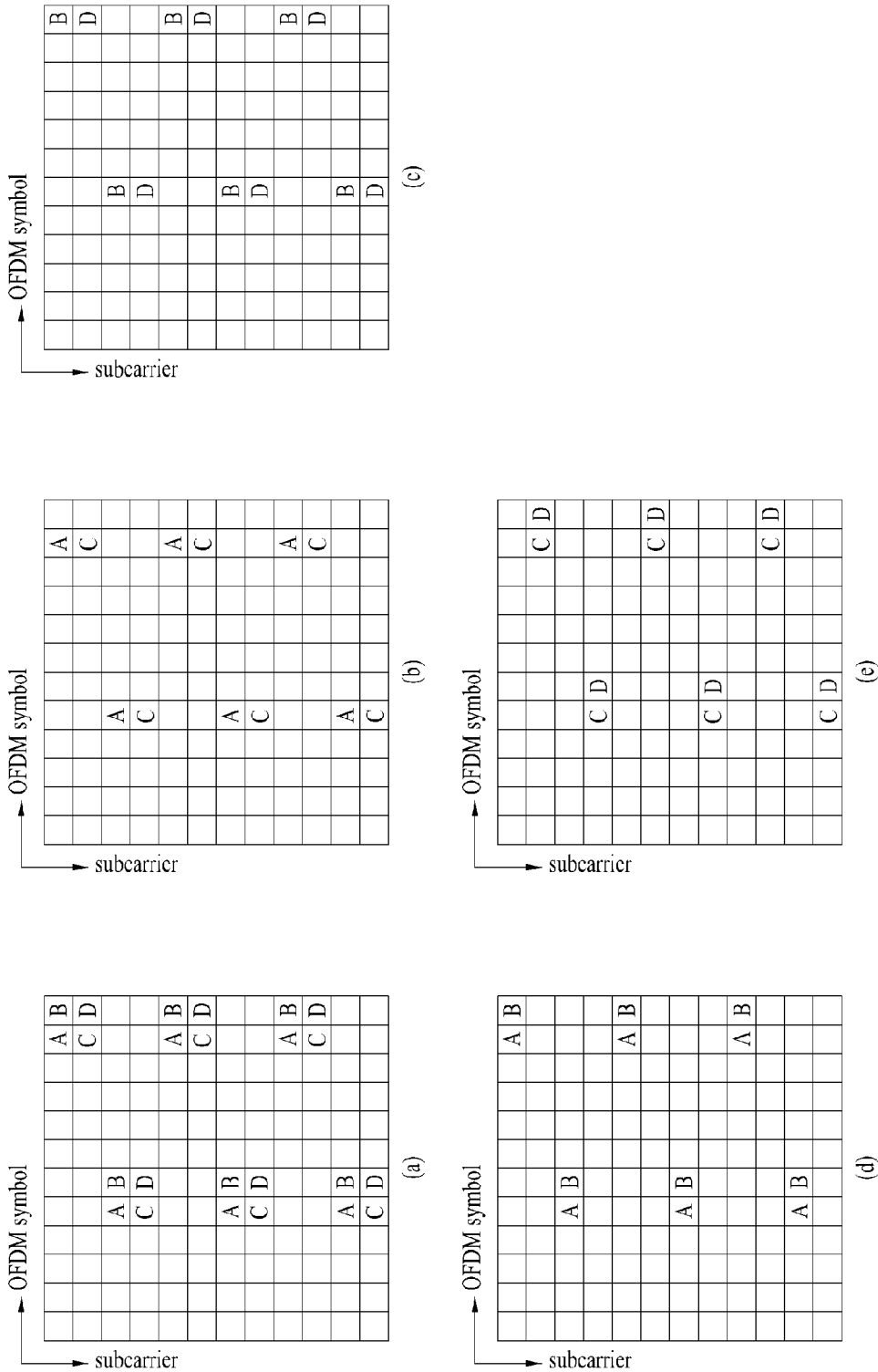

FIGS. 36 to 38 show other embodiments (embodiment (e)) of a DRS pattern according to the present invention. If the embodiment (e-1) of FIG. 36 is a basic DRS pattern, Embodiments (e-2) to (e-15) correspond to modifications in which the basic DRS pattern is T-shifted.

Figure 40:
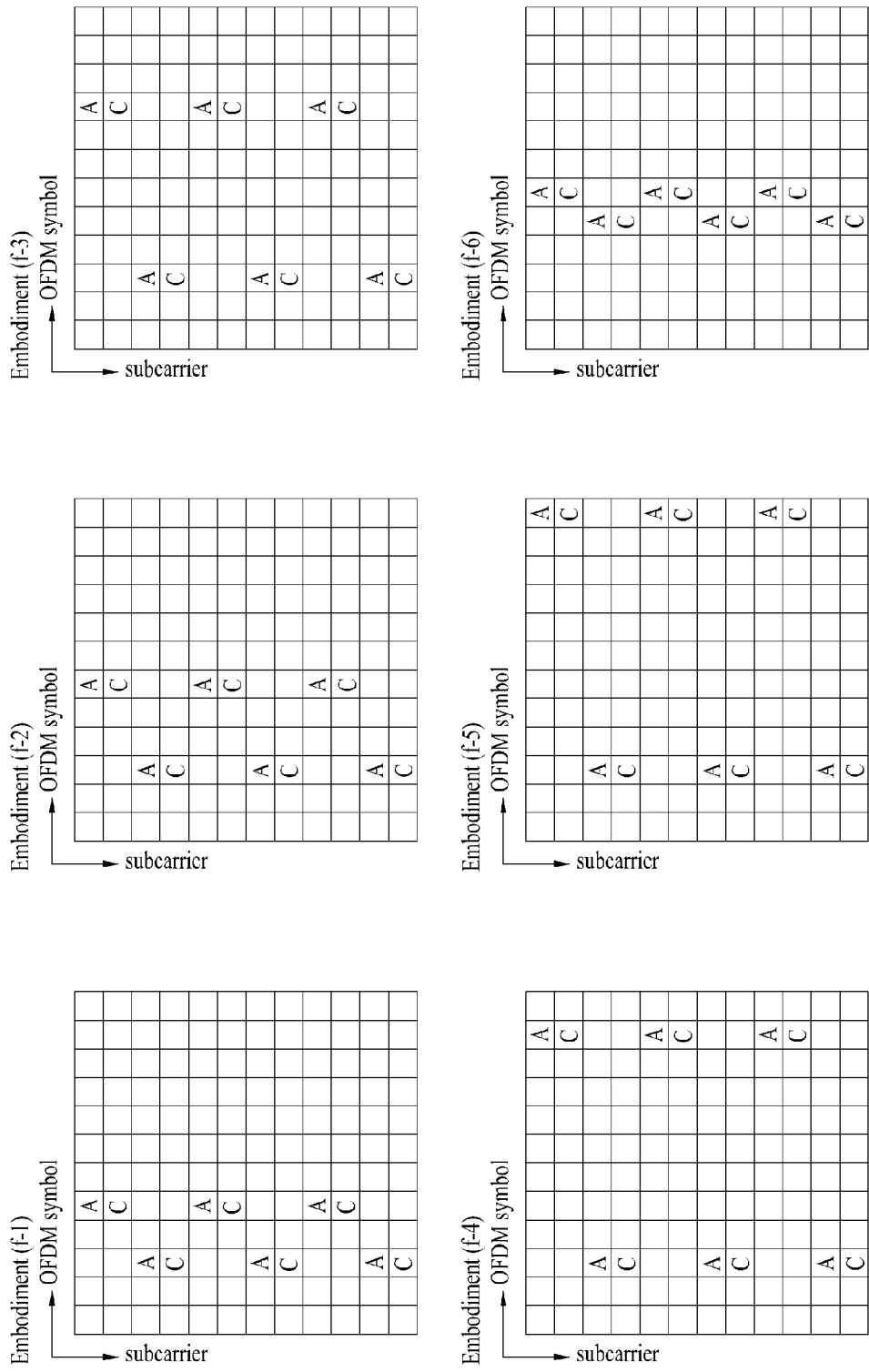
Figure 41:
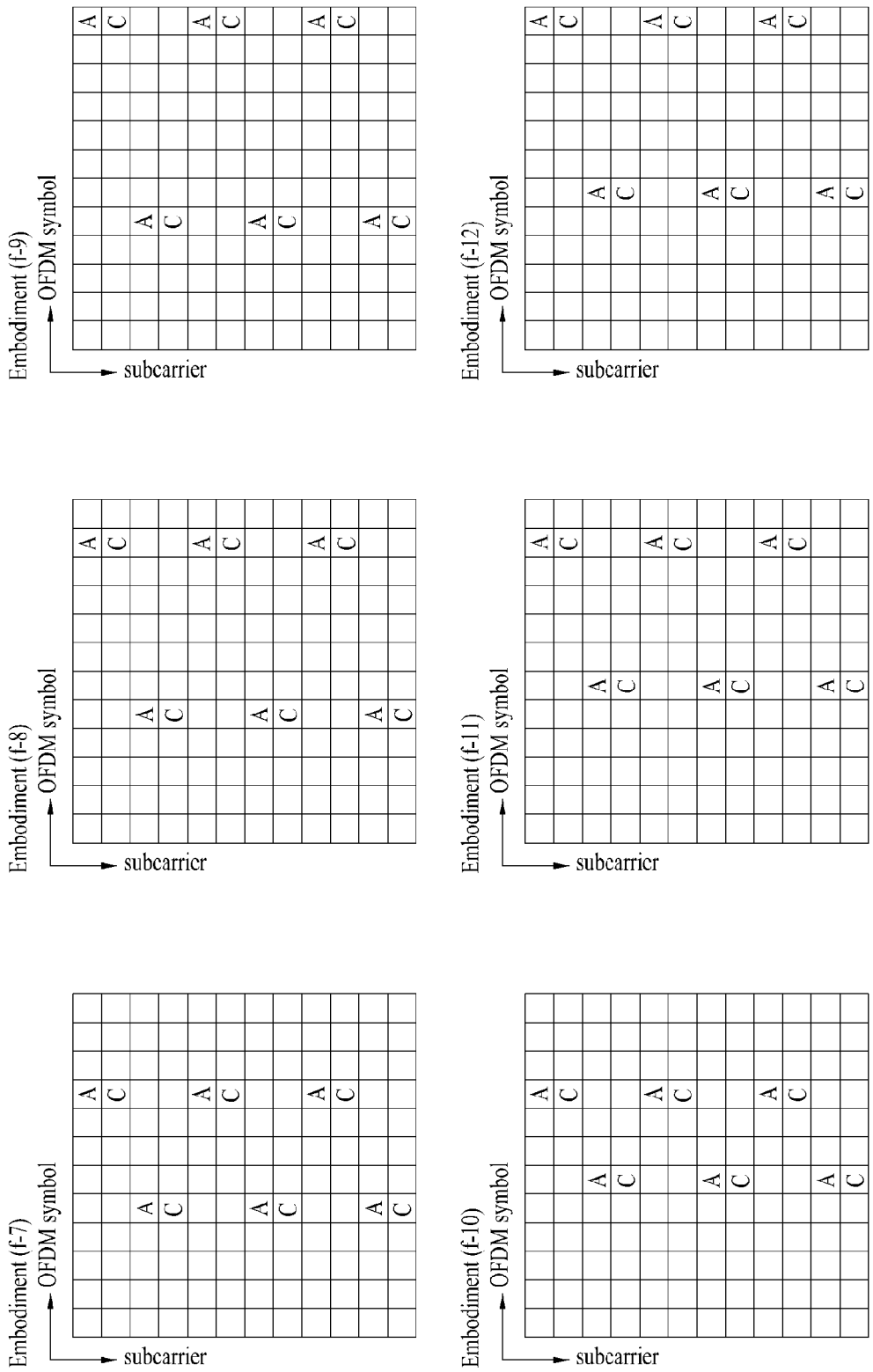
Figure 42:
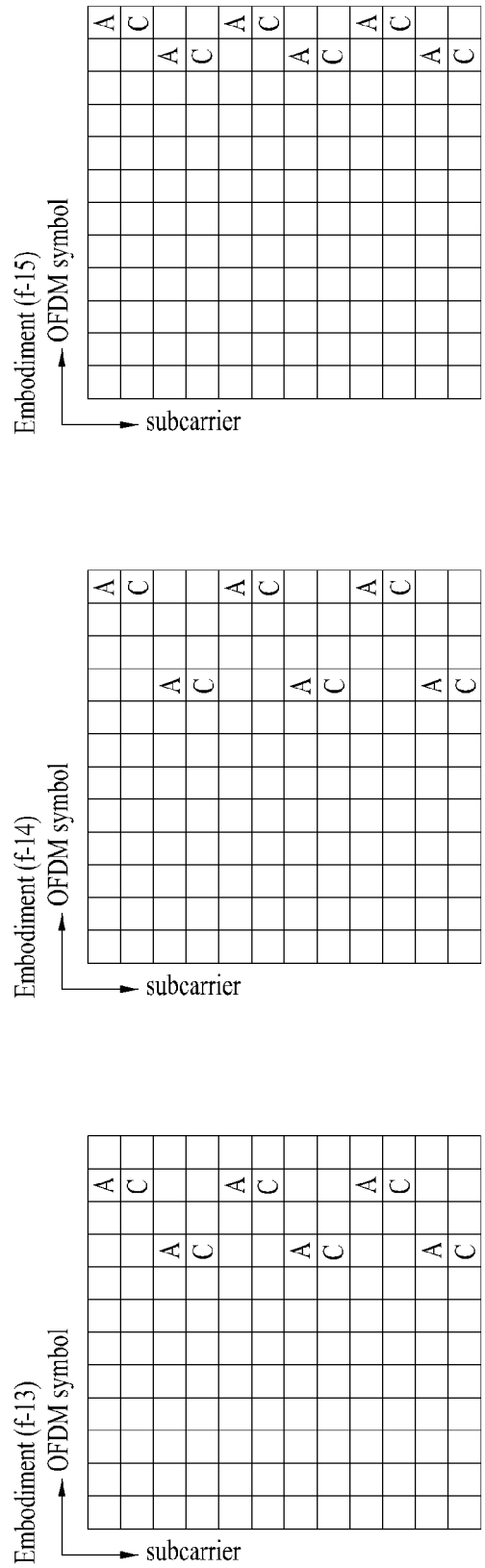

FIGS. 39 to 42 show other embodiments (embodiment (f)) of a DRS pattern according to the present invention. Based on a basic DRS pattern of FIG. 39(a), as shown in FIGS. 39(b) to 39(e), various DRS pattern groups may be defined. FIGS. 39(b) and 39(c) show example in which one DRS group includes A and C and another DRS group includes B and D. In this case, DRSs for a plurality of layers within one DRS group may be multiplexed using a CDM-F scheme. FIGS. 39(d) and 39(e) show examples in which one DRS group includes A and B and another DRS group includes C and D. In this case, DRSs for a plurality of layers within one DRS group may be multiplexed using a CDM-T scheme. FIGS. 40 to 42 show various modifications in which the locations of the DRS groups on a RB are T-shifted. The DRS groups of FIGS. 39(c) to 39(e) may be T-shifted using a method similar to the modifications of FIGS. 40 to 42.

Figure 43:
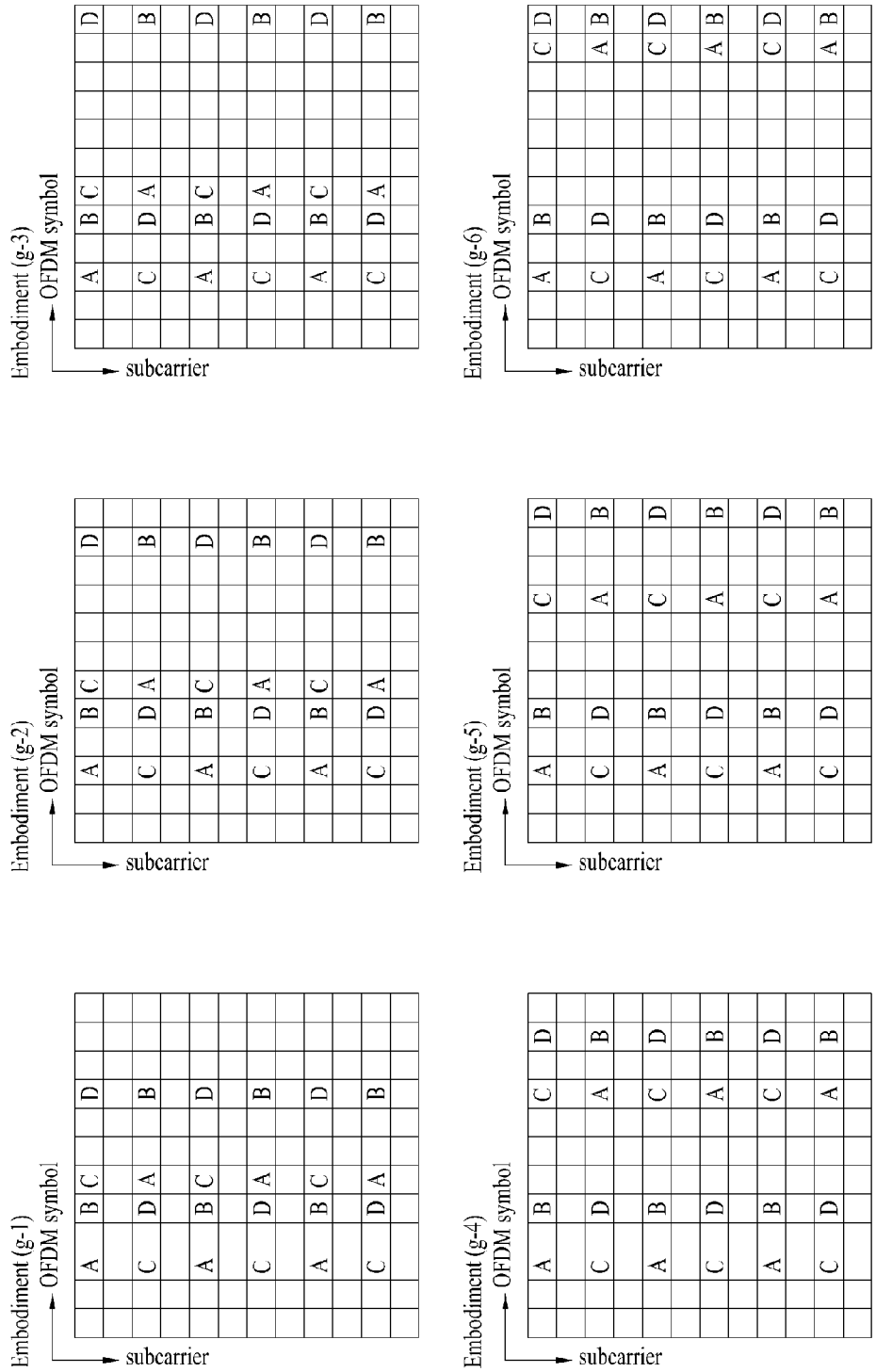
Figure 44:
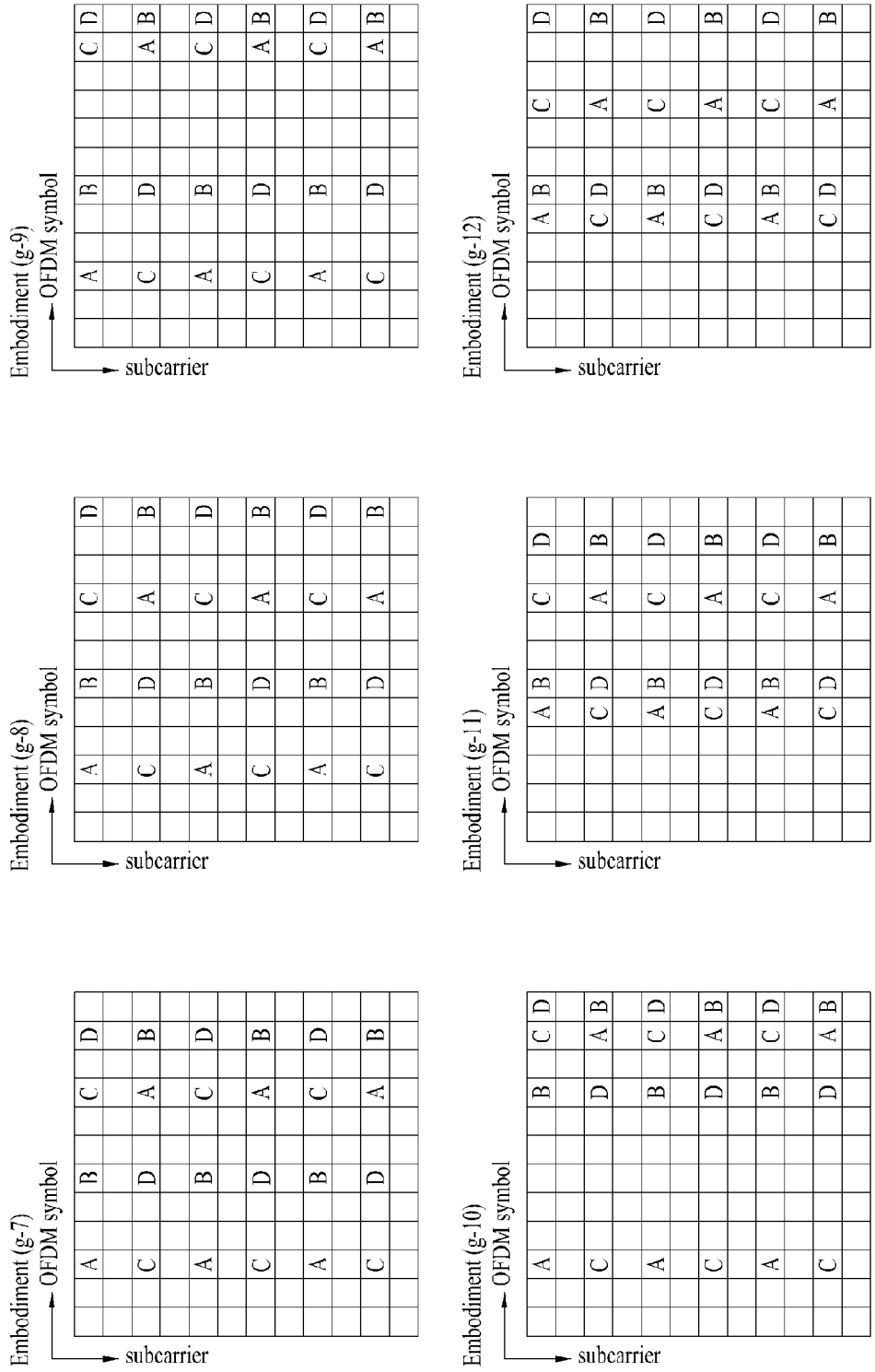
Figure 45:
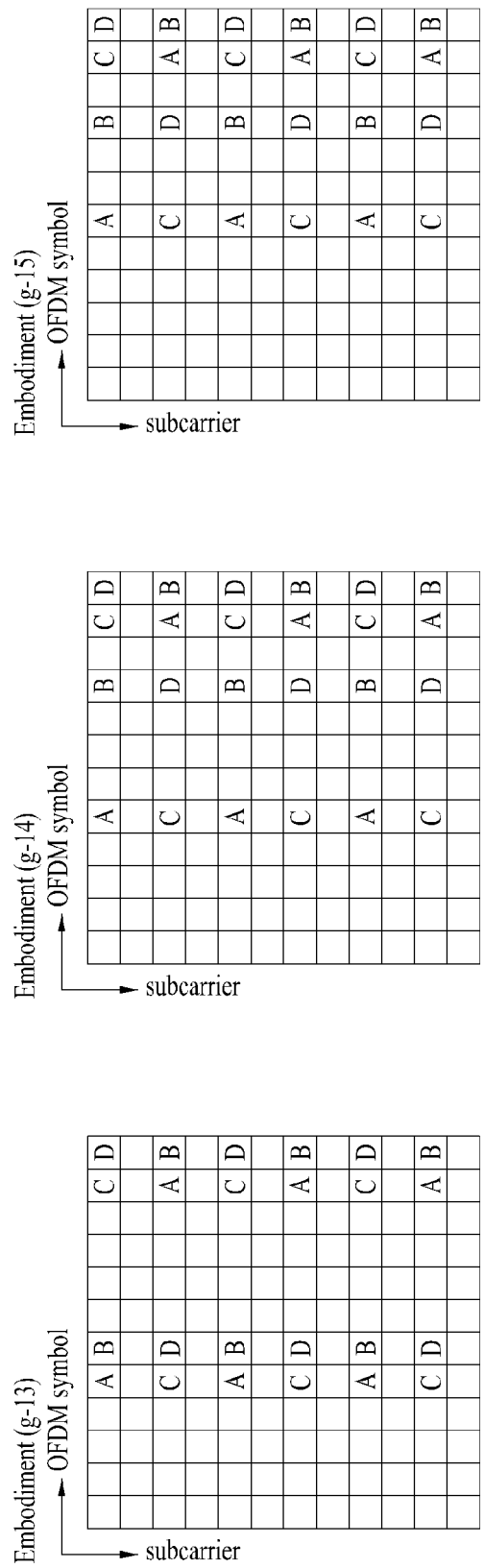
Figure 46:
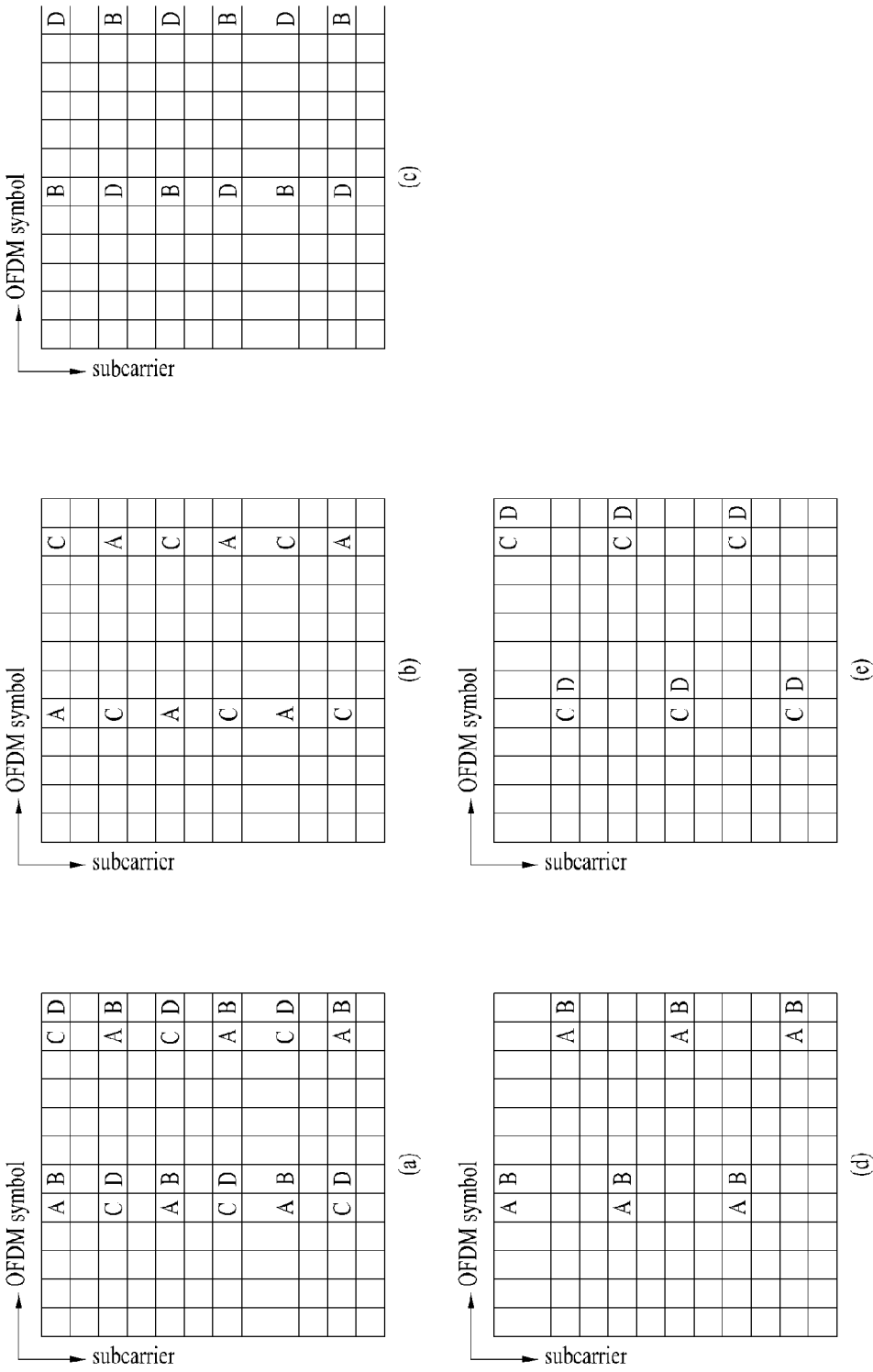

FIGS. 43 to 45 show other embodiments (embodiment (g)) of a DRS pattern according to the present invention. If the embodiment (g-1) of FIG. 43 is a basic DRS pattern, embodiments (g-2) to (g-15) correspond to modifications in which the basic DRS pattern is T-shifted.

Figure 47:
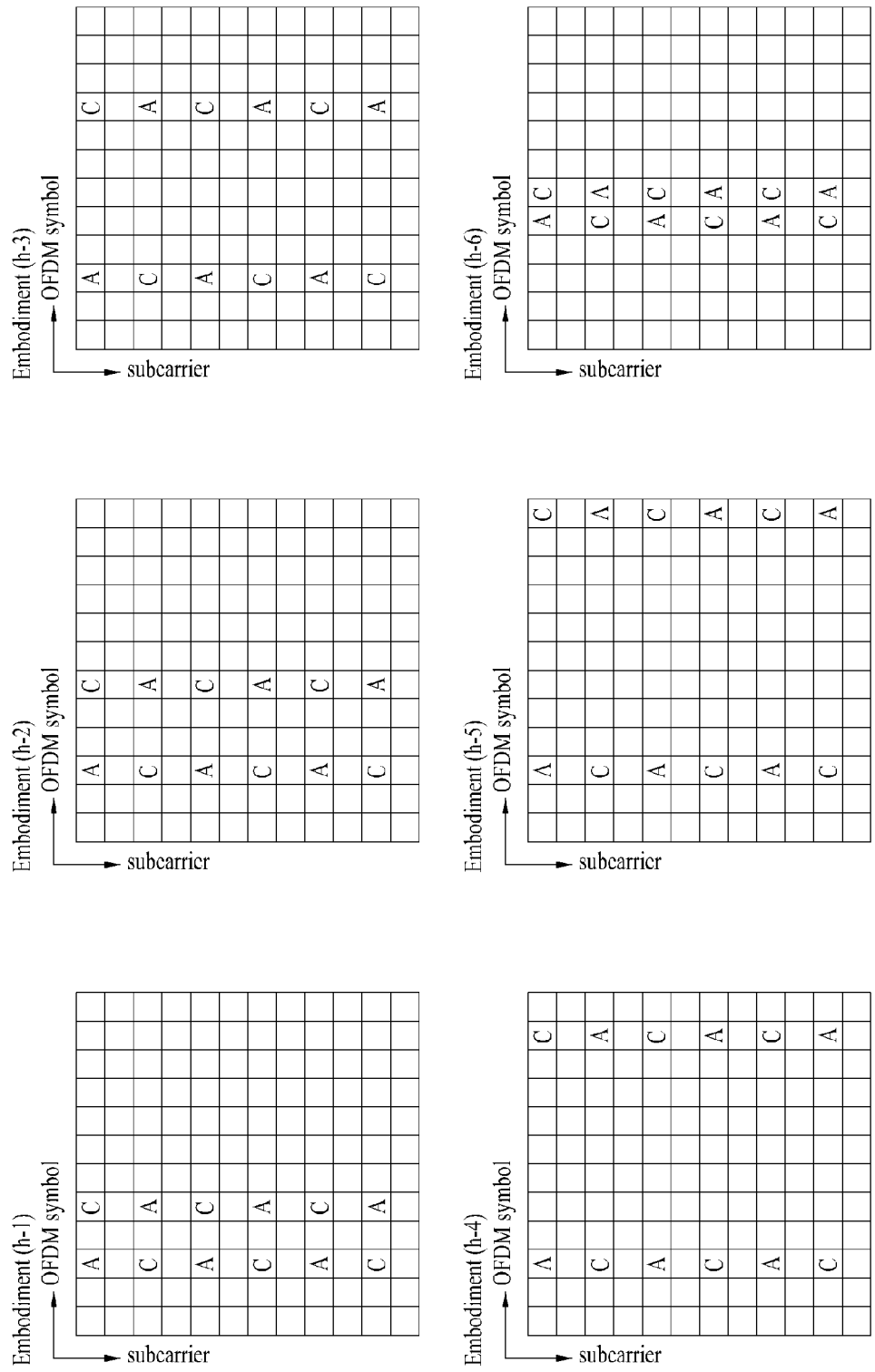
Figure 48:
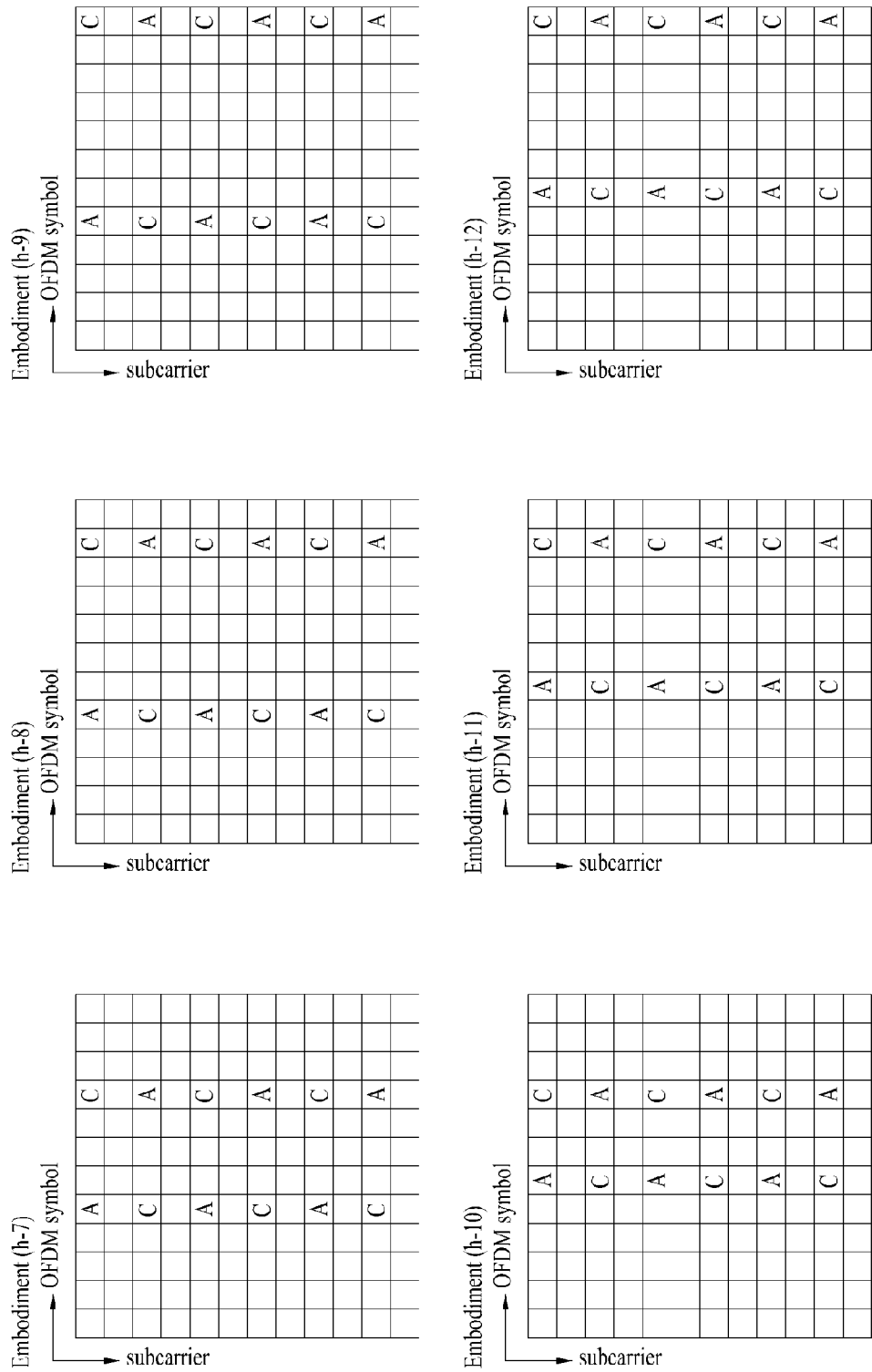
Figure 49:
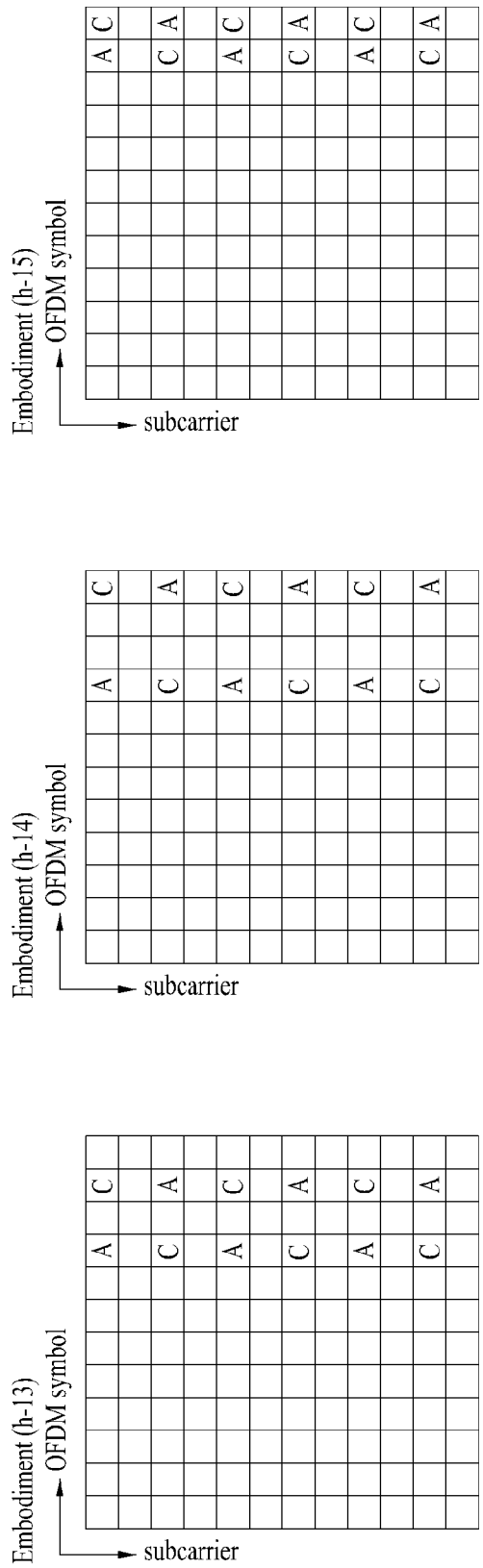
Figure 50:
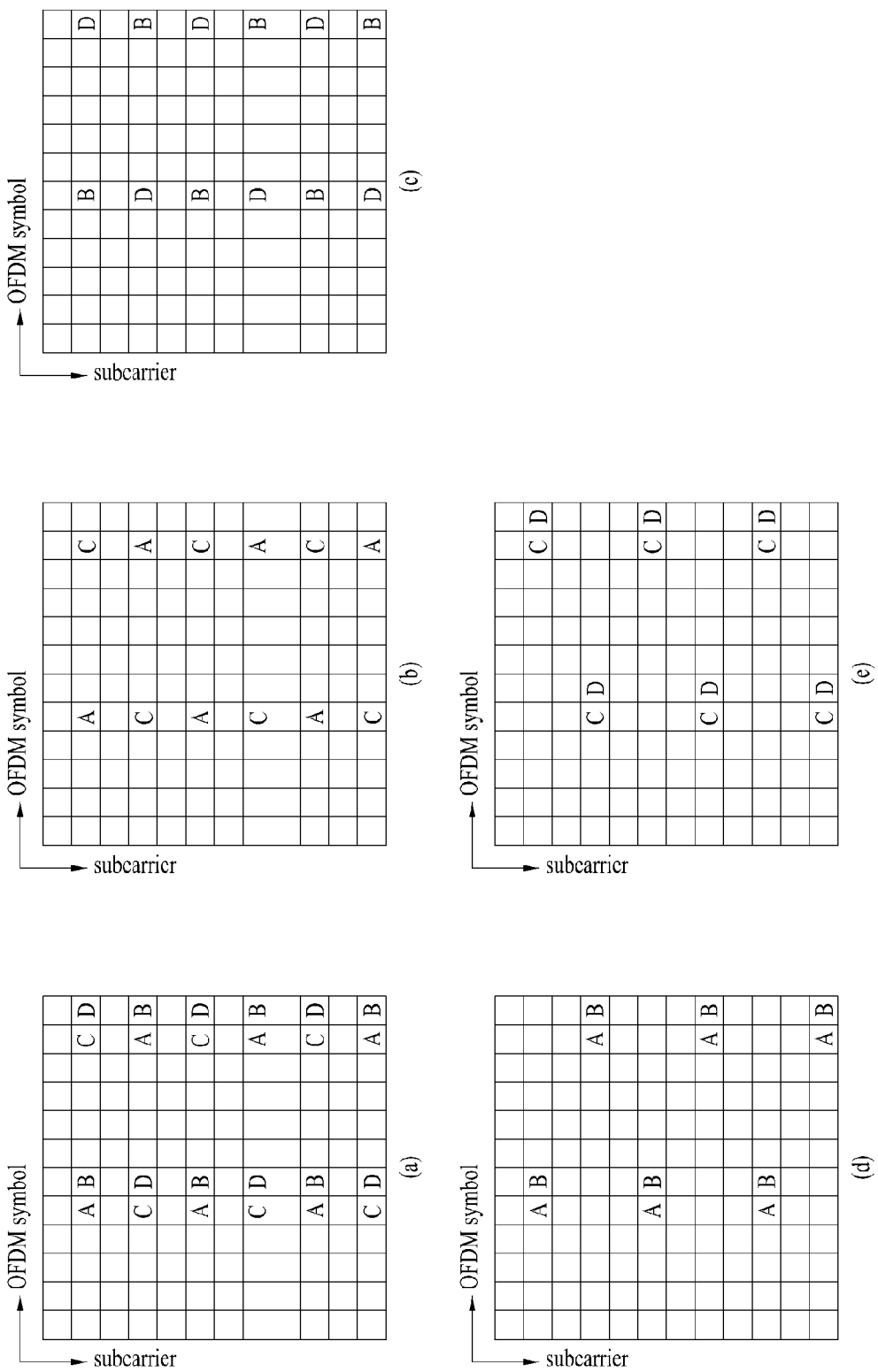

FIGS. 46 to 49 show other embodiments (embodiment (h)) of a DRS pattern according to the present invention. Based on a basic DRS pattern of FIG. 46(a), as shown in FIGS. 46(b) to 46(e), various DRS pattern groups may be defined. FIGS. 46(b) and 46(c) show example in which one DRS group includes A and C and another DRS group includes B and D. In this case, DRSs for a plurality of layers within one DRS group may be multiplexed using a CDM-F scheme. FIGS. 46(d) and 46(e) show examples in which one DRS group includes A and B and another DRS group includes C and D. In this case, DRSs for a plurality of layers within one DRS group may be multiplexed using a CDM-T scheme. FIGS. 47 to 49 show various modifications in which the locations of the DRS groups on a RB are T-shifted. The DRS groups of FIGS. 46(c) to 46(e) may be T-shifted using a method similar to the modifications of FIGS. 47 to 49.

Figure 51:
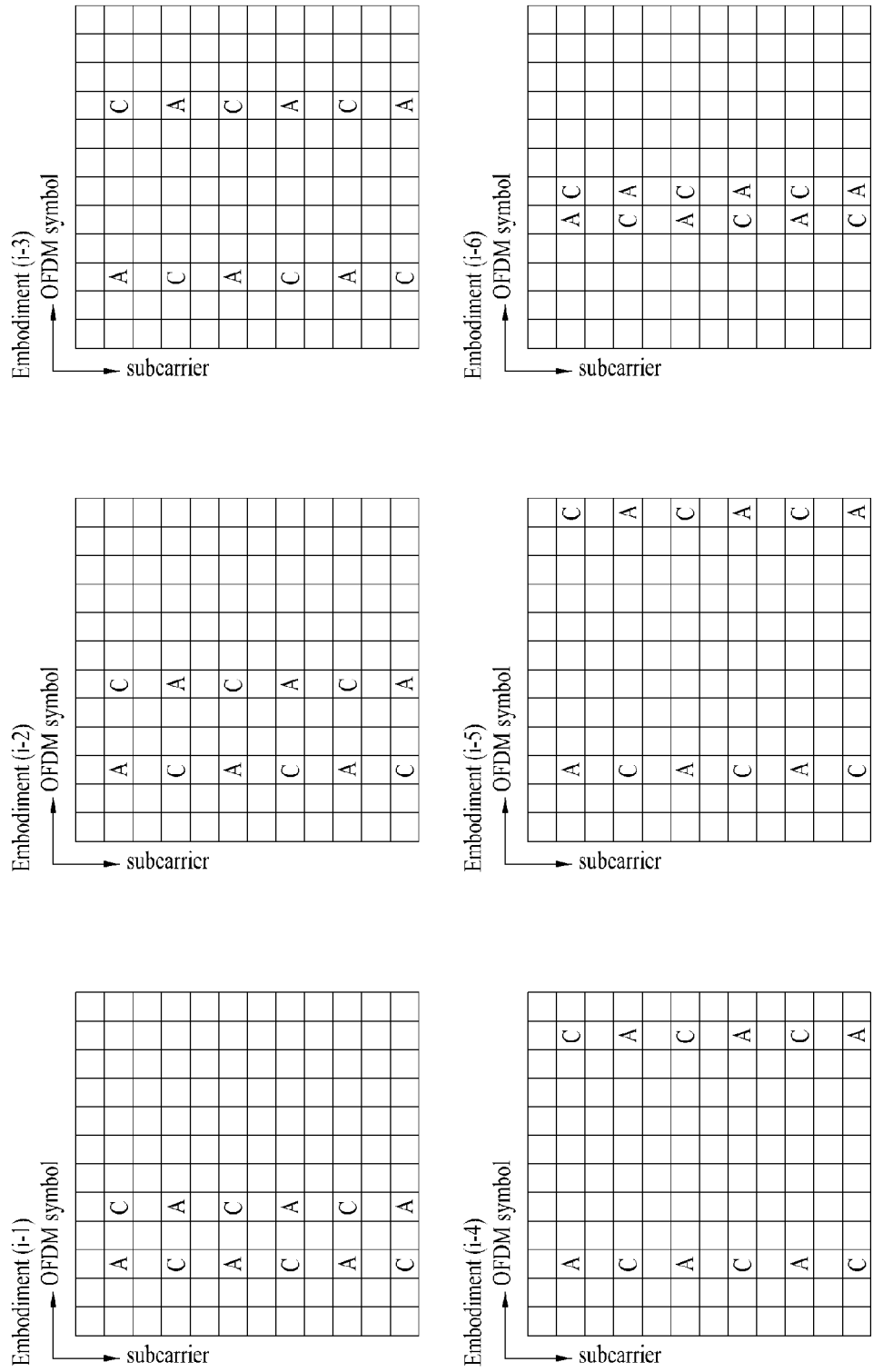
Figure 52:
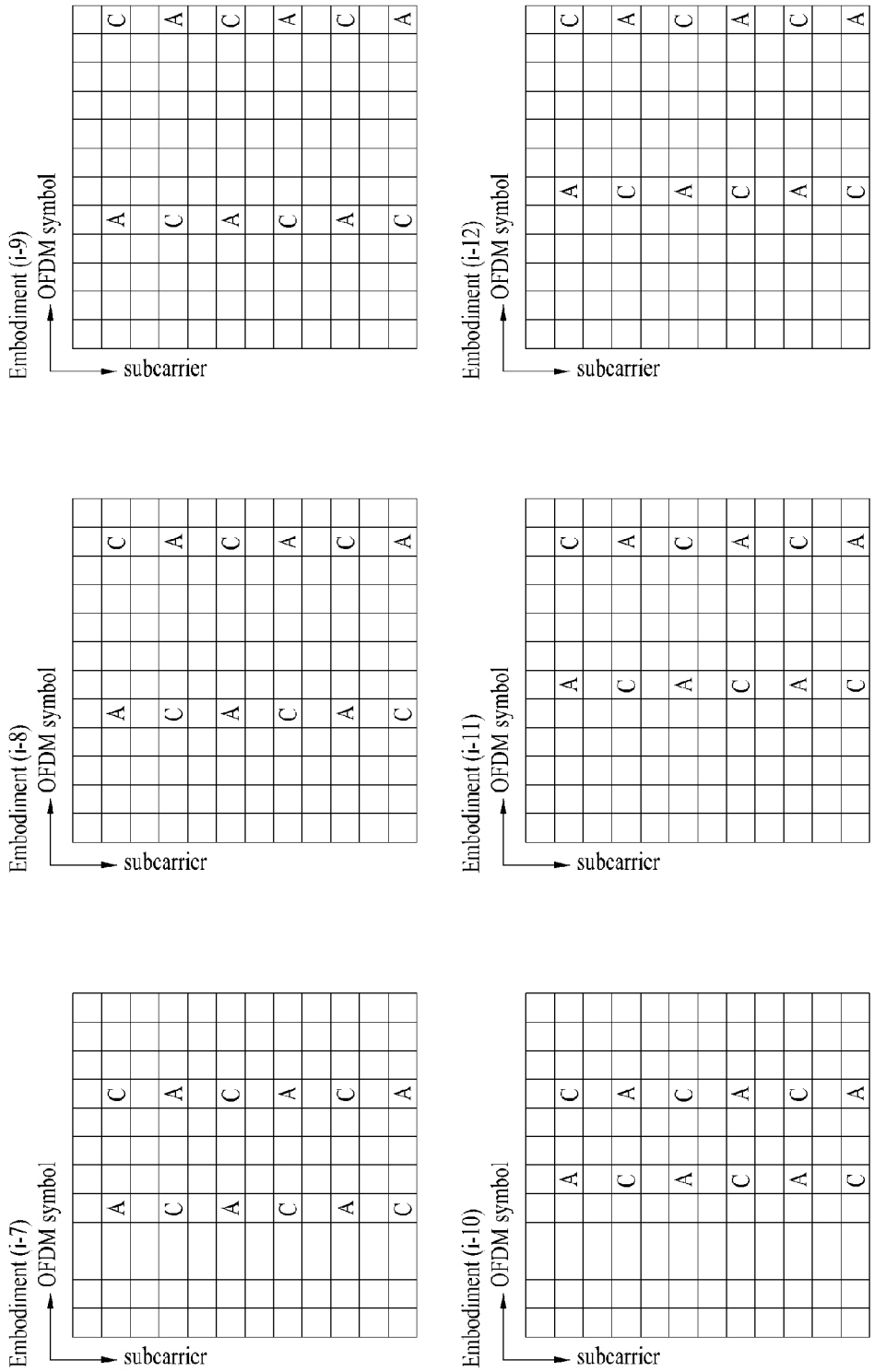
Figure 53:
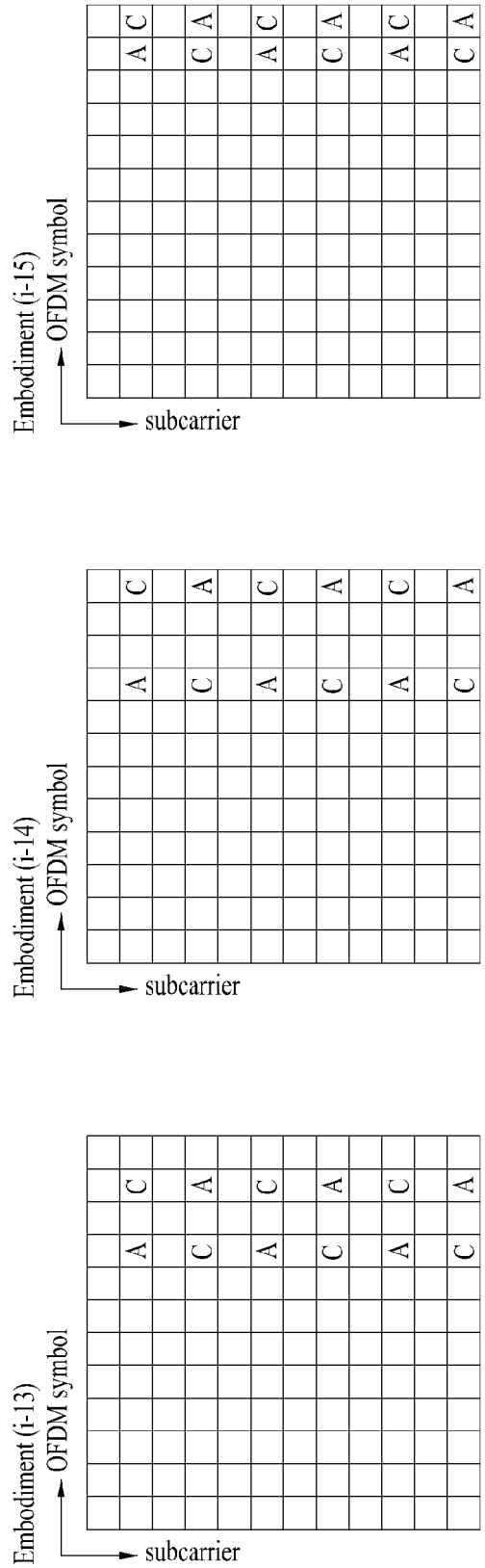

FIGS. 50 to 53 show other embodiments (embodiment (i)) of a DRS pattern according to the present invention. The DRS pattern of FIG. 50(a) may be obtained by frequency-shifting or vertically shifting (v-shifting) the DRS pattern of FIG. 46(a). Based on a basic DRS pattern of FIG. 50(a), as shown in FIGS. 50(b) to 50(e), various DRS pattern groups may be defined. FIGS. 50(b) and 50(c) show example in which one DRS group includes A and C and another DRS group includes B and D. In this case, DRSs for a plurality of layers within one DRS group may be multiplexed using a CDM-F scheme. FIGS. 50(d) and 50(e) show examples in which one DRS group includes A and B and another DRS group includes C and D. In this case, DRSs for a plurality of layers within one DRS group may be multiplexed using a CDM-T scheme. FIGS. 51 to 53 show various modifications in which the locations of the DRS groups on a RB are T-shifted. The DRS groups of FIGS. 50(c) to 50(e) may be T-shifted using a method similar to the modifications of FIGS. 51 to 53.

Figure 54:
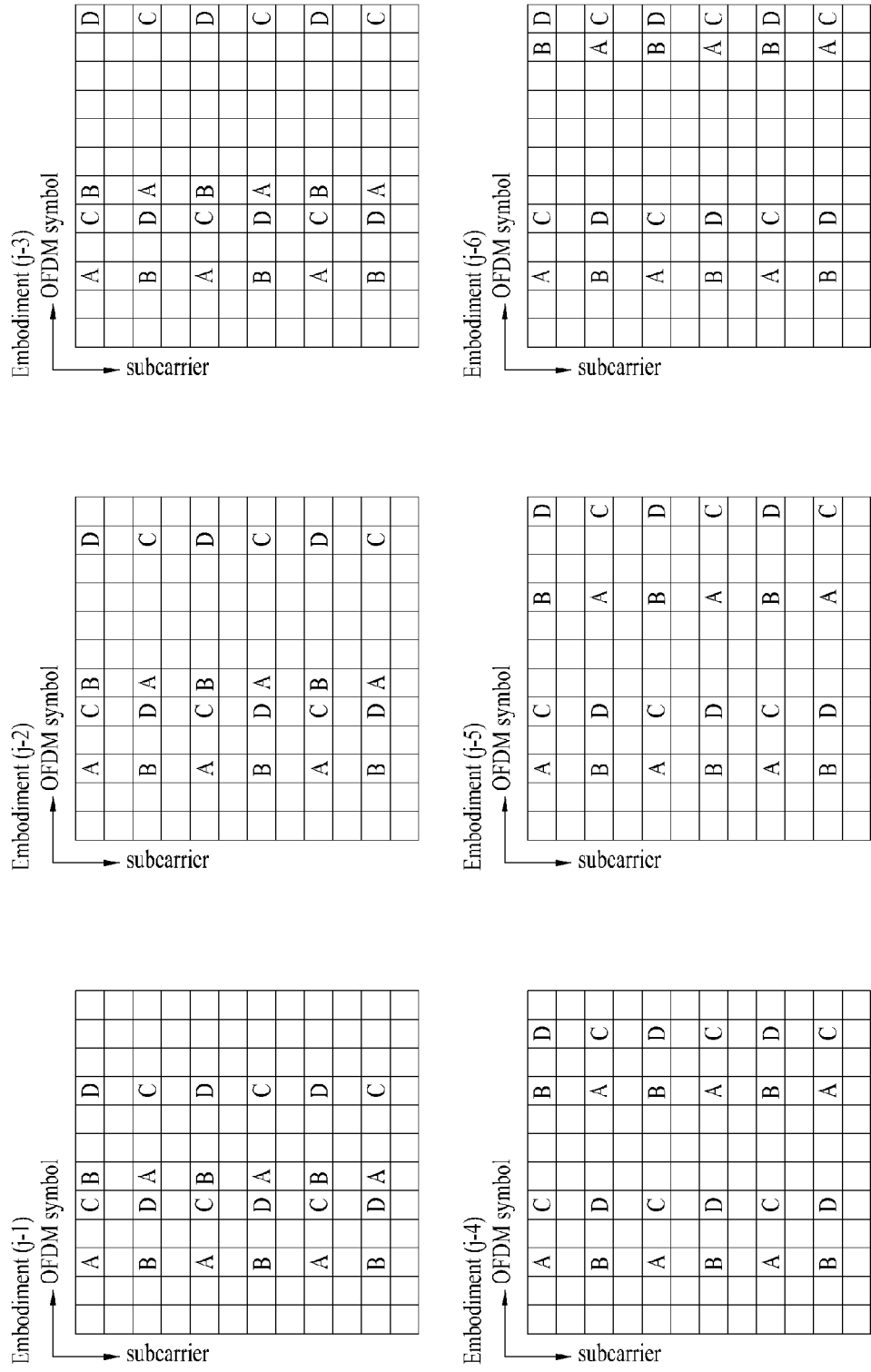
Figure 55:
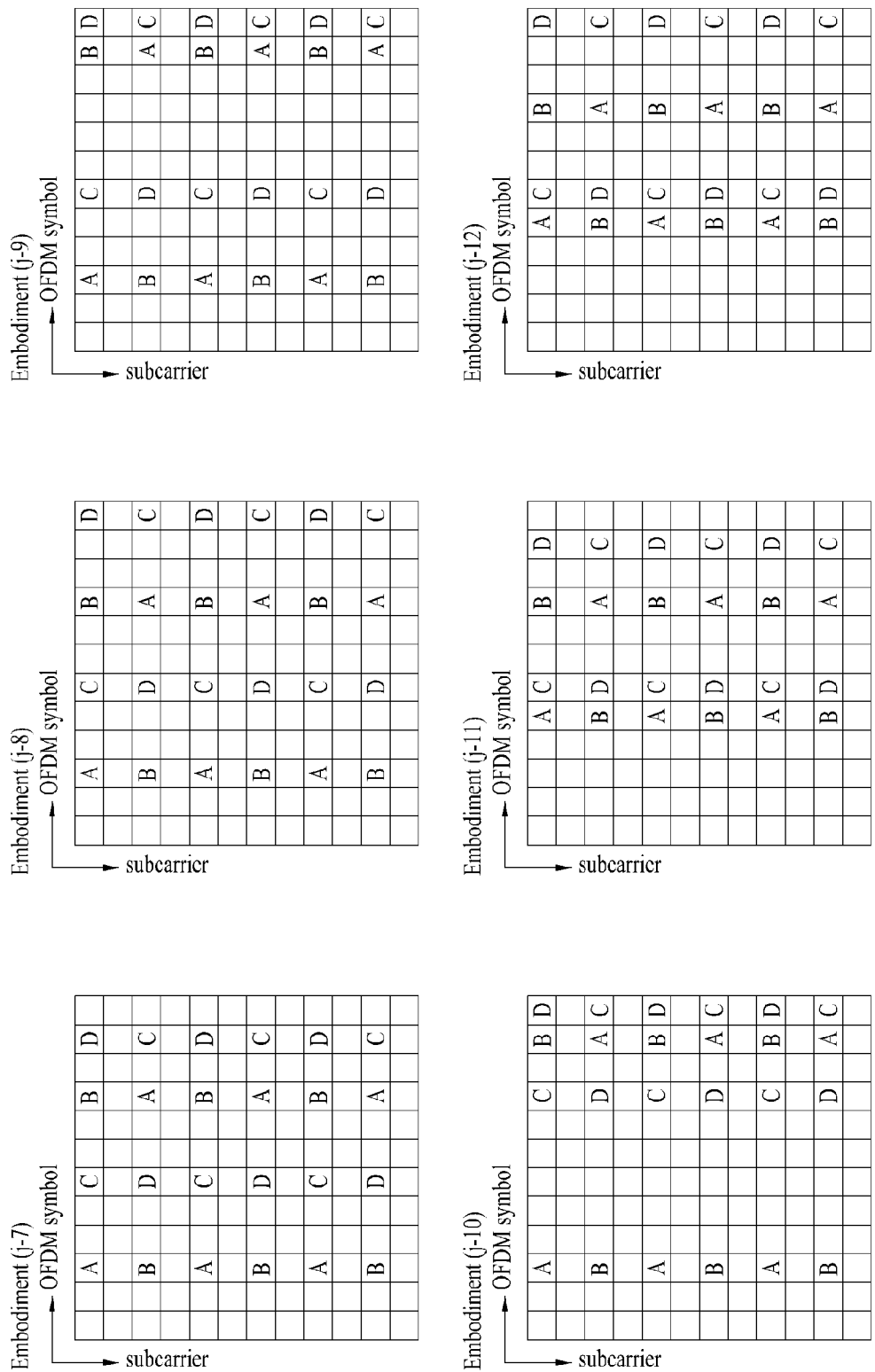
Figure 56:
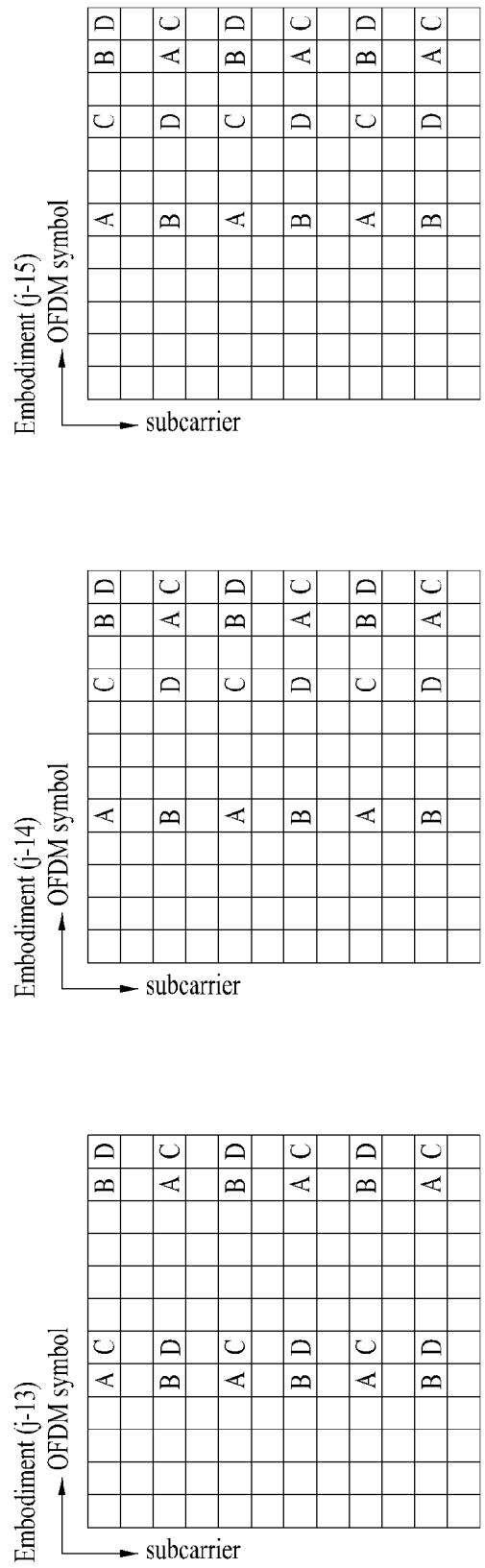

FIGS. 54 to 56 show other embodiments (embodiment (j)) of a DRS pattern according to the present invention. If the embodiment (j-1) of FIG. 54 is a basic DRS pattern, embodiments (j-2) to (j-15) correspond to modifications in which the basic DRS pattern is T-shifted.

Figure 57:
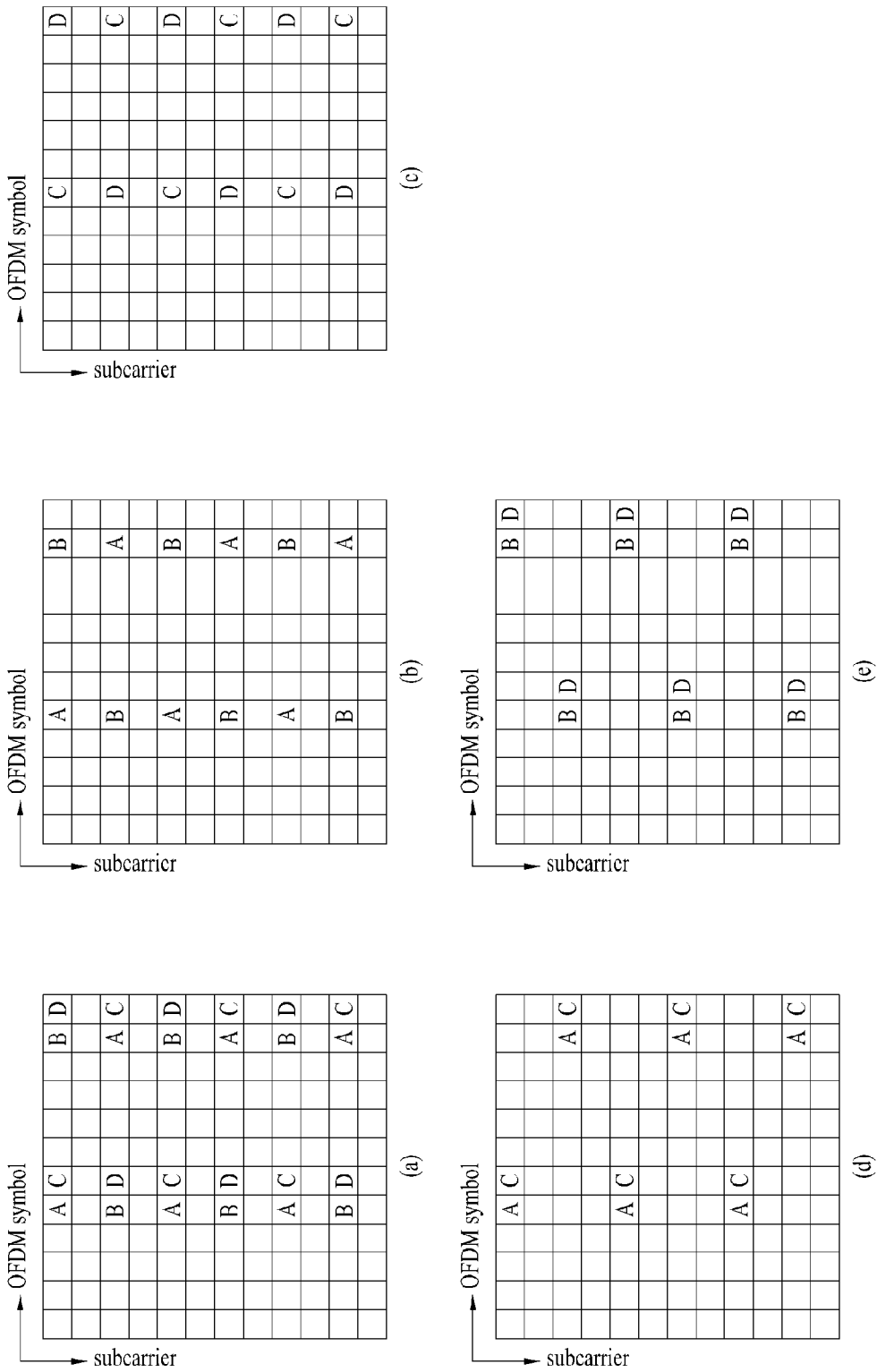

FIG. 57 shows another embodiment (embodiment (k)) of a DRS pattern according to the present invention. The DRS pattern of FIG. 57(a) is equal to the DRS pattern of the embodiment (j-13) of FIG. 56. Based on a basic DRS pattern of FIG. 57(a), as shown in FIGS. 57(b) to 57(e), various DRS pattern groups may be defined. FIGS. 57(b) and 57(c) show example in which one DRS group includes A and C and another DRS group includes B and D. In this case, DRSs for a plurality of layers within one DRS group may be multiplexed using a CDM-F scheme. FIGS. 57(d) and 57(e) show examples in which one DRS group includes A and B and another DRS group includes C and D. In this case, DRSs for a plurality of layers within one DRS group may be multiplexed using a CDM-T scheme. In the DRS pattern of FIG. 57, similarly to the above-described embodiments, various modifications of T-shifting the DRS patterns in consideration of OFDM symbols which cannot be used for downlink transmission may be used.

Figure 58:
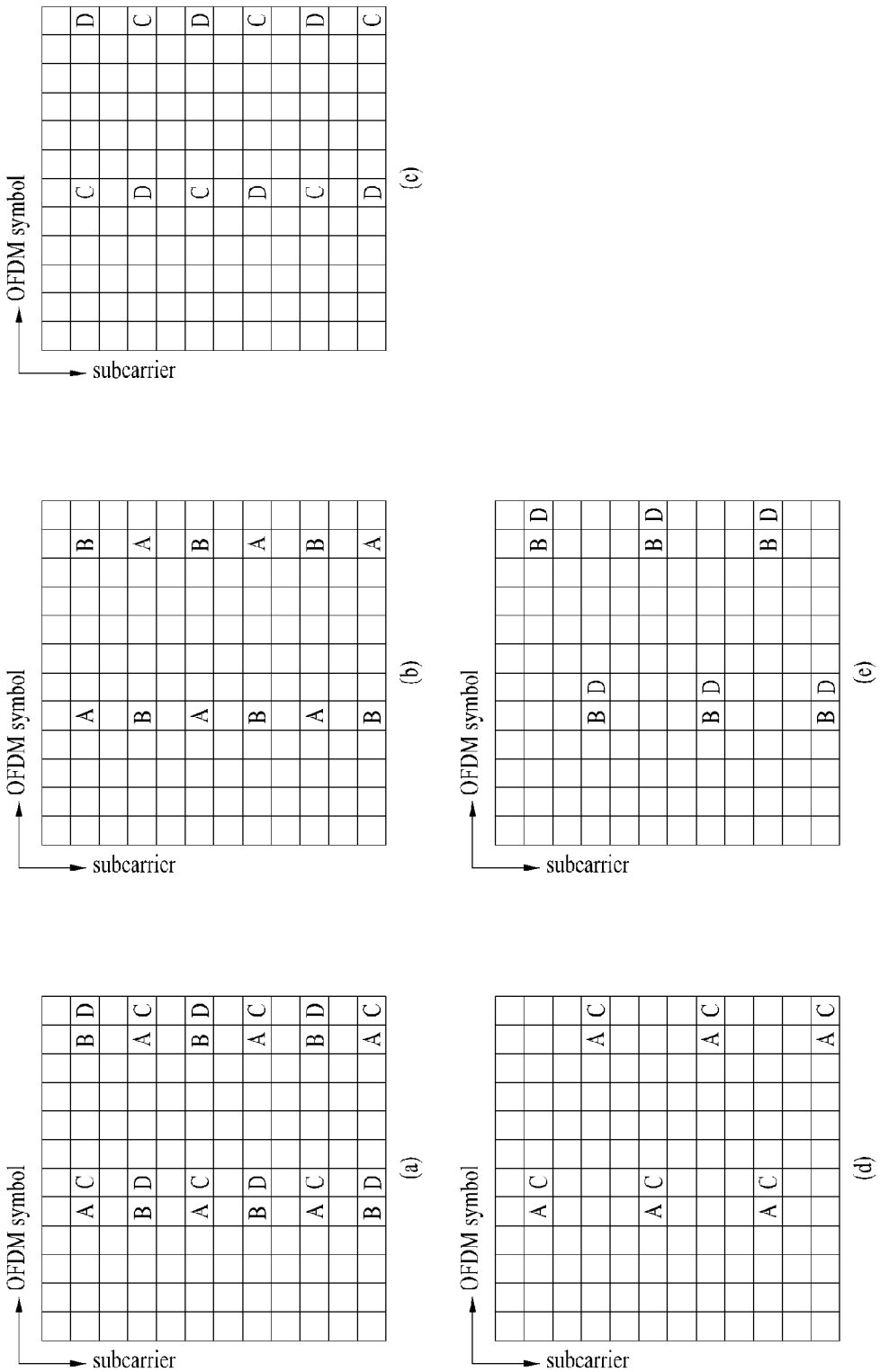

FIG. 58 shows another embodiment (embodiment (l)) of a DRS pattern according to the present invention. The DRS pattern of FIG. 58(a) is obtained by frequency-shifting the DRS pattern of FIG. 57(a) by one subcarrier. Based on a basic DRS pattern of FIG. 58(a), as shown in FIGS. 58(b) to 58(e), various DRS pattern groups may be defined. FIGS. 58(b) and 58(c) show example in which one DRS group includes A and C and another DRS group includes B and D. In this case, DRSs for a plurality of layers within one DRS group may be multiplexed using a CDM-F scheme. FIGS. 58(d) and 58(e) show examples in which one DRS group includes A and B and another DRS group includes C and D. In this case, DRSs for a plurality of layers within one DRS group may be multiplexed using a CDM-T scheme. In the DRS pattern of FIG. 58, similarly to the above-described embodiments, various modifications of T-shifting the DRS patterns in consideration of OFDM symbols which cannot be used for downlink transmission may be used.

In the above-described DRS patterns, DRSs located on last one to three symbols (tenth to 12 OFDM symbols in the case of an extended CP) of a downlink subframe may be punctured as necessary. Puncturing may be performed when the last one to three symbols of the downlink subframe are not used for downlink transmission. For example, a guard time for switching transmission and reception may be set in a backhaul downlink (downlink from a base station to a relay) subframe of a relay. In this case, DRSs arranged on corresponding OFDM(s) may be punctured. Alternatively, if OFDM symbols on which DRSs cannot be arranged are present in a downlink subframe, patterns in which DRSs are arranged on the remaining data region except for the OFDM symbols, that is, the above-described various T-shifted DRS patterns may be used.

Figure 59:
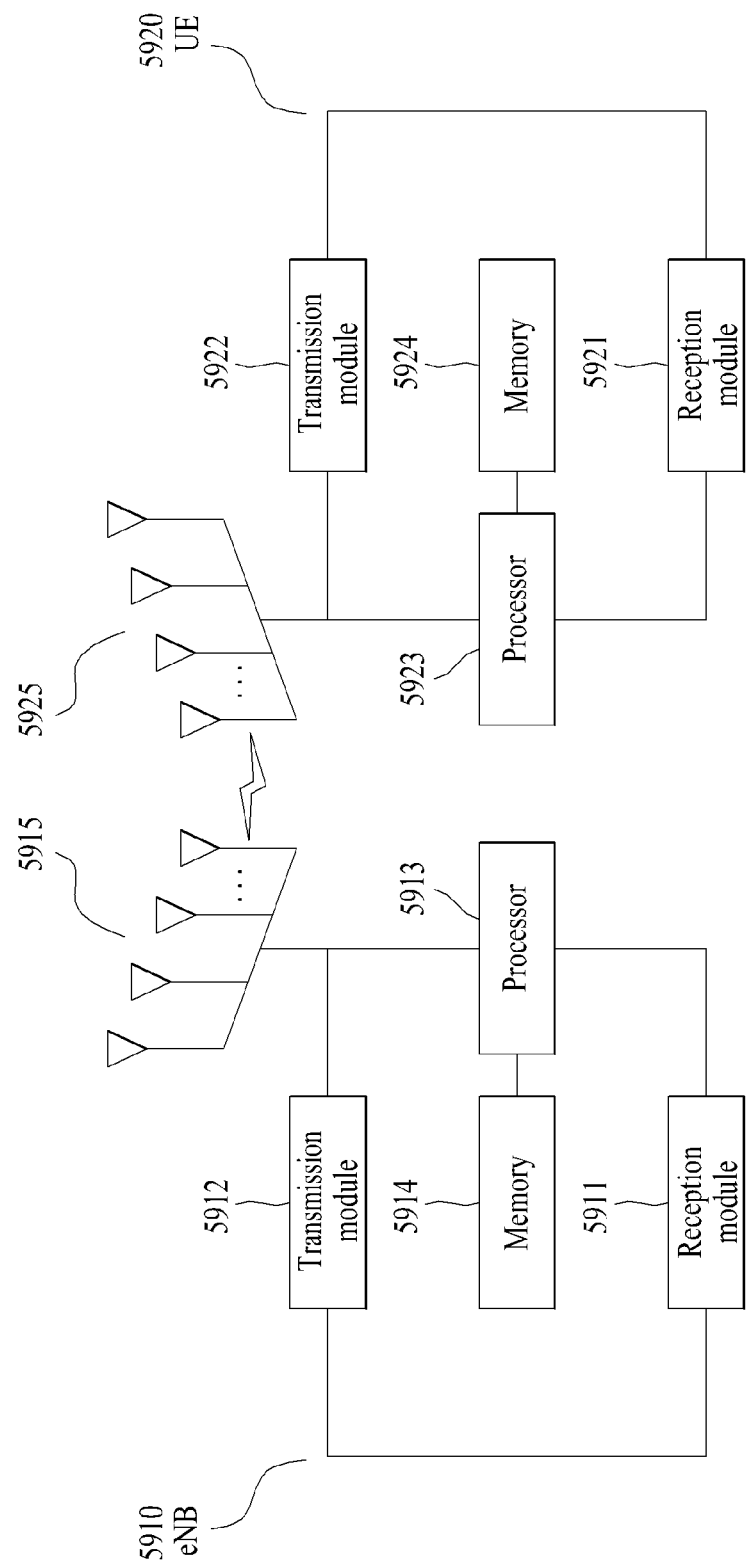
FIG. 59 is a diagram showing the configuration of an exemplary embodiment of a wireless communication system including a base station and a user equipment (UE) according to the present invention.

FIG. 59 is a diagram showing the configuration of a wireless communication system including a UE and a base station according to an exemplary embodiment of the present invention.

The base station (eNB) 5910 may include a reception (Rx) module 5911, a transmission (Tx) module 5912, a processor 5913, a memory 5914 and an antenna 5915. The Rx module 5911 may receive a variety of signals, data, information, etc. from a UE. The Tx module 5912 may transmit a variety of signals, data, information, etc. to a UE. The processor 5913 may be configured to perform overall control of the base station 5910 including the Rx module 5911, the Tx module 5912, the memory 5914 and the antenna 5915. The antenna 5915 may include a plurality of antennas.

The processor 5913 may be configured to multiplex and transmit reference signals for a plurality of layers based on a reference signal pattern in a data region of a downlink subframe and transmit data for a plurality of layers in the data region of the downlink subframe through the Tx module 5912.

The processor 5913 serves to process information received by the UE and information to be transmitted to an external device. The memory 5914 may store the processed information for a predetermined time and may be replaced with a component such as a buffer (not shown).

The UE 5920 may include an Rx module 5921, a Tx module 5922, a processor 5923 and a memory 5924. The Rx module 5921 may receive a variety of signals, data, information, etc. from a base station. The Tx module 5922 may transmit a variety of signals, data, information, etc. to a base station. The processor 5923 may be configured to perform overall control of the base station 5920 including the Rx module 5921, the Tx module 5922, the memory 5924 and the antenna 5925. The antenna 5925 may include a plurality of antennas.

The processor 5923 may be configured to receive reference signals for a plurality of layers multiplexed based on a reference signal pattern in a data region of a downlink subframe, receive data for a plurality of layers in the data region of the downlink subframe through the Rx module 5921, and demodulate the data for the plurality of layers using the reference signals for the plurality of layers.

The processor 5923 serves to process information received by the UE and information to be transmitted to an external device. The memory 5924 may store the processed information for a predetermined time and may be replaced with a component such as a buffer (not shown).

Matters which are commonly applied to transmission of the reference signals of the base station 5910 and reception of the reference signals of the UE 5920 will now be described.

The reference signals for the plurality of layers are DRSs used when the UE demodulates the data for the plurality of layers. In addition, multiplexing of the reference signals may include setting the locations of 24 REs included in a reference signal pattern to six groups, setting the six groups to two high-level groups, and equally dividing and arranging the reference signals for the plurality of layers on the two high-level groups, and multiplexing the reference signals for two or more layers arranged on the same group using a CDM scheme.

If the number of layers is two, reference signals for two layers may be arranged only on one high-level group. If the number of layers is 3, 5 or 7, the number of layers, for which reference signals are arranged on one high-level group, is greater than the number of layers, for which reference signals are arranged on another high-level group, by one. That is, DRSs for one and two layers may be respectively arranged on the two high-level groups in the case of Rank 3, DRSs for two and three layers may be respectively arranged on the two high-level groups in the case of Rank 5, and DRSs for three and four layers may be respectively arranged on two high-level groups in the case of Rank 7.

If the number of layers is 4, 6 or 8, reference signals for the same number of layers are arranged on the two high-level groups. That is, DRSs for two layers may be arranged on the two high-level groups in the case of Rank 4, DRSs for three layers may be arranged on the two high-level groups in the case of Rank 6, and DRSs for four layers may be arranged on the two high-level groups in the case of Rank 8.

CDM of reference signals may use one or more of a scheme (CDM-T) for multiplying an orthogonal code over different time resources on the same frequency resources and a scheme (CDM-F) for multiplying an orthogonal code over different frequency resources on the same time resources.

The embodiments of the present invention can be implemented by a variety of means, for example, hardware, firmware, software, or a combination of them.

In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in a variety of formats, for example, modules, procedures, functions, etc. The software code may be stored in a memory unit so that it can be driven by a processor. The memory unit is located inside or outside of the processor, so that it can communicate with the aforementioned processor via a variety of well-known parts.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Moreover, it will be apparent that some claims referring to specific claims may be combined with another claims referring to the other claims other than the specific claims to constitute the embodiment or add new claims by means of amendment after the application is filed.

INDUSTRIAL APPLICABILITY

Although the above-described embodiments are described based on a 3GPP LTE-series system, the present invention is not limited thereto and a downlink reference signal transmission method is performed in various mobile communication system to which MIMO technology is applied.

The invention claimed is:

1. A method of transmitting a downlink signal at a base station using a plurality of antenna ports, the method comprising:

multiplexing and transmitting reference signals for the plurality of antenna ports based on a reference signal pattern in a data region of a downlink subframe; and transmitting data for the plurality of antenna ports in the data region of the downlink subframe, wherein the reference signals for the plurality of antenna ports are dedicated reference signals for use when a reception side demodulates the data for the plurality of antenna ports, and wherein the reference signal pattern is defined as a first group of resource elements and a second group of resource elements, wherein, if a number of the plurality of antenna ports is 5, reference signals for a first antenna port, a second antenna port and a fifth antenna port of the plurality of antenna ports are arranged on the first group, and reference signals for a third antenna port and a fourth antenna port of the plurality of antenna ports are arranged on the second group, and wherein, if the number of the plurality of antenna ports is 7, reference signals for the first antenna port, the second antenna port, the fifth antenna port and a seventh antenna port of the plurality of antenna ports are arranged on the first group, and reference signals for the third antenna port, the fourth antenna port and a sixth antenna port of the plurality of antenna ports are arranged on the second group.

2. The method according to claim 1, wherein, if the number of the plurality of antenna ports is 2, reference signals for the first antenna port and the second antenna port are arranged only on the first group.

3. The method according to claim 1, wherein, if the number of the plurality of antenna ports is 3, reference signals for the first antenna port and the second antenna port are arranged on the first group, and a reference signal for the third antenna port is arranged on the second group.

4. The method according to claim 1, wherein, if the number of the plurality of antenna ports is 4, reference signals for the first antenna port and the second antenna port are arranged on the first group, and reference signals for the third antenna port and the fourth antenna port are arranged on the second group, wherein, if the number of the plurality of antenna ports is 6, reference signals for the first antenna port, the second antenna port and the fifth antenna port are arranged on the first group, and reference signals for the third antenna port, the fourth antenna port and the sixth antenna port are arranged on the second group, and wherein, if the number of the plurality of antenna ports is 8, reference signals for the first antenna port, the second antenna port, the fifth antenna port and the seventh antenna port are arranged on the first group, and reference signals for the third antenna port, the fourth antenna port, the sixth antenna port and an eighth antenna port of the plurality of antenna ports are arranged on the second group.

5. The method according to claim 1, wherein a code division multiplexing of the reference signals uses a scheme for multiplying an orthogonal code over different time resources on the same frequency resources or a scheme for multiplexing an orthogonal code over different frequency resources on the same time resources.

6. The method according to claim 1, wherein a number of the plurality of resource elements to which the reference signals are mapped is 24.

7. The method according to claim 1, wherein:

the reference signal pattern is defined as a plurality of resource elements to which the reference signals are mapped are grouped into six sub-groups;

resource elements of each of the six sub-groups have same subcarrier, and different sub-groups are distinguished by different subcarriers;

first, third and fifth sub-groups of the six sub-groups are included in the first group of resource elements;

second, fourth and sixth sub-groups of the six sub-groups are included in the second group of resource elements; and a code division multiplexing is applied to the reference signals for two or more antenna ports arranged on the same sub-group.

8. A method of receiving a downlink signal at a user equipment using a plurality of antenna ports, the method comprising:

receiving reference signals for the plurality of antenna ports multiplexed based on a reference signal pattern in a data region of a downlink subframe;

receiving data for the plurality of antenna ports in the data region of the downlink subframe; and demodulating the data for the plurality of antenna ports using the reference signals for the plurality of antenna ports, wherein the reference signals for the plurality of antenna ports are dedicated reference signals, and wherein the reference signal pattern is defined as a first group of resource elements and a second group of resource elements, wherein, if a number of the plurality of antenna ports is 5, reference signals for a first antenna port, a second antenna port and a fifth antenna port of the plurality of antenna ports are arranged on the first group, and reference signals for a third antenna port and a fourth antenna port of the plurality of antenna ports are arranged on the second group, and wherein, if the number of the plurality of antenna ports is 7, reference signals for the first antenna port, the second antenna port, the fifth antenna port and a seventh antenna port of the plurality of antenna ports are arranged on the first group, and reference signals for the third antenna port, the fourth antenna port and a sixth antenna port of the plurality of antenna ports are arranged on the second group.

9. The method according to claim 8, wherein, if the number of the plurality of antenna ports is 2, reference signals for the first antenna port and the second antenna port are arranged only on the first group.

10. The method according to claim 8, wherein, if the number of the plurality of antenna ports is 3, reference signals for the first antenna port and the second antenna port are arranged on the first group, and a reference signal for the third antenna port is arranged on the second group.

11. The method according to claim 8, wherein, if the number of the plurality of antenna ports is 4, reference signals for the first antenna port and the second antenna port are arranged on the first group, and reference signals for the third antenna port and the fourth antenna port are arranged on the second group, wherein, if the number of the plurality of antenna ports is 6, reference signals for the first antenna port, the second antenna port and the fifth antenna port are arranged on the first group, and reference signals for the third antenna port, the fourth antenna port and the sixth antenna port are arranged on the second group, and wherein, if the number of the plurality of antenna ports is 8, reference signals for the first antenna port, the second antenna port, the fifth antenna port and the seventh antenna port are arranged on the first group, and reference signals for the third antenna port, the fourth antenna port, the sixth antenna port and an eighth antenna port of the plurality of antenna ports are arranged on the second group.

12. The method according to claim 8, wherein a code division multiplexing of the reference signals uses a scheme for multiplying an orthogonal code over different time resources on the same frequency resources or a scheme for multiplexing an orthogonal code over different frequency resources on the same time resources.

13. The method according to claim 8, wherein a number of the plurality of resource elements to which the reference signals are mapped is 24.

14. The method according to claim 8, wherein:
the reference signal pattern is defined as a plurality of resource elements to which the reference signals are mapped are grouped into six sub-groups;
resource elements of each of the six sub-groups have same subcarrier, and different sub-groups are distinguished by different subcarriers;
first, third and fifth sub-groups of the six sub-groups are included in the first group of resource elements;
second, fourth and sixth sub-groups of the six sub-groups are included in the second group of resource elements; and
a code division multiplexing is applied to the reference signals for two or more antenna ports arranged on the same sub-group.

15. A base station for transmitting a downlink signal using a plurality of antenna ports, comprising:
a plurality of antennas;
a reception module configured to receive a signal from a user equipment through the plurality of antennas;
a transmission module configured to transmit a signal to the user equipment through the plurality of antennas; and
a processor configured to control the base station including the plurality of antennas, the reception module and the transmission module,
wherein the processor is configured to multiplex and transmit reference signals for the plurality of antenna ports based on a reference signal pattern in a data region of a downlink subframe through the transmission module and transmit data for the plurality of antenna ports in the data region of the downlink subframe through the transmission module,
wherein the reference signals for the plurality of antenna ports are dedicated reference signals for use when the user equipment demodulates the data for the plurality of antenna ports, and wherein the reference signal pattern is defined as a first group of resource elements and a second group of resource elements, wherein, if a number of the plurality of antenna ports is 5, reference signals for a first antenna port, a second antenna port and a fifth antenna port of the plurality of antenna ports are arranged on the first group, and reference signals for a third antenna port and a fourth antenna port of the plurality of antenna ports are arranged on the second group, and wherein, if the number of the plurality of antenna ports is 7, reference signals for the first antenna port, the second antenna port, the fifth antenna port and a seventh antenna port of the plurality of antenna ports are arranged on the first group, and reference signals for the third antenna port, the fourth antenna port and a sixth antenna port of the plurality of antenna ports are arranged on the second group.

16. A user equipment for receiving a downlink signal using a plurality of antenna ports, comprising:
a plurality of antennas;
a reception module configured to receive a signal from a base station through the plurality of antennas;
a transmission module configured to transmit a signal to the base station through the plurality of antennas; and
a processor configured to control the user equipment including the plurality of antennas, the reception module and the transmission module,
wherein the processor is configured to receive reference signals for the plurality of antenna ports multiplexed based on a reference signal pattern in a data region of a downlink subframe through the reception module, receive data for the plurality of antenna ports in the data region of the downlink subframe through the reception module, and demodulate the data for the plurality of antenna ports using the reference signals for the plurality of antenna ports,
wherein the reference signals for the plurality of antenna ports are dedicated reference signals, and
wherein in the reference signal pattern is defined as a first group of resource elements and a second group of resource elements,
wherein, if a number of the plurality of antenna ports is 5, reference signals for a first antenna port, a second antenna port and a fifth antenna port of the plurality of antenna ports are arranged on the first group, and reference signals for a third antenna port and a fourth antenna port of the plurality of antenna ports are arranged on the second group, and
wherein, if the number of the plurality of antenna ports is 7, reference signals for the first antenna port, the second antenna port, the fifth antenna port and a seventh antenna port of the plurality of antenna ports are arranged on the first group, and reference signals for the third antenna port, the fourth antenna port and a sixth antenna port of the plurality of antenna ports are arranged on the second group.

* * * * *